US010650184B2

(12) United States Patent
Frazer et al.

(10) Patent No.: US 10,650,184 B2
(45) Date of Patent: May 12, 2020

(54) LINKED TEXT BOXES

(71) Applicant: Apple Inc., Cupertino, CA (US)

(72) Inventors: Katherine Elizabeth Frazer, San Francisco, CA (US); Allen Wayne Lucas, Redwood City, CA (US); Jonathan Cho, San Francisco, CA (US); Michael Scott Lindsey, Vancouver, WA (US); Kevin R. Smyth, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/007,815

(22) Filed: Jun. 13, 2018

(65) Prior Publication Data
US 2019/0384805 A1     Dec. 19, 2019

(51) Int. Cl.
| | | |
|---|---|---|
| *G06F 40/134* | (2020.01) | |
| *G06F 3/0482* | (2013.01) | |
| *G06F 3/0484* | (2013.01) | |
| *G06F 40/166* | (2020.01) | |
| *G06F 3/0481* | (2013.01) | |
| *G06F 3/0488* | (2013.01) | |
| *G06F 17/00* | (2019.01) | |

(52) U.S. Cl.
CPC .......... *G06F 40/134* (2020.01); *G06F 3/0482* (2013.01); *G06F 3/04847* (2013.01); *G06F 40/166* (2020.01); *G06F 3/0481* (2013.01); *G06F 3/0488* (2013.01)

(58) Field of Classification Search
CPC .... G06F 17/246; G06F 17/212; G06F 17/972; G06F 17/958; G06F 3/0481; G06F 3/0488; G06F 3/0482
See application file for complete search history.

(56) References Cited

U.S. PATENT DOCUMENTS

| | | |
|---|---|---|
| 5,858,184 A | 1/1999 | Fu et al. |
| 7,461,351 B2 | 12/2008 | Bailey et al. |

(Continued)

FOREIGN PATENT DOCUMENTS

WO    2007097833 A2    8/2007

OTHER PUBLICATIONS

Anonymous: "Text overflow indicator: Adobe Community", Feb. 2, 2016, XP055615092; https://forums.adobe.com/thread/2081718 (retrieved on Aug. 23, 2019).

(Continued)

*Primary Examiner* — Quoc A Tran
(74) *Attorney, Agent, or Firm* — Fletcher Yoder PC

(57) ABSTRACT

The present disclosure relates to linking text boxes and features associated with linked text boxes. A user interface feature in a document authoring application program for creating text boxes may include a text box creation graphical menu item presented on a display of an electronic device. In response to receiving user input indicative of a selection of the text box graphical menu item, the application program is configured to cause the electronic device to render a text box that includes a bounding edge in the document on the display. Additionally, the user interface feature includes a selectable visual indicator displayed as an integral part of the text box. The selectable visual indicator is indicative of a thread of text boxes in which the text box is included.

18 Claims, 47 Drawing Sheets

(56) References Cited

U.S. PATENT DOCUMENTS

| | | |
|---|---|---|
| 7,971,154 B2 | 6/2011 | Shaw et al. |
| 9,588,653 B2 | 3/2017 | Schmidt |
| 2008/0174570 A1* | 7/2008 | Jobs ................... G06F 3/0488 345/173 |
| 2010/0201692 A1* | 8/2010 | Niles ................... G06T 13/20 345/473 |
| 2012/0131499 A1 | 5/2012 | Feinberg et al. |
| 2014/0115446 A1 | 4/2014 | Hall et al. |
| 2015/0310122 A1* | 10/2015 | Hall ................... G06F 17/212 715/234 |
| 2016/0210274 A1 | 7/2016 | Maclean et al. |

OTHER PUBLICATIONS

International Search Report and Written Opinion for PCT Application No. PCT/2019/034679 dated Sep. 3, 2019 14 pgs.

* cited by examiner

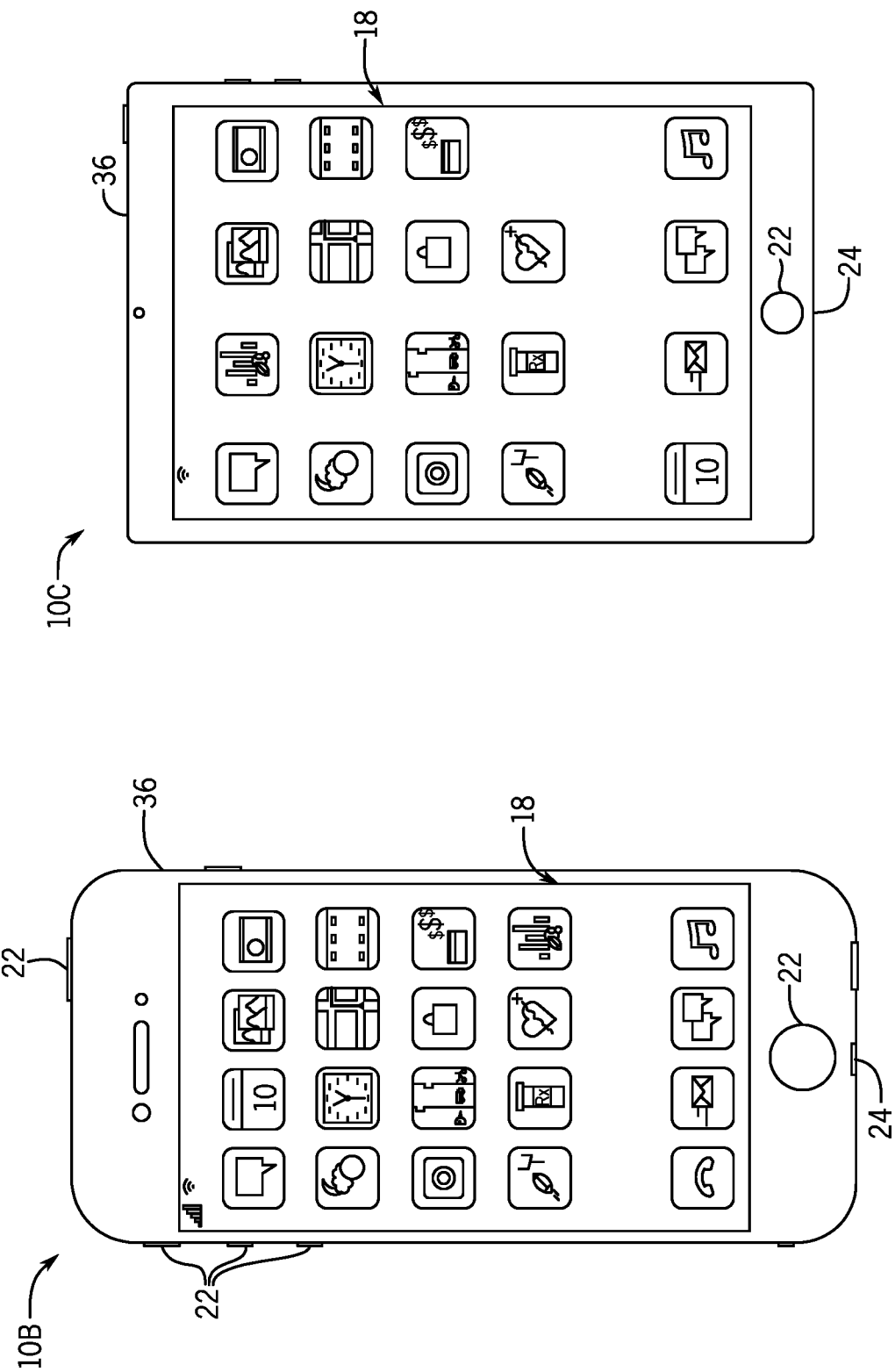

LINKED TEXT BOXES

BACKGROUND

The present disclosure relates generally to adjusting displayed text and, more particularly, to linking text boxes and dynamically adjusting text within text boxes based on how the text boxes are linked.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Applications executed on electronic devices may include applications that enable users to input and edit text. Examples of such applications include word processing applications, presentation applications, and note-taking applications. In some cases, an application may enable users to create a text box, which is a defined area that may include text. For instance, text boxes may be displayed in a user interface that is displayed on an electronic display of an electronic device, and text boxes may be generated based on user input. However, when multiple text boxes are present, there may be no apparent relationship between text boxes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to linking text boxes and features associated with linked text boxes. Text boxes may be linked by assigning the text boxes to a thread. That a text box is assigned to a thread may be indicated by an indicator (e.g., a selectable visual indicator) that may be included as part of a text box. The indicator may include a color associated with the thread and provide a position a text box within a thread. In this way, a relationship between a text box and other text boxes may be displayed in a manner that is clear and does not obstruct a user's view of other items or text that may be included in the document. Text may flow from one text box to another text box of the same thread based on the respective positions of the text boxes within the thread. For example, text may flow from a text box in a thread with one position to a text box having a subsequent position with the thread.

Moreover, text boxes may be assigned positions within a thread based on a position of the text box (e.g., within a document and/or relative to other text boxes) as well as a language associated with the document in which the text box is included, an application program that provides the text boxes, or an electronic device on which the application program is executed. In this manner, text boxes may be generated and added to threads in an intuitive manner that enables users to write and read text in a manner similar to how the language is standardly read and written.

Furthermore, a user may modify both the position of a text box within a thread as well as the thread to which the text box is assigned. Based on such a modification, where text is displayed within a thread (e.g., which text box in the thread) may be dynamically adjusted. For example, new threads may be created, and users may merge a text box and text from one thread into a different thread.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1;

FIG. 4 is a front view of another hand-held device representing another embodiment of the electronic device of FIG. 1;

DETAILED DESCRIPTION OF SPECIFIC EMBODIMENTS

Figure 1:
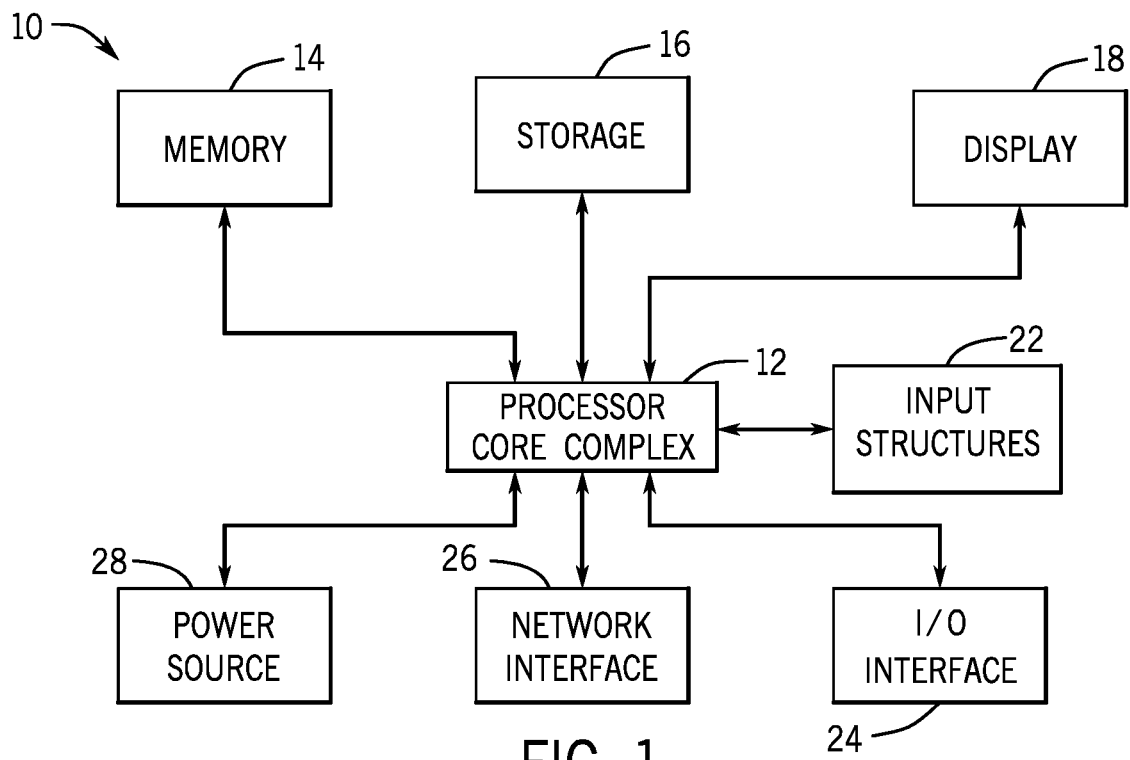
FIG. 1 is a schematic block diagram of an electronic device that provides linked text boxes, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

A text box is a defined area that may include text. Text boxes may be displayed in a user interface displayed on an electronic display, and text boxes may be generated based on user input via the user interface.

The present disclosure includes techniques for linking text boxes, providing indications of how a text box may be associated with other text boxes, and providing indications of how associated text boxes are related to one another. In particular, text boxes may include a visual indicator that is included in a bounding edge of the text box, and the indicator may provide an indication of a thread (e.g., a group) of text boxes in which or into which the text box is or will be included. Moreover, text boxes may be assigned to threads based on their position on a user interface as well as location and/or language settings associated with an application program associated with the user interface or electronic device on which the user interface is displayed. Additionally, a menu may be provided to allow for various settings regarding linked text boxes to be changed. For example, a text box may be assigned to a new or different thread, and the position of a text box within a thread (e.g., a numerical position) may be modified. Furthermore, as discussed below, text present in text boxes of a thread may be modified based on changes made within the thread.

Figure 2:
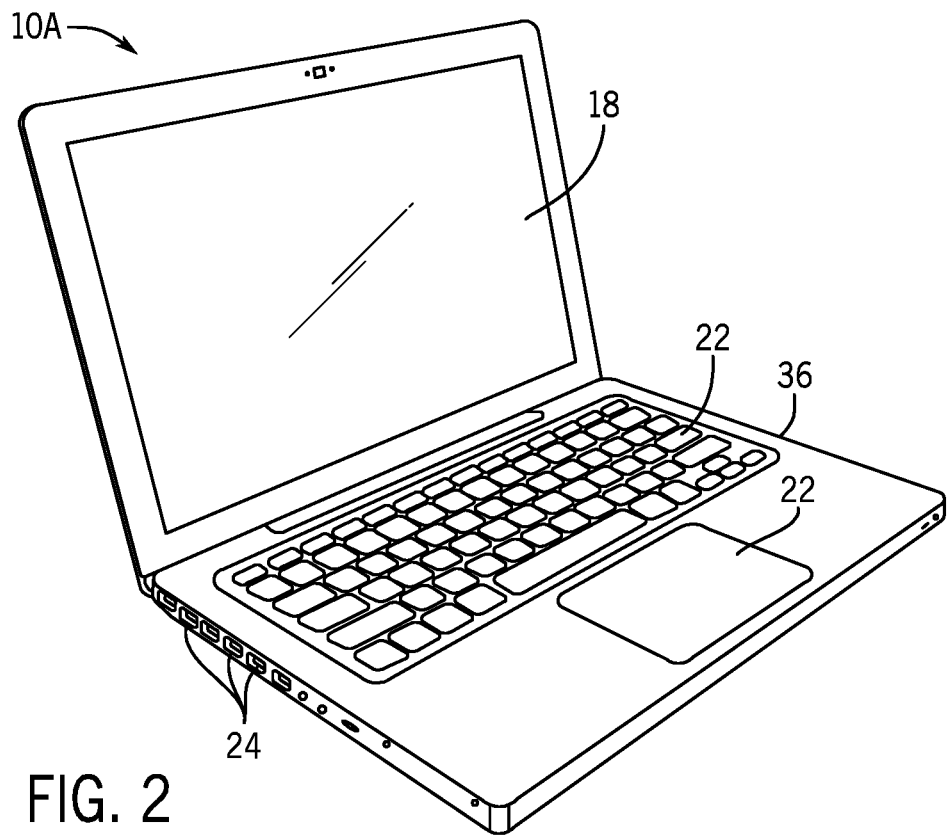
FIG. 2 is a perspective view of a notebook computer representing an embodiment of the electronic device of FIG. 1.
Figure 5:
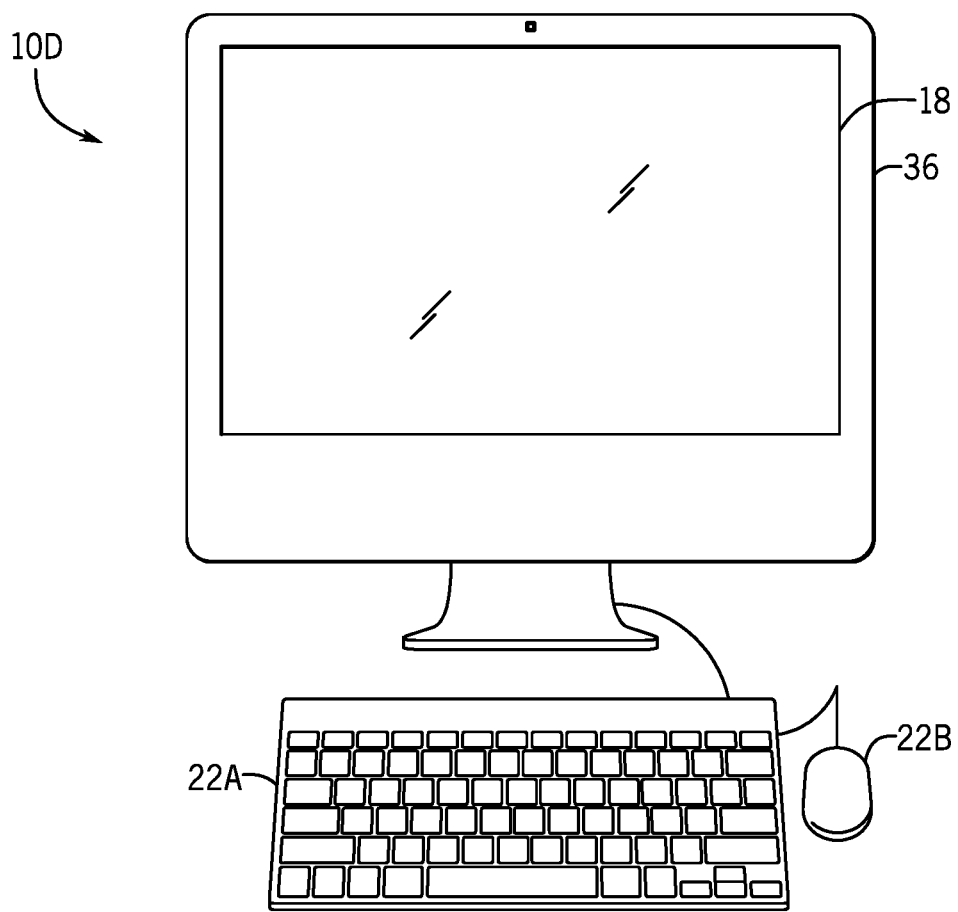
FIG. 5 is a front view of a desktop computer representing another embodiment of the electronic device of FIG. 1.
Figure 6:
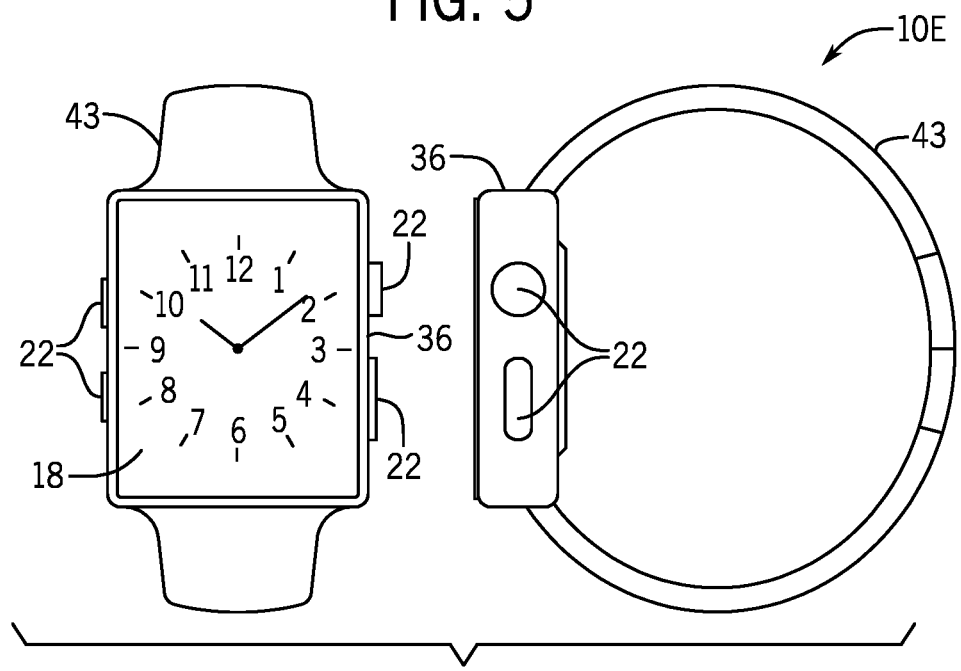
FIG. 6 is a front view and side view of a wearable electronic device representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, a network interface 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10. The processor core complex 12 may include any suitable data processing circuitry to perform these operations, such as one or more microprocessors, one or more application program specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. For example, the processor core complex 12 may carry out instructions stored in the local memory 14 and/or the main memory storage device 16 to generate text boxes and assign text boxes to threads based on user input. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application program interface, still images, or video content. The processor core complex 12 may supply at least some of the image frames. For example, the processor core complex 12 may supply image frames that display the linked text boxes of this disclosure. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 according to embodiments of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or application programs running on computer 10A. For example, a keyboard and/or touchpad may allow a user to navigate a user interface or application program interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal service bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application program screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Generating and Linking Text Boxes

Figure 7:
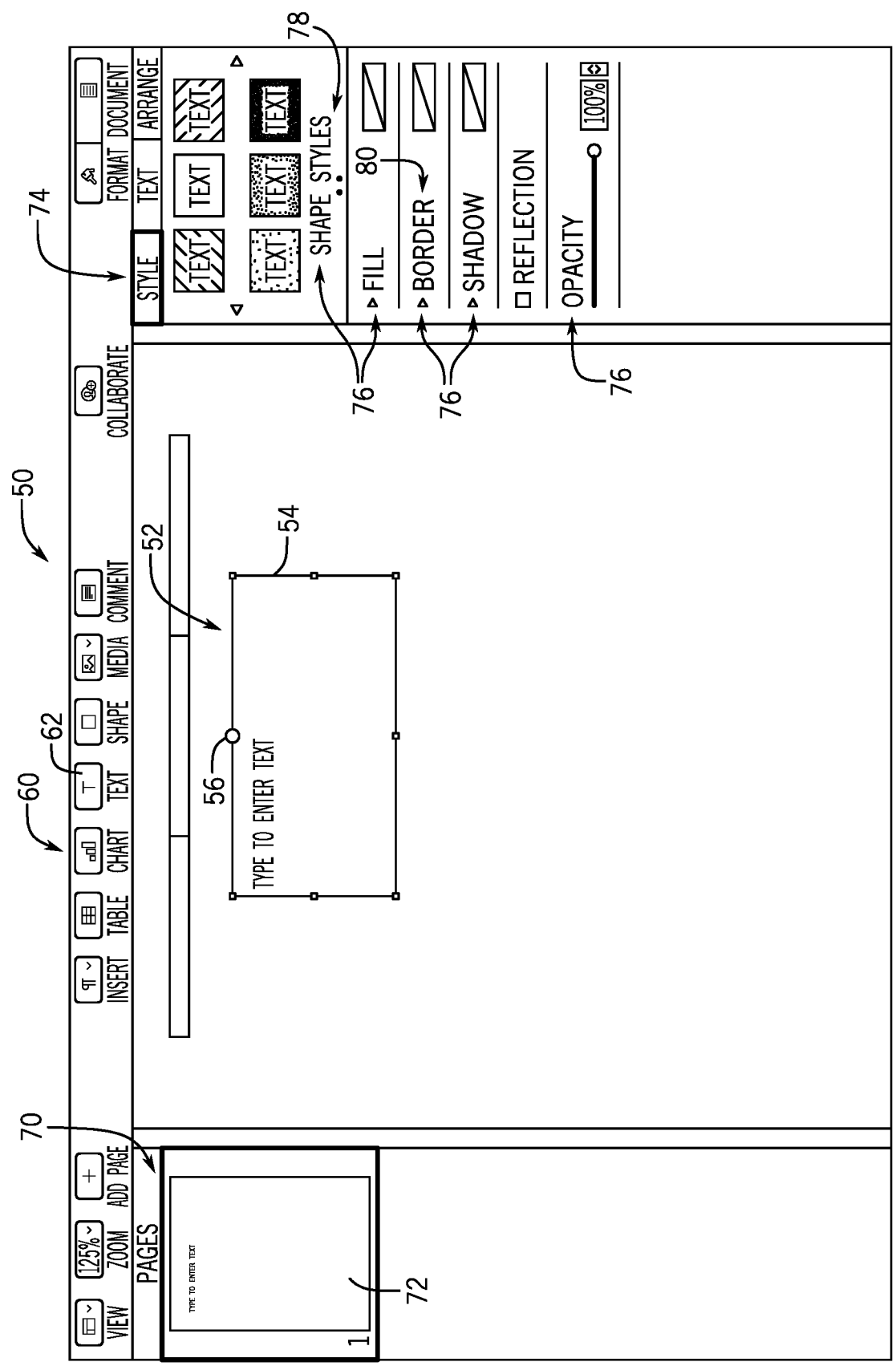
FIG. 7 illustrates a software application program that displays and enables the generation, and modification of, a text box on a display of the electronic device of FIG. 1, according to embodiments of the present disclosure.

FIG. 7 illustrates a software application program 50 that displays and enables the generation, and modification of, a text box 52 on a display 18 of the electronic device 10 of FIG. 1, according to embodiments of the present disclosure. The software application program 50 may be any suitable software application program that may generate and/or adjust the text box 52, such as document authoring application programs like presentation application programs, word processing application programs, note-taking application programs, slideshow application programs, and the like. As illustrated, the text box 52 includes a bounding edge 54, which may define an area within the text box 52 in which text is shown. Furthermore, the text box 52 may include a linking affordance 56 that is included as part of the bounding edge 54. As discussed below, the linking affordance 56 may be interacted with by users in several different manners. As one example, users may assign the text box 52 to a thread, or group, of text boxes by interacting with the linking affordance 56.

As illustrated, the application program 50 also includes a graphical menu 60, which may include menu items such as a text box graphical menu item 62. Upon selection of the text box graphical menu item 62 by a user, the application program 50 generates a text box, such as the text box 52. As additionally illustrated, the application program 50 may include a thumbnail panel 70, which may provide a thumbnail of one or more pages included in a document presented by the application program 50. For example, a thumbnail 72 of page 1 is provided by the application program 50 in FIG. 1. Furthermore, the application program 50 may include a formatting panel 74, which may include one or more controls 76 that enable adjustment to at least some properties associated with the text box 52. For example, a style control 78 may enable adjustment to a background color associated with the text box 52. As another example, the formatting panel 74 may include a border control 80, which may enable adjustment of properties associated with the bounded edge 54, such as a thickness or color of the bounded edge 54.

Figure 8:
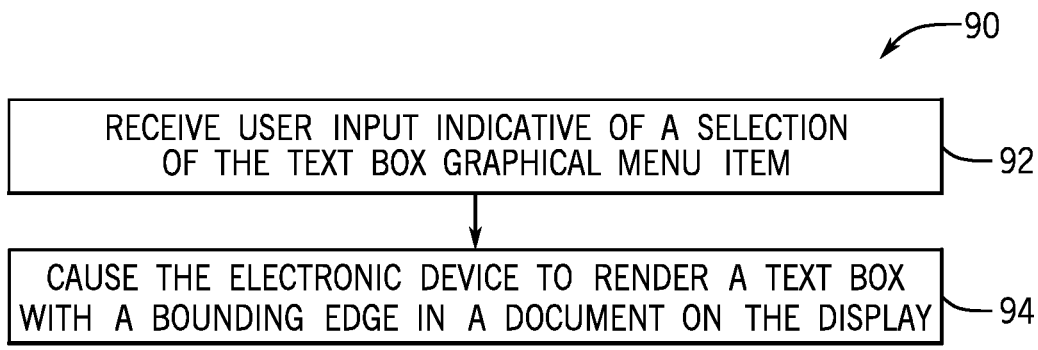
FIG. 8 is a flow diagram of a process for generating a text box, according to embodiments of the present disclosure.

With the discussion of FIG. 7 in mind, FIG. 8 is a flow diagram of a process 90 for generating a text box (e.g., text box 52). The process 90 may be in the form of an application program (e.g., the application program 50) that includes instructions that are executed by at least one suitable processor of a computer system, such as the processor core complex 12 of the electronic device 10. The illustrated process 90 is merely provided as an example, and in other embodiments, certain illustrated steps of the process 90 may be performed in other orders, skipped, or repeated, according to embodiments of the present disclosure.

As illustrated, in process block 92, the processor core complex 12 may receive user input indicative of a selection of the text box graphical menu item 62. For example, user may select the text box graphical menu item 62 using one or more of the input structures 22 of the electronic device 10 to cause the text box 52 to be generated.

In response to the user input, at process block 94, the processor core complex 12 may cause the electronic device 10 to render a text box (e.g., text box 52) with a bounding edge 54 in a document on the display 18. In other words, upon receiving user input indicative of a selection of the text box graphical menu item 62, the text box 52 may be provided via the display 18. Additionally, the text box 52 may include a selectable visual indicator that is displayed as an integral part of the text box 52 and, when selected, indicative of a thread of text boxes in which the text box 52 is included. For example, as discussed below, the selectable visual indicator may be included in linking affordance 56.

Figure 9:
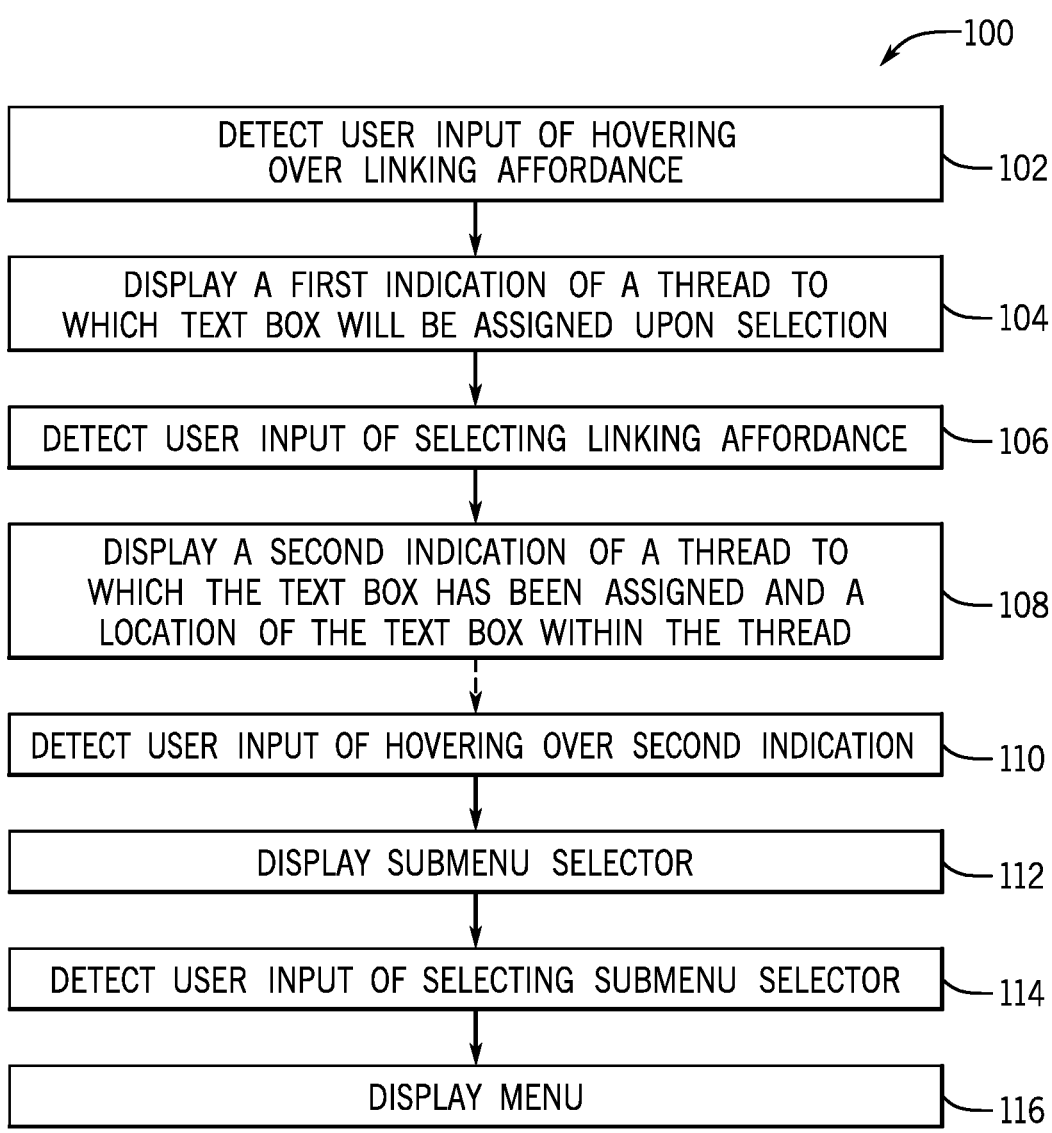
FIG. 9 is a flow diagram of a process for displaying an indication of a thread to which a text box will be assigned and for displaying an indication of a thread to which a text box has been assigned, according to embodiments of the present disclosure.

As indicated above, the linking affordance 56 may provide several indications to a user. With this in mind, FIG. 9 is a flow diagram of a process 100 for displaying an indication of a thread to which a text box will be assigned as well as for displaying an indication of a thread to which a text box has been assigned. The process 100 may be in the form of an application program (e.g., the application program 50) that includes instructions that are executed by at least one suitable processor of a computer system, such as the processor core complex 12 of the electronic device 10. The illustrated process 100 is merely provided as an example, and in other embodiments, certain illustrated steps of the process 100 may be performed in other orders, skipped, or repeated, according to embodiments of the present disclosure.

At process block 102, the processor core complex 12 may detect user input of hovering over the linking affordance 56 of the text box 52. For instance, in embodiments in which the input structures 22 include a computer mouse, a user may move the mouse points over the linking affordance without clicking the mouse, and the processor core complex 12 may recognize that the mouse pointer is positioned over the linking affordance 56.

Figure 10A:
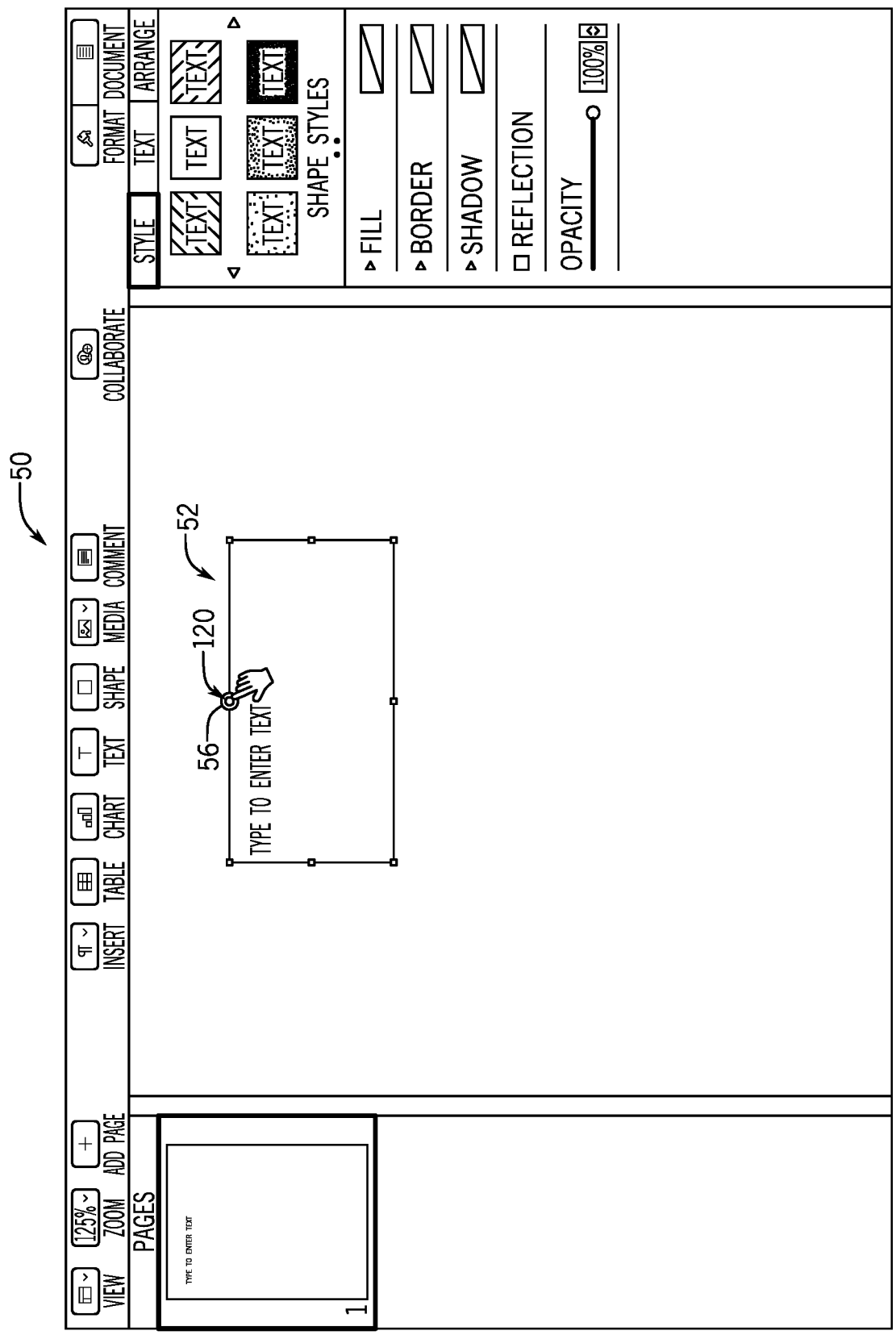
FIGS. 10A-10D illustrate providing several indications and a menu associated with the linking affordance of the text box of FIG. 7, according to embodiments of the present disclosure.

At process block 104, the processor core complex 12 may cause an indication of a thread to which the text box 52 will be assigned if the linking affordance is selected to be displayed. In other words, in response to detecting a user input of hovering over the linking affordance 56, an indication of a thread that the text box 52 can be assigned to may be displayed. For example, FIGS. 10A-10D illustrate providing several indications and a menu associated with the linking affordance 56 of the text box 52. FIG. 10A illustrates the processor core complex 12 displaying an indication 120 of a thread to which the text box 52 will be assigned if selected. As illustrated, the indication 120 may be a geometric shape (e.g., a circle) filled with a color associated with the thread, and the indication 120 may be included within the linking affordance 56. In some embodiments, the thread indicated by the indication 120 may be the thread associated with a text box that was last edited by a user. Additionally, in some embodiments, when a user has added text to the text box 52 before the processor core complex 12 detects user input indicative of hovering over the linking affordance 56, the indicator 120 may be indicative of a new thread.

At block 106, the processor core complex 12 may detect user input indicative of selecting the linking affordance. For example, after detecting a user input indicative of hovering over the linking affordance 56, the processor core complex 12 may recognize that the user has selected the linking affordance (e.g., via the input structures 22).

Figure 10B:
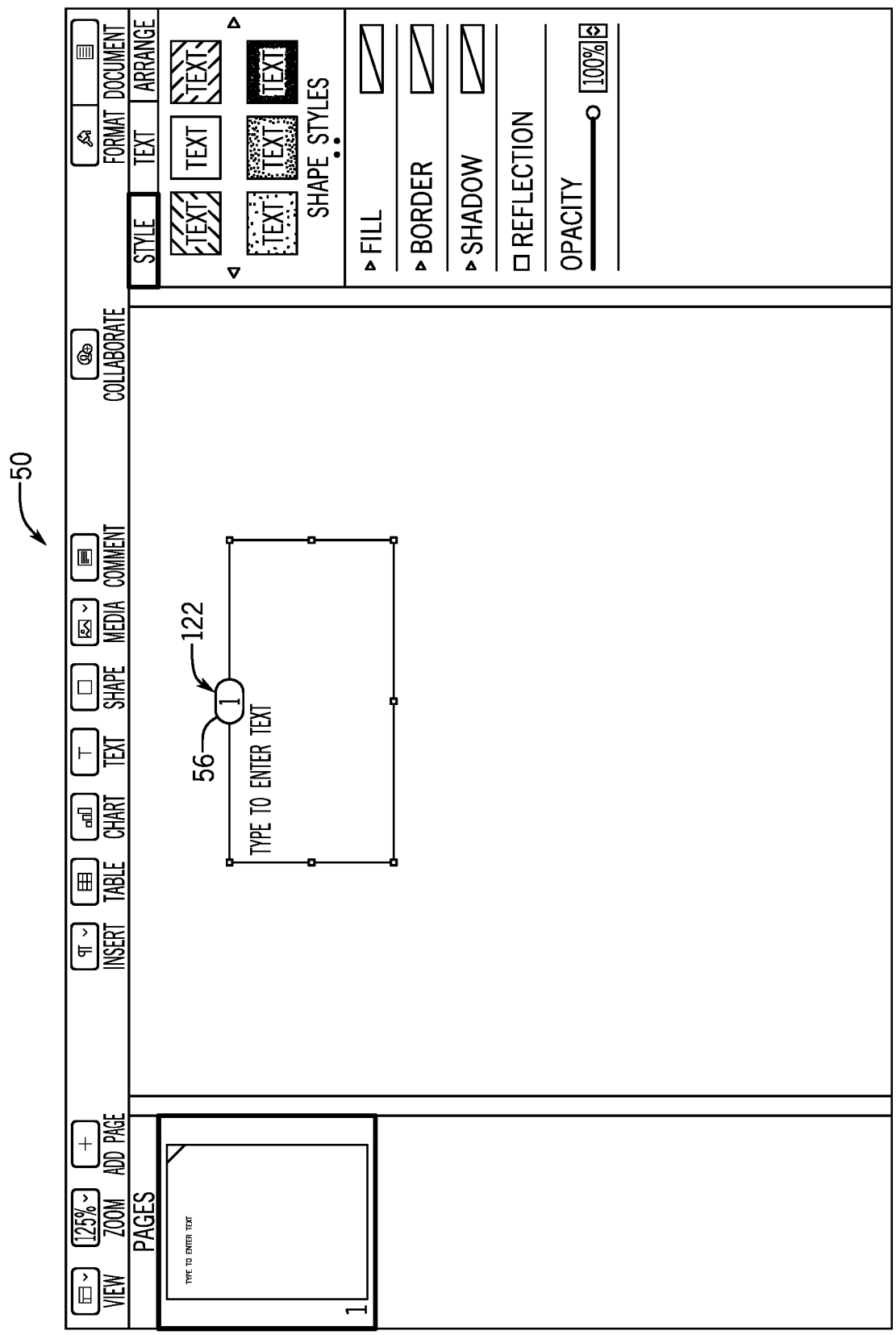

At block 108, the processor core complex 12 may cause a selectable visual indicator indicative of a thread to which the text box has been assigned to be displayed. For example, FIG. 10B illustrates the text box 52 with a selectable visual indicator 122. The selectable visual indicator 122 may also provide an indication of a position of the text box 52 within the thread. For example, as illustrated in FIG. 10B, the selectable visual indicator 122 includes a color associated with the thread as well as a number indicating the position of the text box 52 within the thread.

Figure 10C:
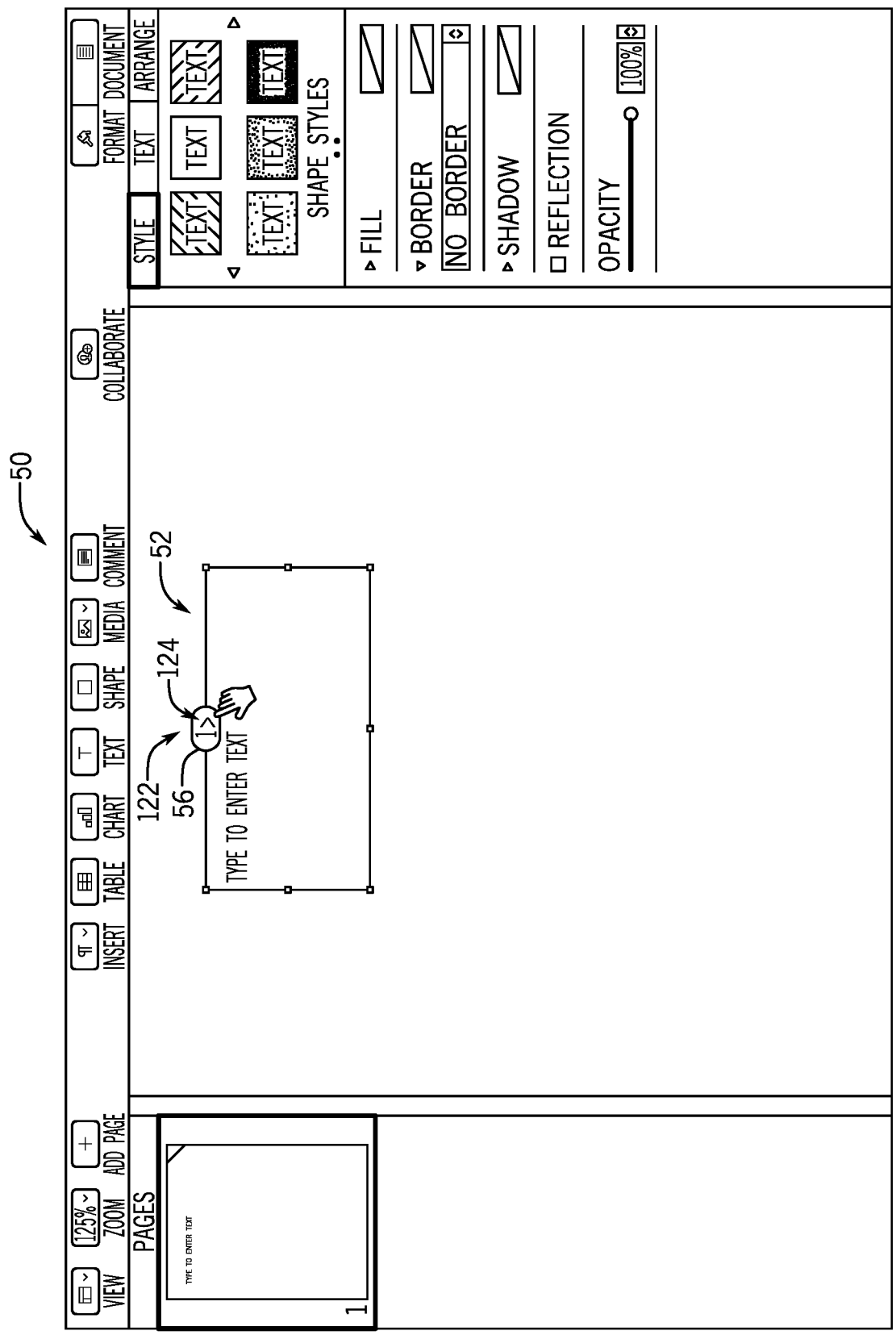

Additionally, in some embodiments, a menu may be accessible via the selectable visual indicator 122. Accordingly, the process 100 may include, at block 110, detecting a hover over the selectable visual indicator. Furthermore, at block 112, the process may include displaying a menu selector. For instance, FIG. 10C illustrates a menu selector 124 that may be generated in response to detecting user input of hovering over the selectable visual indicator 122. Indeed, the processor core complex 12 may cause the menu selector 124 to be displayed based on detecting a user input indicative of hovering over the selectable visual indicator 122. The menu selector 124 may indicate that a menu may be provided upon selection of the selectable visual indicator 122. Furthermore, as with the selectable visual indicator 122, the menu selector 124 may be included within the linking affordance 56.

Figure 10D:
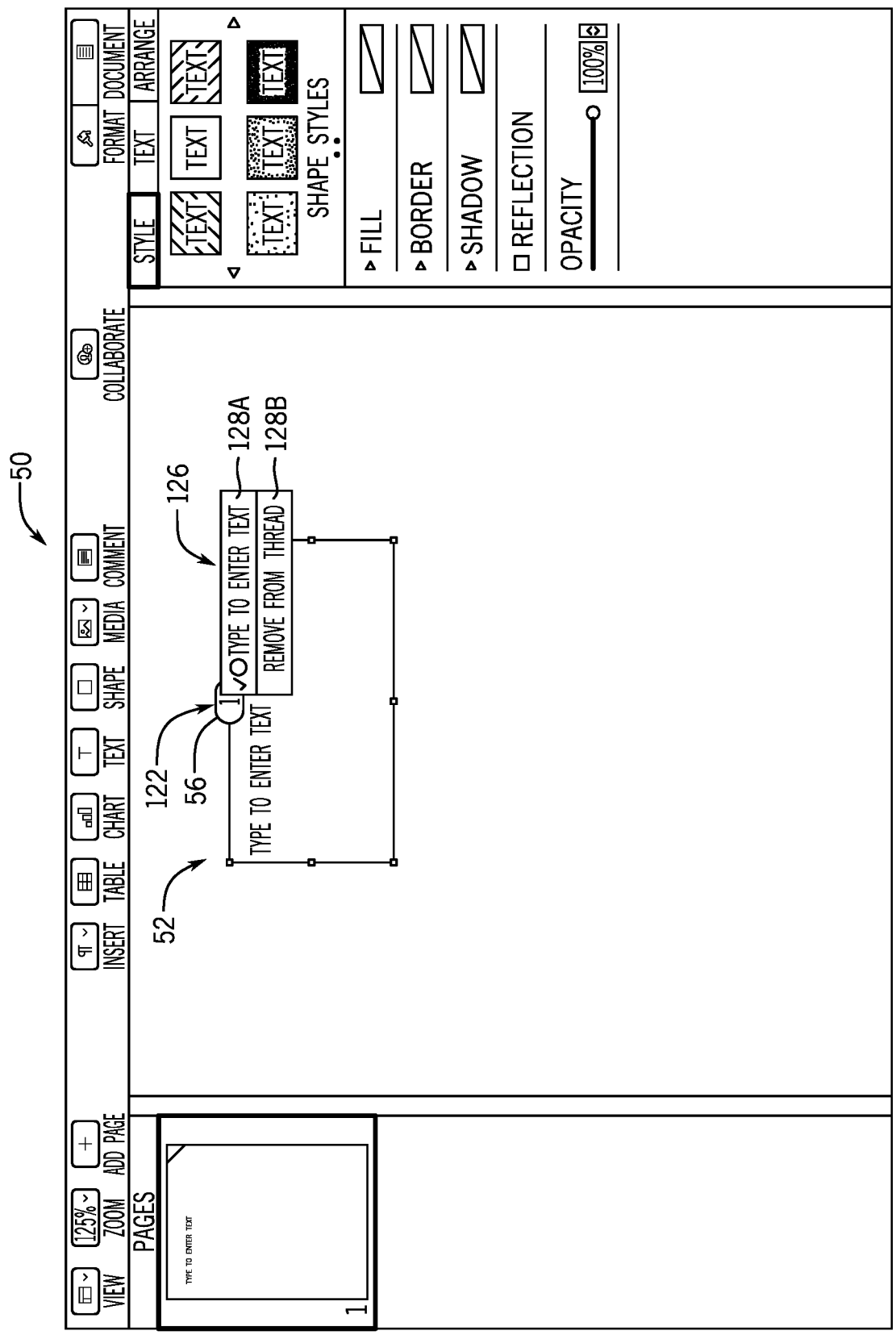

Returning to the discussion of the process 100, at block 114, the processor core complex 12 may detect selection of the menu selector 124 (e.g., as indicated via user input provided via an input structures 22). And, at block 116, the processor core complex 12 may display a menu. For instance, FIG. 10D illustrates a menu 126 that may be displayed based on user input indicative of a selection of the menu selector 124. The menu 126 may include several selection options 128, which may be selected by a user. For instance, selection of option 128A may cause the menu 126 to close when only one thread exists or when the thread indicated by the option 128A is the thread in which the text box 52 is included. As another example, upon detecting a user selection of option 128B, the processor core complex 12 may cause the text box 52 to be removed from the thread in which the text box 52 is included.

Figure 11:
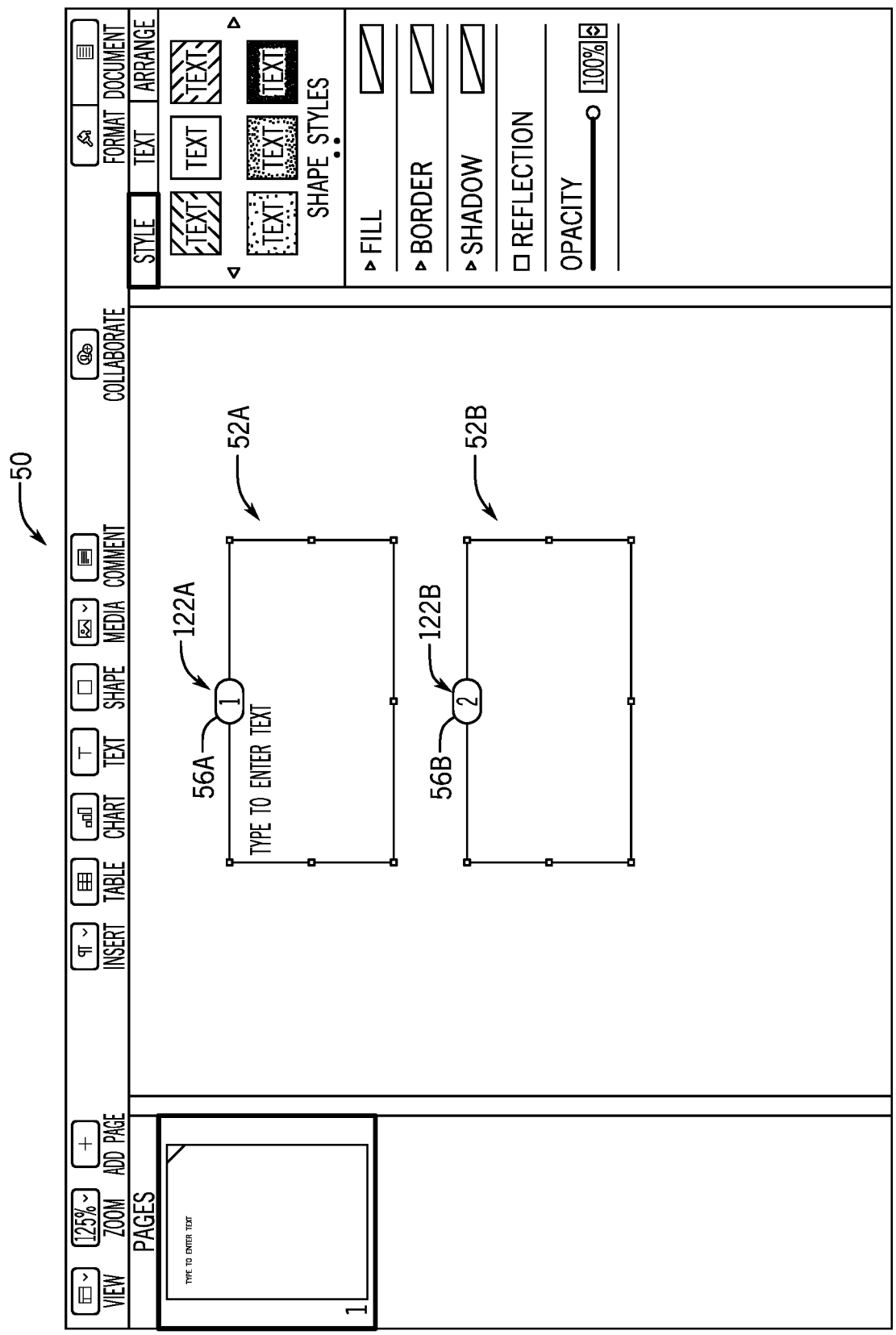
FIG. 11 illustrates text boxes that are included in the same thread as one another, according to embodiments of the present disclosure.

As the user utilizes the application program 50, the user may add additional text boxes 52 and assign the additional text boxes to the thread in the manner discussed above. FIG. 11 is an illustration of text boxes 52A and 52B that are included in the same thread as one another. As illustrated, selectable visual indicator 122A includes a color indicating that the text box 52A is included in the thread. The selectable visual indicator 122A also includes a number (e.g., "1") indicating that the text box 52A is the first text box in the thread. Similarly, the text box 52B includes a selectable visual indicator 122B that includes the same color as selectable visual indicator 122A, meaning the text box 52A and text box 52B are included in the same thread. Moreover, the selectable visual indicator 122B includes a number (e.g., "2"), indicating that the text box 52B is the second text box in the thread.

Figure 12:
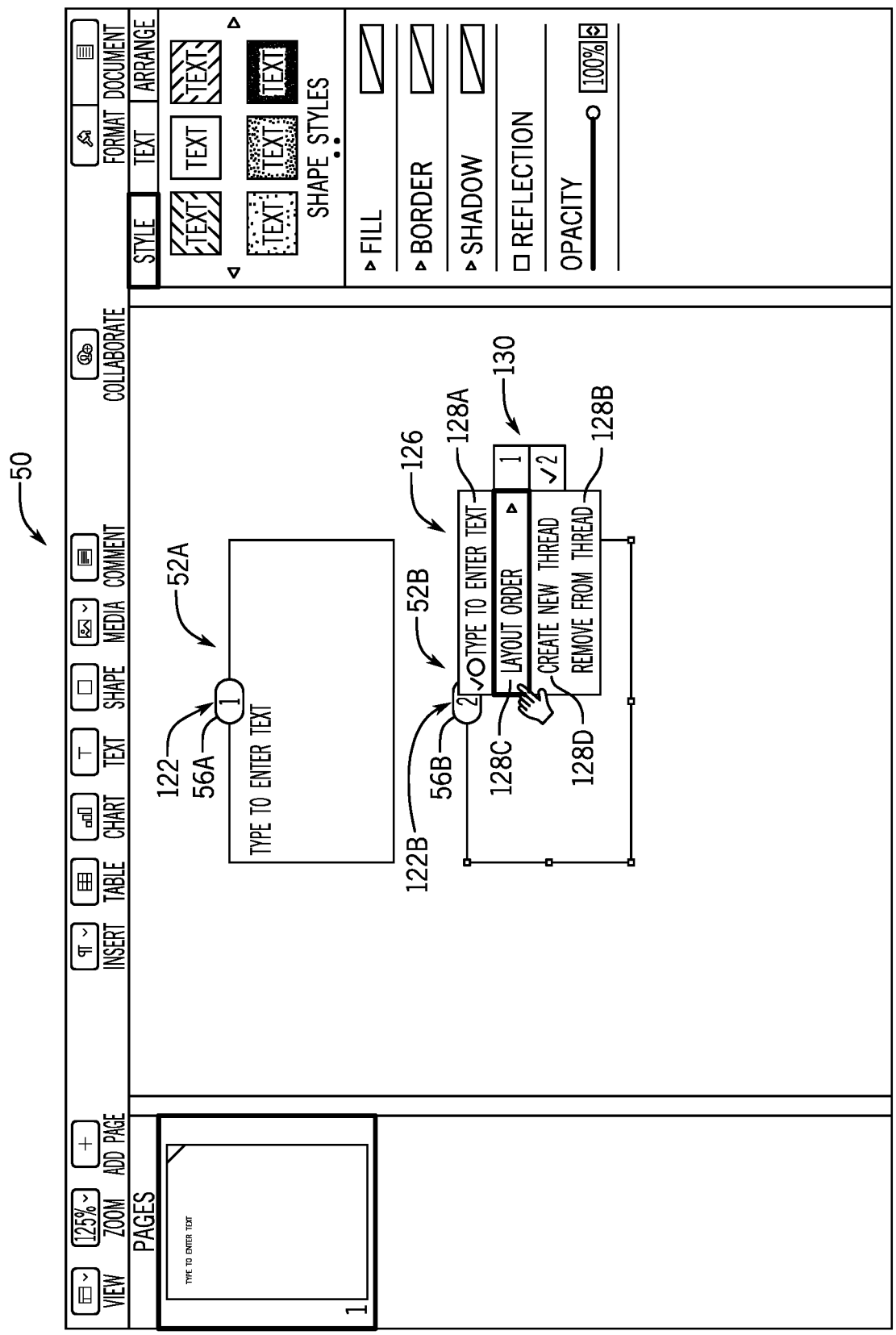
FIG. 12 illustrates a menu that is accessible via the selectable visual indicator of a text box, according to embodiments of the present disclosure.

When more than one text box 52 is present in a thread, the options 128 present in the menu 126 may differ from those discussed above. For instance, FIG. 12 is an illustration of a menu 126 that may be provided via the selectable visual indicator 122. For example, a thread order option 128C may be provided that enables a user to modify the position of a text box 52 within a thread. As illustrated, when the processor core complex 12 detects a user input indicative of hovering over the thread order option 128C, the processor core complex 12 may present a numbering submenu 130 that includes numbers corresponding to the positions of text boxes 52 in the same thread as the text box 52B. The numbering submenu 130 may also indicate the position of the text box 52 from which the user has accessed the menu 126. Upon selection of a position that differs from the indicated position of a text box 52, the processor core complex 12 may assign the text box 52 to the selected position and change the positions of the other text boxes 52 in the same thread. For instance, as discussed below, numbering of the positions of the text boxes 52 within a thread may be determined based on location and/or language settings associated with the application program 50 or the electronic device 10 on which the application program 50 is displayed.

As additionally illustrated in FIG. 12, the menu 126 may include a new thread option 128D. As discussed below, upon detecting a user selection of the new thread option 128D, the processor core complex 12 may assign a text box 52 to a new thread. That is, a text box 52 may be removed from one thread, a new thread may be generated, and the text box 52 may be added to the new thread.

Determining and Displaying Positions of Text Boxes within Threads

As discussed above, as text boxes 52 are added to a thread, each text box 52 may be assigned a position in the thread, and a text box's inclusion and position within the thread may be indicated by a selectable visual indicator 122 of the text box 52. In particular, the processor core complex 12 may determine the position a text box 52 within a thread based a position of the text box 52 on a page of the application program 50 relative to the positions of other text boxes 52 of the same thread. More specifically, the manner in which the processor core complex 12 makes such determinations may be based on location and/or language settings associated with the application program 50 or the electronic device 10 on which the application program 50 is displayed. For instance, in some embodiments, the positions of text boxes 52 within a thread may be determined based on a locale of a document provided by the application program 50, whereas, in other embodiments, the positions of text boxes 52 within a thread may be determined based on a locale of the electronics device 10 or an operating system associated with the electronic device 10. For example, a locale may be associated with a language that is standardly written in a certain orientation, such as left-to-right, right-to-left, or top-to-bottom. Text boxes 52 may be positioned within a thread based on their positions within a page of a document of the application program 50 in a manner that enables users to input text into the text boxes 52 and read text in the text boxes 52 in an intuitive manner based on a language or locale. In instances in which more than one user may access a document that includes text boxes 52, the processor core complex 12 may determine how the positions of text boxes 52 within threads are determined based a language specification associated with the locale associated with the user that first made the document. For example, text boxes 52 in a document being collaborated on by several users may be assigned positions in a thread based on language settings associated with the document-creating user's language settings.

Figure 13A:
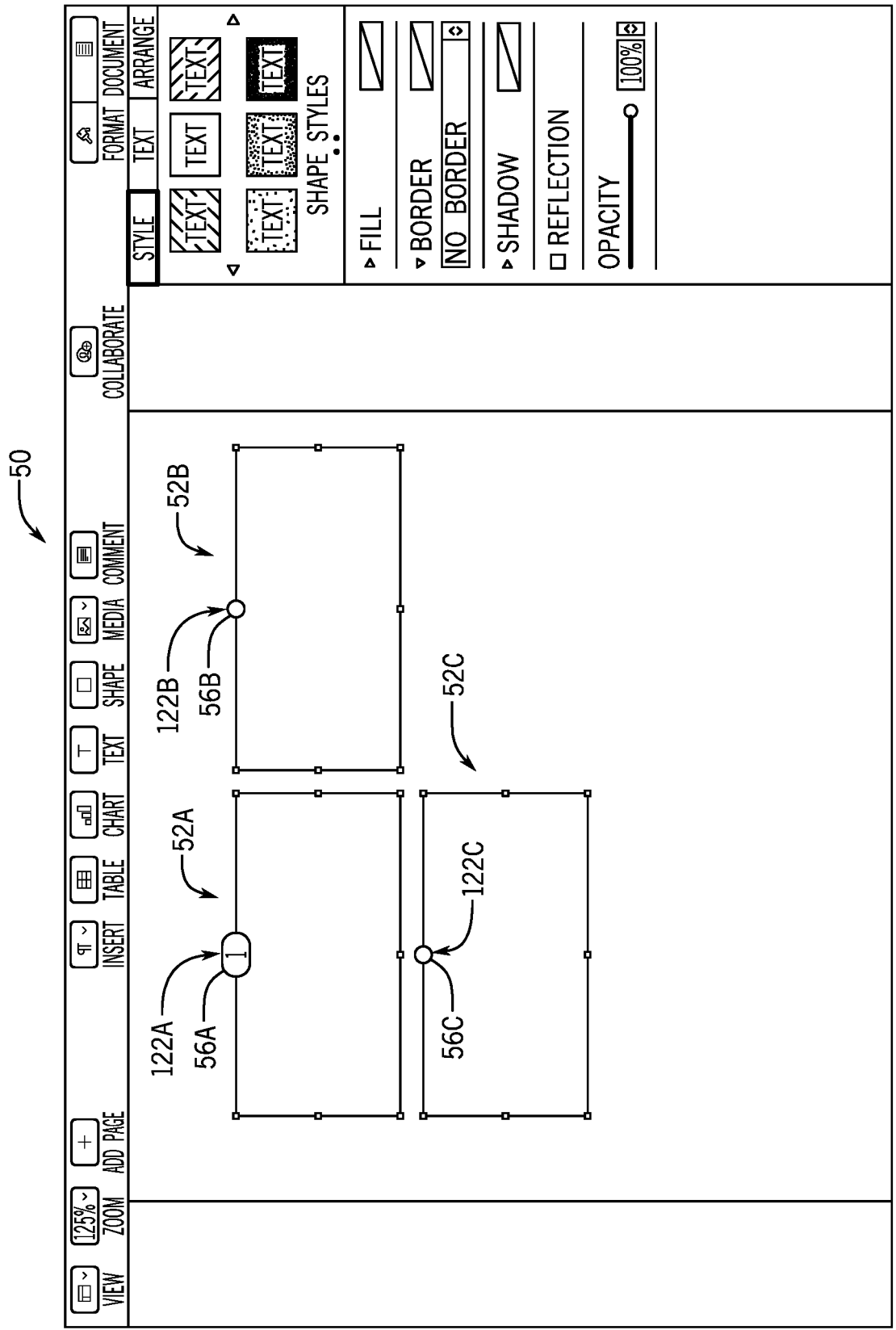
FIGS. 13A-13D illustrate determining and displaying positions of text boxes within a thread, according to embodiments of the present disclosure.
Figure 13B:
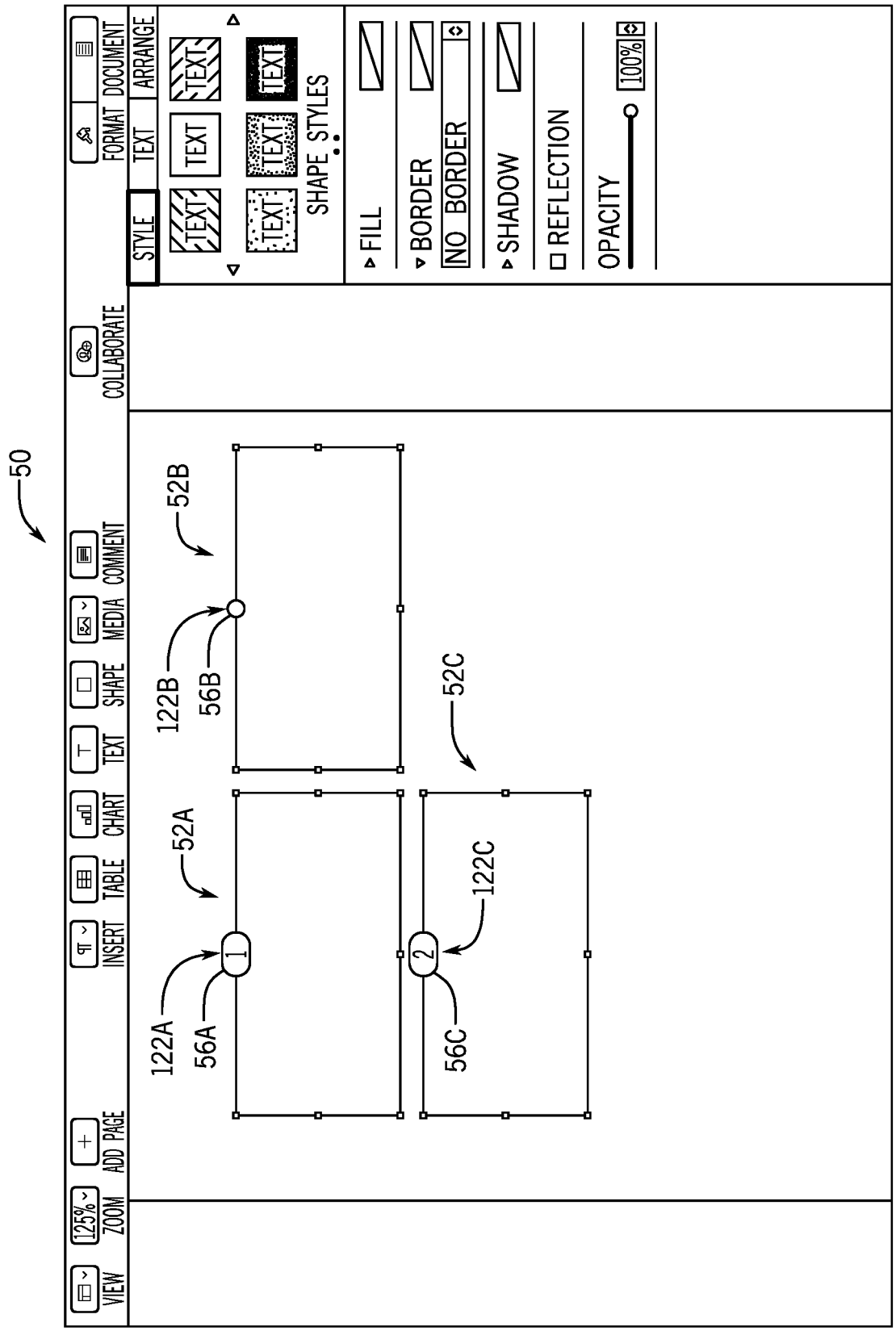

Keeping this in mind, FIGS. 13A-13D illustrate examples of determining and displaying positions (e.g., as indicated by selectable visual indicators 122) of text boxes 52 within a thread. For instance, FIG. 13A includes text boxes 52, of which, a first text box 52A is assigned to a thread (e.g., as indicated by selectable visual indicator 122A), while a second text box 52B and a third text box 52C are not included in a thread (e.g., as indicated by selectable visual indicators 122B and 122C, respectively). In FIG. 13B, the third text box 52C is added to the thread and, as indicated by the selectable visual indicator 122C, assigned to a second position in the thread. In this case, the processor core complex 12 may have determined that the order of the text boxes 52 within the thread based on the first text box 52A being located higher on the page than the third text box 52C.

Figure 13C:
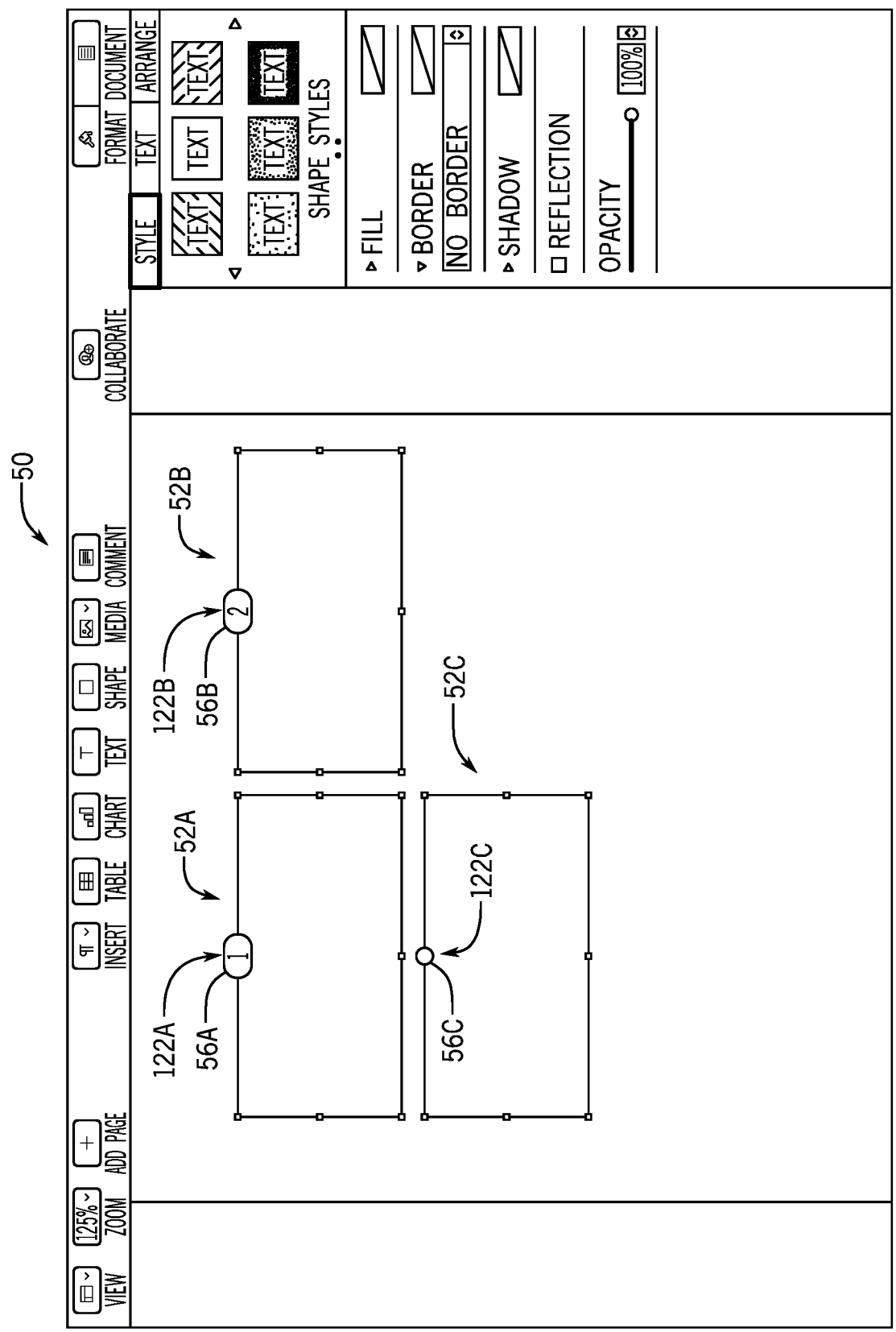

As another example, rather than adding the third text box 52C to the thread, the second text box 52B may be added to the thread, as illustrated in FIG. 13C. Similarly, the selectable visual indicator 122B indicates that the text box 52B has been assigned to a second position in the thread. In this case, the processor core complex 12 may have determined that the order of the text boxes 52 within the thread based on the first text box 52A being located to the left of the second text box 52B. In other words, the order of the text boxes 52 may be determine based on a left-to-right basis of the location of the text boxes 52.

Figure 13D:
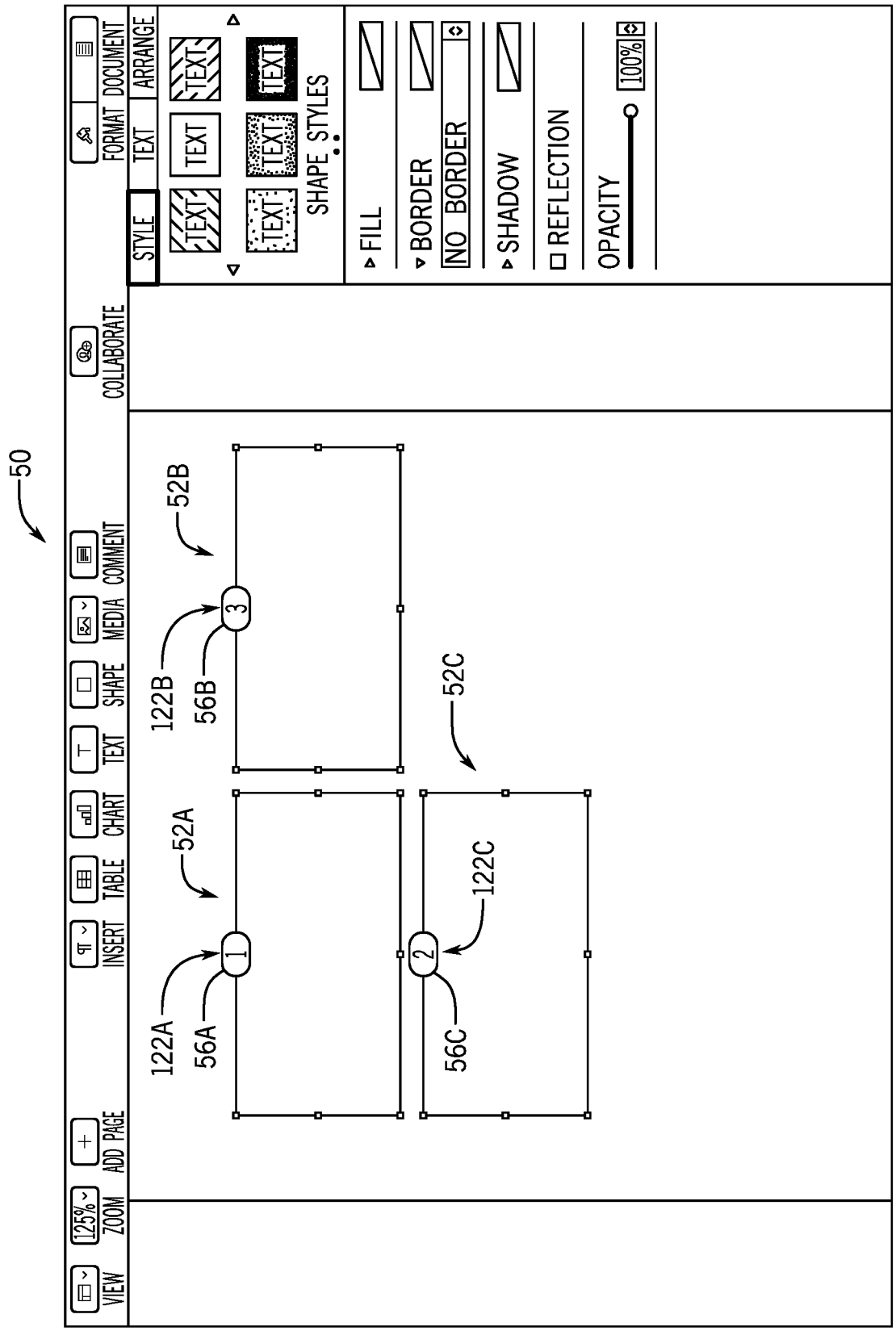

Turning now to FIG. 13D, which illustrates all three text boxes 52 having been added to the thread. As indicated by the selectable visual indicators 122, the text boxes 52 have been assigned to the thread in a descending order of the first text box 52A, the third text box 52C, and the second text box 52B. It should be noted that the illustrated result is obtained regardless of which text box is added to the thread second. In other words, the order in which the text boxes 52 are added to the thread would not affect the positions determined by the processor core complex 12 and indicated by the selectable visual indicators 122. In this case, the processor core complex 12 may have determined the order of the text boxes 52 within the thread on a left-to-right and a top-to-bottom basis. In some cases, one of the left-to-right or top-to-bottom bases may be favored over the other in determining an order of text boxes within a thread. For instance, in the illustrated embodiment, the third text box 52C may have been assigned to the second position in the thread because the first text box 52A and the third text boxes 52C are generally aligned in a column. For example, in the illustrated embodiment, the processor core complex 12 may have determined that the application program and/or electronic device is associated with the English language or a country in which English is spoken. In such a case, text in the text boxes 52 would be entered left-to-right and top-to-bottom. That is, as text fills a line (e.g., a row) within a text box 52, text will continue to appear on a lower line. As discussed below, when text boxes 52 are included in the same thread, text from a text box 52 may flow into another text box 52 of the same thread with a subsequent position in the thread. As such, by ordering the text boxes 52 in the manner illustrated in FIG. 13D, as one reads text on the page, it would be similar to reading a column of text, such as a newspaper column.

It should be noted that, when the processor core complex 12 determines a different language or locale, the ordering of the text boxes may differ than those illustrated in FIGS. 13B-13D. For example, for languages written and read right-to left, the second text box 52B may be assigned to the first position in the thread, and the first text box 52A and the third text box 52C may be assigned to positions after the first position.

As mentioned above, text boxes may be removed from threads. When text boxes 52 are removed from a thread, the processor core complex 12 may determine a position for each of the remaining text boxes 52 in the same manner as discussed above. For instance, with reference to FIG. 13D, if a user were to enter input to remove the third text box 52C from the thread, the result may be what is illustrated in FIG. 13C. That is, the second text box 52 may be assigned to the second position in the thread, and the third text box 52C may not be in the thread.

Furthermore, in some embodiments, upon receiving user input indicative of a request to move a text box 52 within a page of the application program 50, the position of the text box 52 and the other text boxes 52 of the same thread as the text box 52 may be modified based upon the location to which the text box 52 is moved. For example, referring to FIG. 13D, if input were received to move the text box 52A to the bottom of the page, the first text box 52A may assigned to the fourth position in the thread, and the text boxes 52B, 52C, 52D may respectively be assigned to the first, second, and third positions in the thread. Additionally, as discussed below, any text included text boxes 52 may be rearranged within the text boxes 52A-52D so that the text still appears in the same order within the thread (e.g., from a text box 52 with the first position in the thread to each subsequent text box 52 in the thread).

Figure 14:
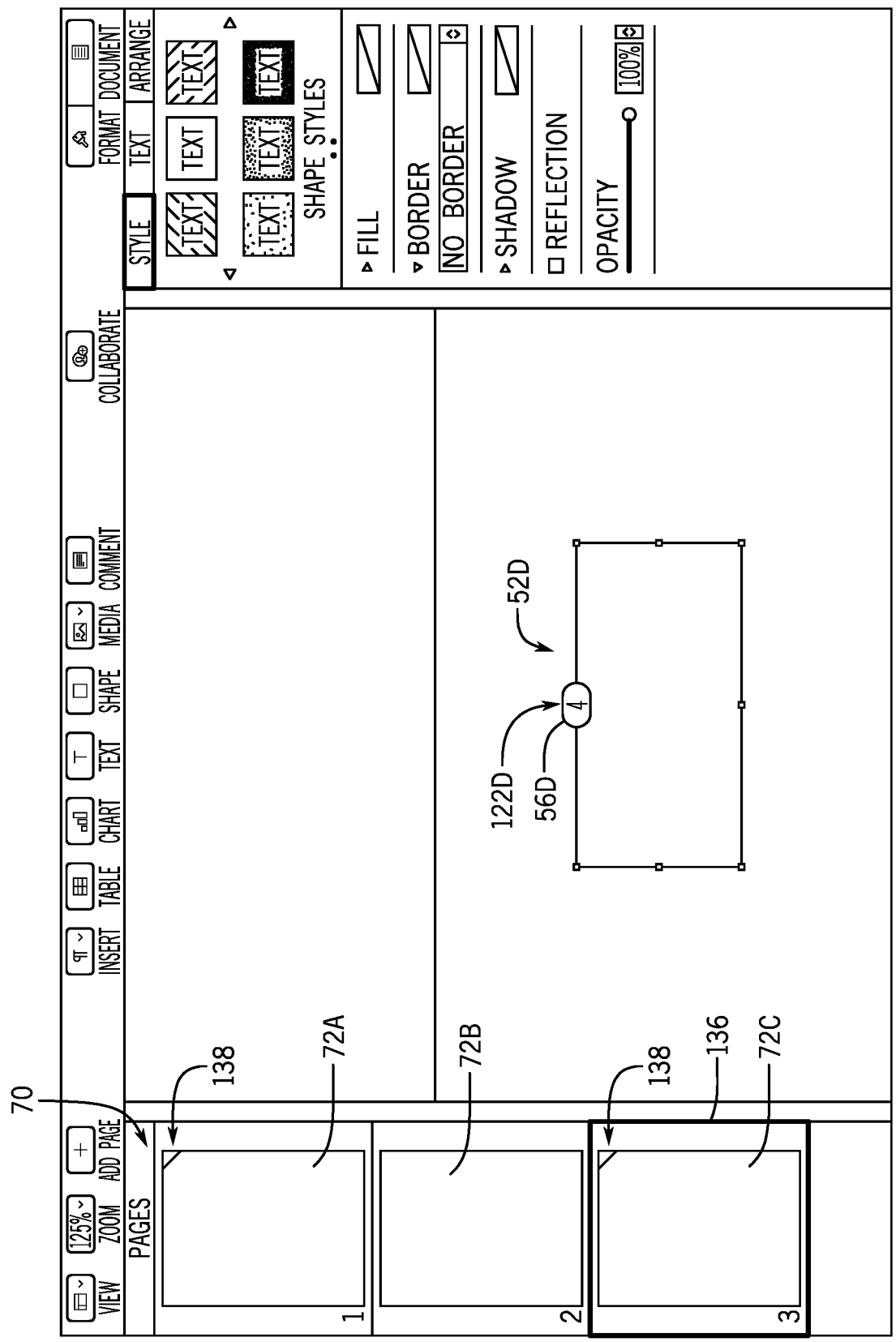
FIG. 14 illustrates a text box that is on a different page of a document than other text boxes that are in the same thread as the text box, according to embodiments of the present disclosure.

Moreover, it should be noted that the position of a text box 52 within a thread may be based on which page of a document in the application program 50 the text box 52 exists. For example, the text boxes 52 within a thread on one page may be assigned to positions in a thread with lower number value positions than text boxes 52 in the same thread that are present on subsequent pages. For example, FIG. 14 illustrates a fourth text box 52D that is present on a third page of the same document as text boxes 52A, 52B, and 52C and also included in the same thread as text boxes 52A, 52B, and 52C. As indicated by the selectable visual indicator 122D, the fourth text box 52D has been assigned to a fourth position in the thread.

As also illustrated in FIG. 14, an indication may be provided in the thumbnail panel 70 that are indicative of a page of a document on which is being viewed or on which content has been selected by a user. For instance, the thumbnail panel 70 includes a first thumbnail 72A associated with a first page in the document, a second thumbnail 72B associated with a second page in the document, and a third thumbnail 72C associated with a third thumbnail in the document. A page indicator 136 indicates that the page being displayed or edited is the third page. Additionally, when more than one page is displayed, the page indicator 136 may be indicative of the page of which more is displayed in comparison to another page being displayed.

Furthermore, a common thread indicator 138 is also provided in the first and third thumbnails 72A and 72C. The common thread indicator 138 appears in each thumbnail 72 of a page that includes a text box 52 in a thread that is either selected or being edited by a user. For example, when the fourth text box 52D is selected, the common thread indicator 138 is provided in the first and third thumbnails 72A and 72C, indicating that there is at least one text box in the same thread as the fourth text box 52D present on the first and third page of the document in the application program 50. It should also be noted that the common thread indicator 138 may be the same color as the color indication provided by the selectable visual indicator 122. Additionally, it should be noted that when more than one thread exists, if a user were to select a text box in another thread, the common thread indicator 138 would be displayed on the page or pages that include text boxes in the other thread, and the common thread indicator 138 may become a color associated with the other thread.

Figure 15A:
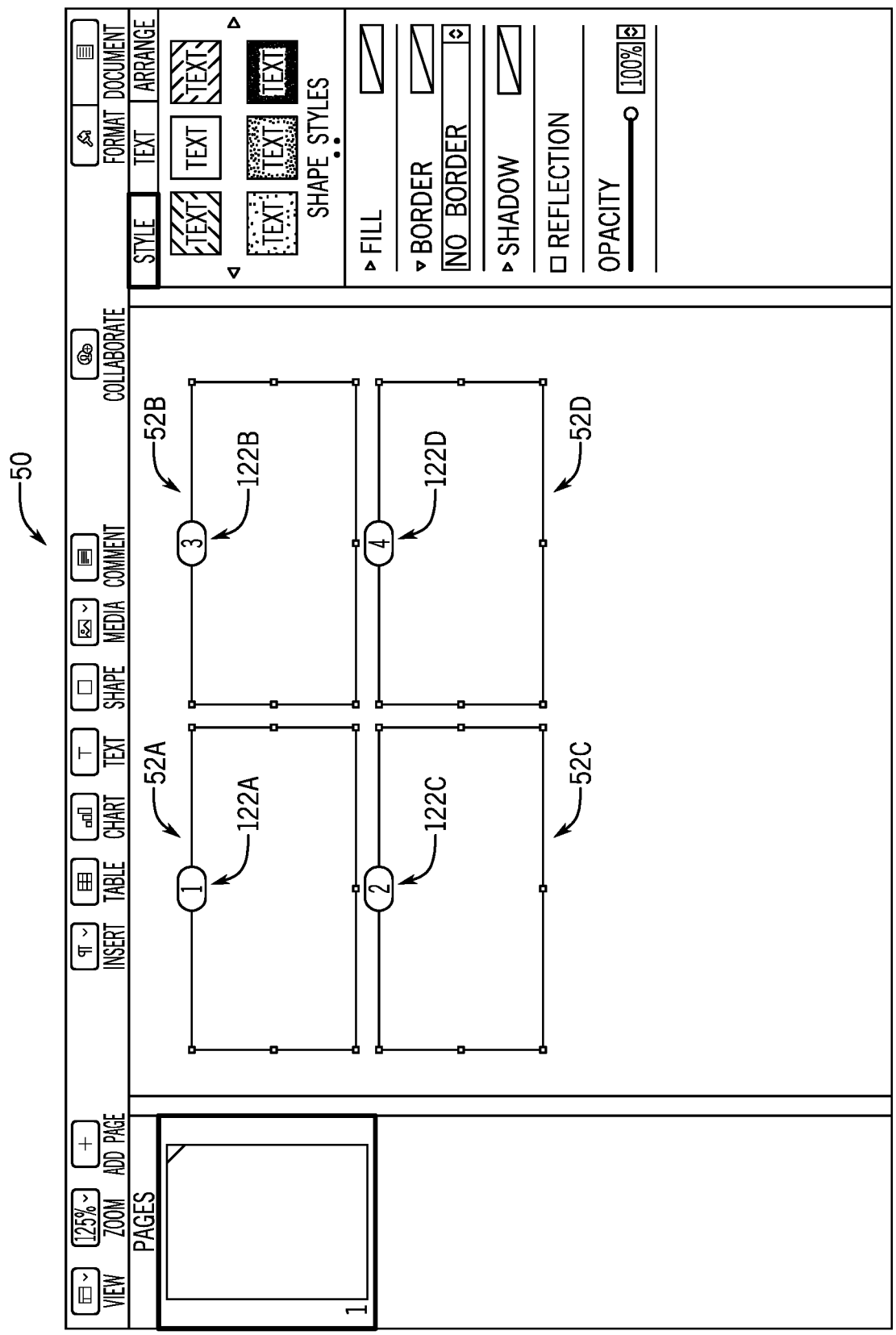
FIGS. 15A-15G illustrate assigning text boxes to threads, according to embodiments of the present disclosure.

As noted above, multiple threads may be found in a document. Indeed, in some cases, multiple threads may be present on the same page of a document. Keeping this in mind, FIGS. 15A-15G illustrate assigning text boxes 52 to threads. In particular, FIG. 15A illustrates four text boxes 52, which include a first text box 52A, a second text box 52B, a third text box 52C, and a fourth text box 52D. As indicated by the selectable visual indicators 122, each of the text boxes 52 is included in the same thread.

Figure 15B:
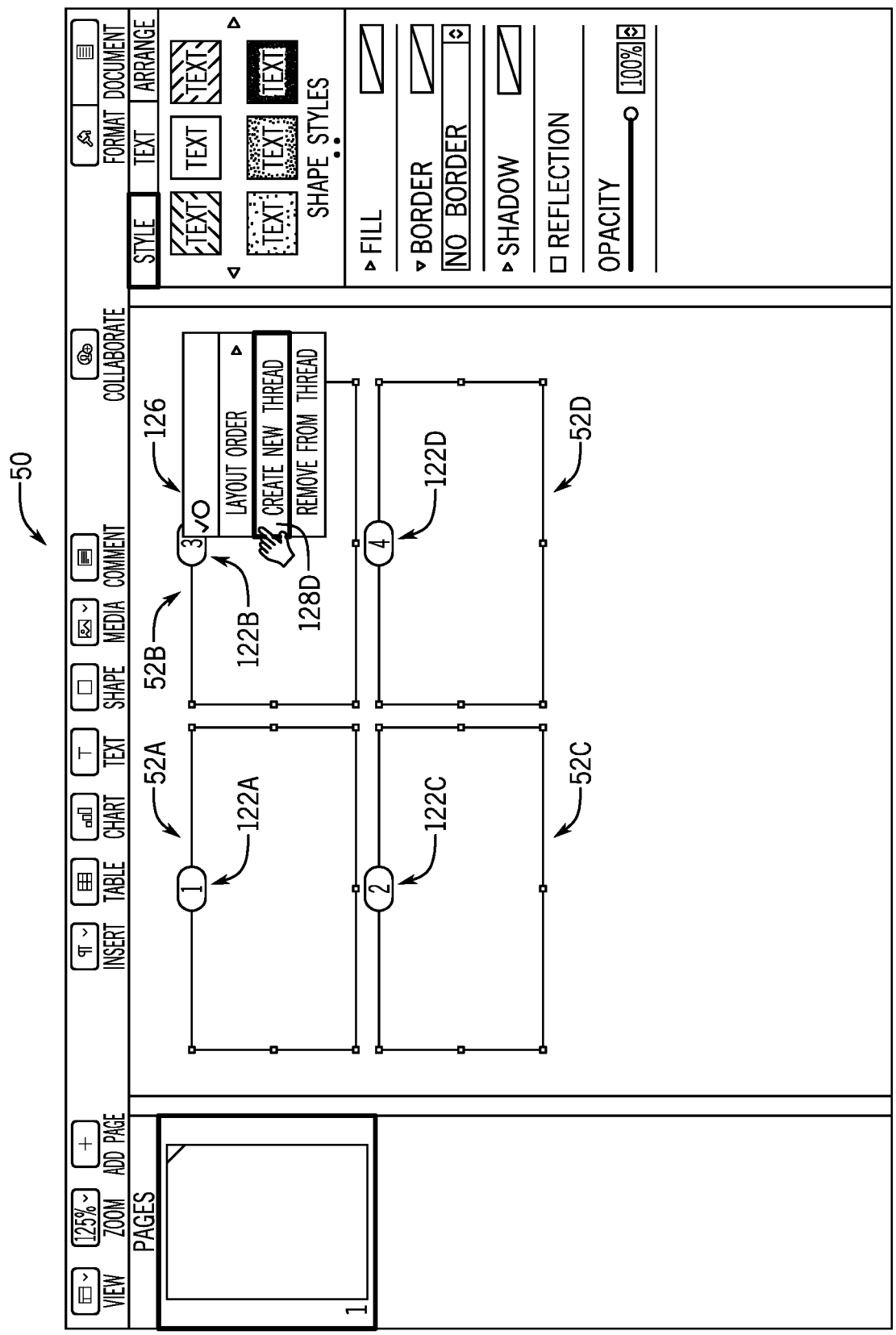

As discussed above, a user may select one of the selectable visual indicators 122 to assign a text box 52 to another thread. For example, as illustrated in FIG. 15B, upon selection of a selectable visual indicator 122B, a menu 126 may be presented, and the menu 126 may include a new thread option 128D. Upon detection of a user selection of the new thread option 128D, the processor core complex 12 may assign a text box 52 to a new thread. More specifically, a text box 52 may be removed from one thread, a new thread may be generated, and the text box 52 may be added to the new thread.

Figure 15C:
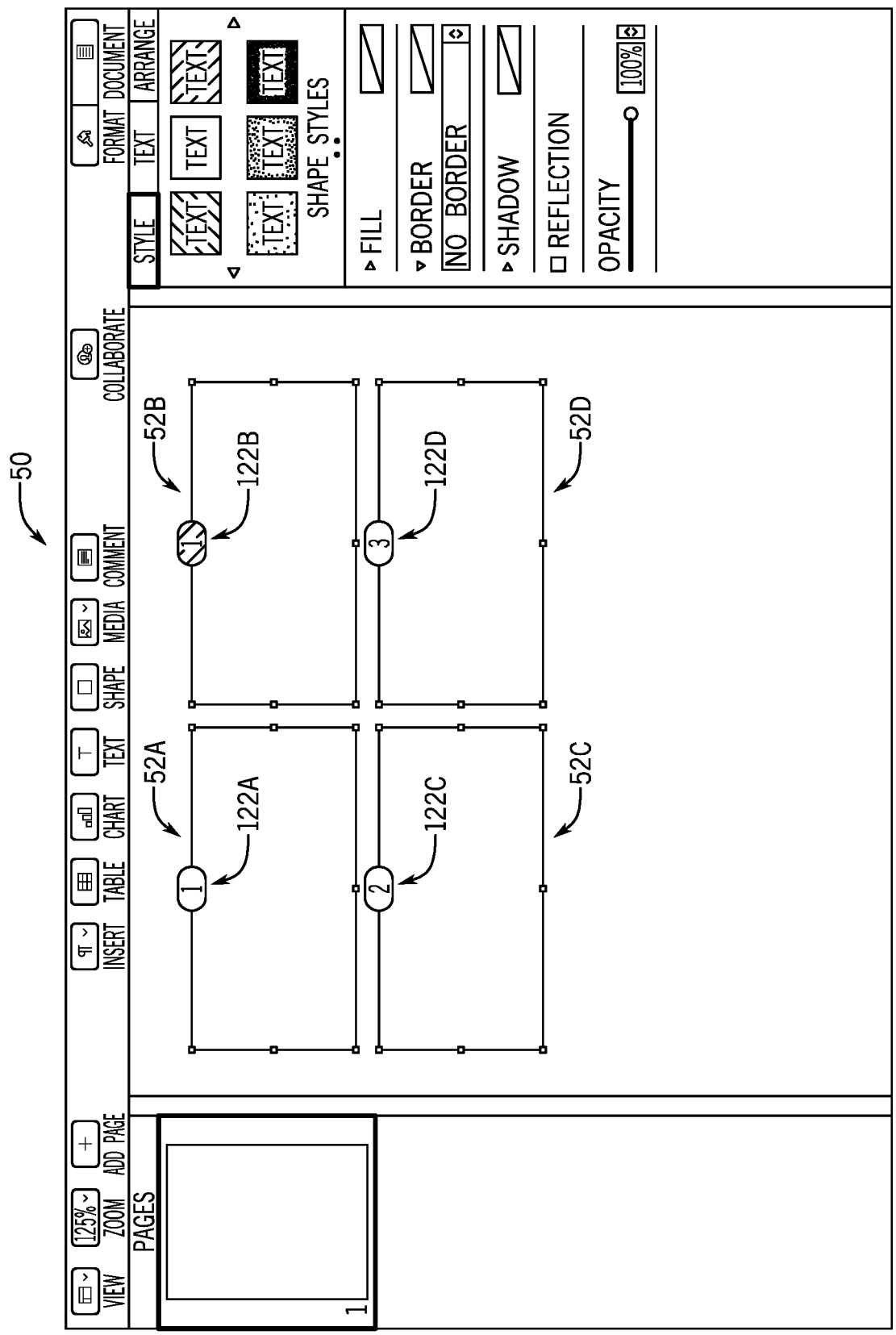

FIG. 15C illustrates the text boxes 52 after selection of the new thread option 128D. As illustrated, the first text box 52A, third text box 52C, and fourth text box 52D are included in the same thread (e.g., a first thread). However, the second text box 52B has been removed from the first thread and added to a second thread. That the second text box 52B has been removed from the first thread and added to a second thread is indicated by the selectable visual indicator 122B, which is of a different color than the selectable visual indicators 122A, 122C, and 122D. Additionally, the selectable visual indicator 122B has been assigned to the first position in the second thread.

Figure 15D:
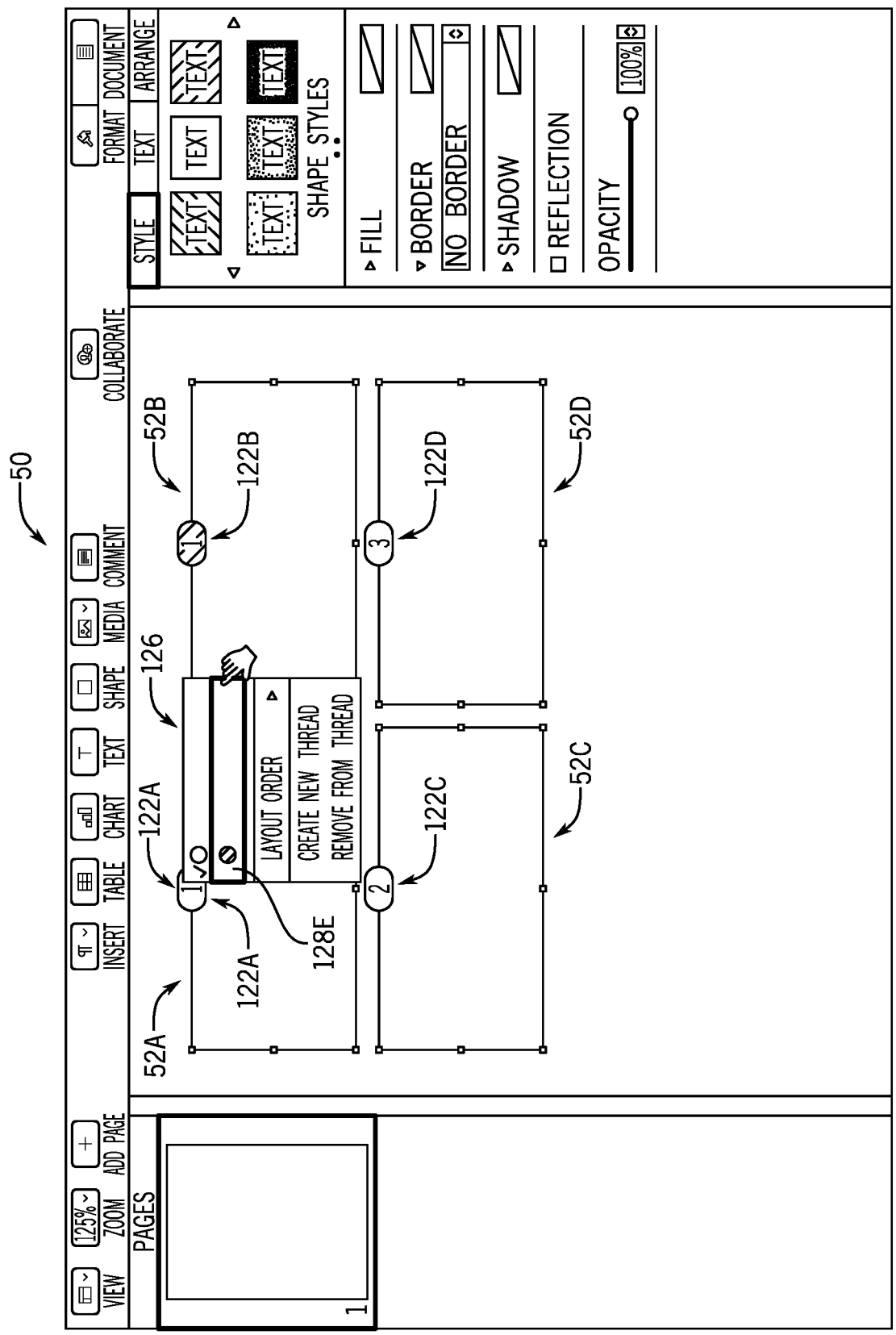
Figure 15E:
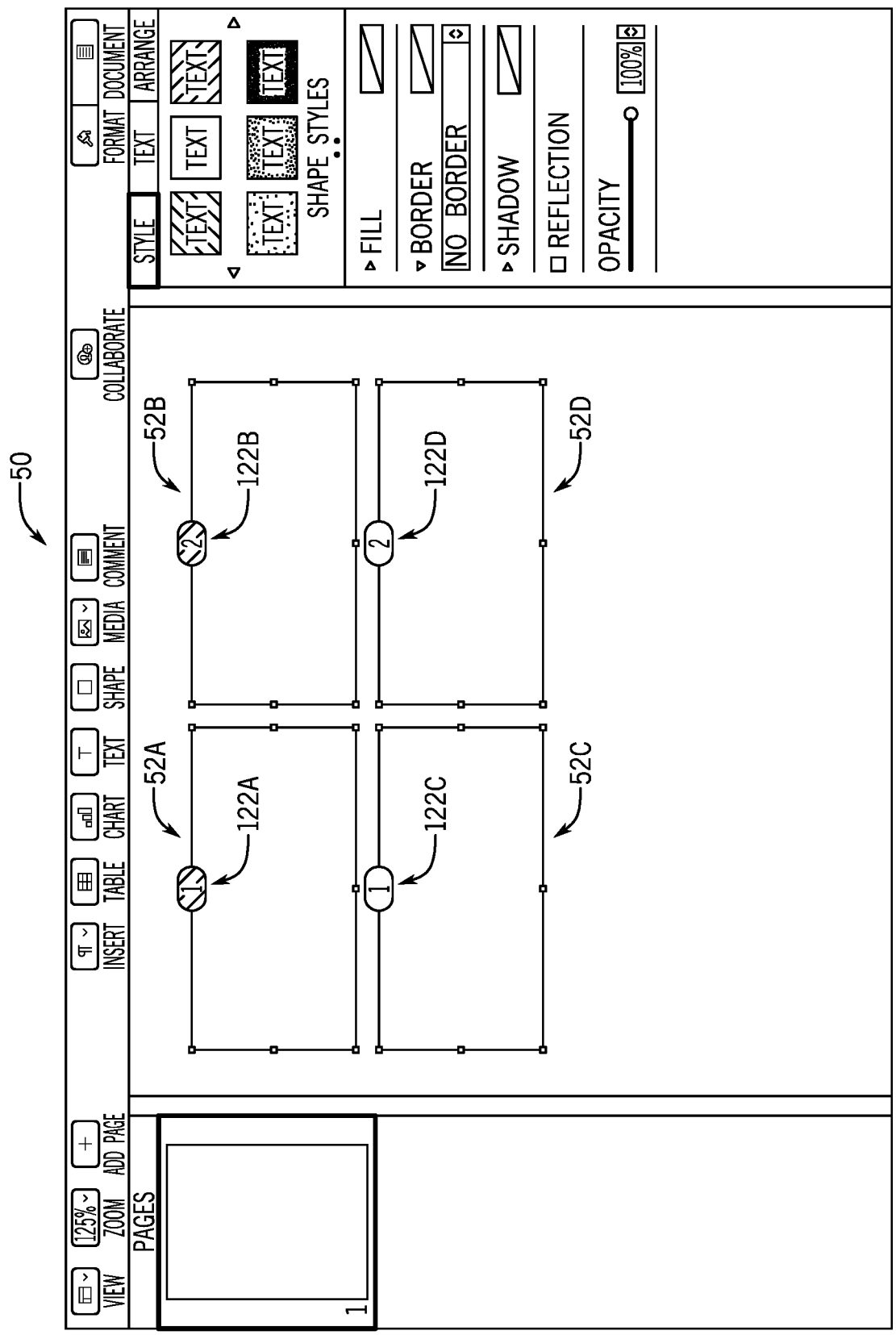

When more than one thread exists, a text box may be moved from one thread to another, already existing thread. For instance, FIG. 15D illustrates that the menu 126 may include a thread option 128E, which when selected by a user, causes a text box 52 to be added to an already existing thread. For example, upon detecting a user selection of the thread option 128E, the processor core complex 12 may cause the first text box 52A to be removed from the first thread and added to the second thread. Indeed, FIG. 15E illustrates this. As shown in FIG. 15E, the first text box 52A and second text box 52B are included in the second thread, and the third text box 52C and fourth text box 54D are included in the second thread.

Figure 15F:
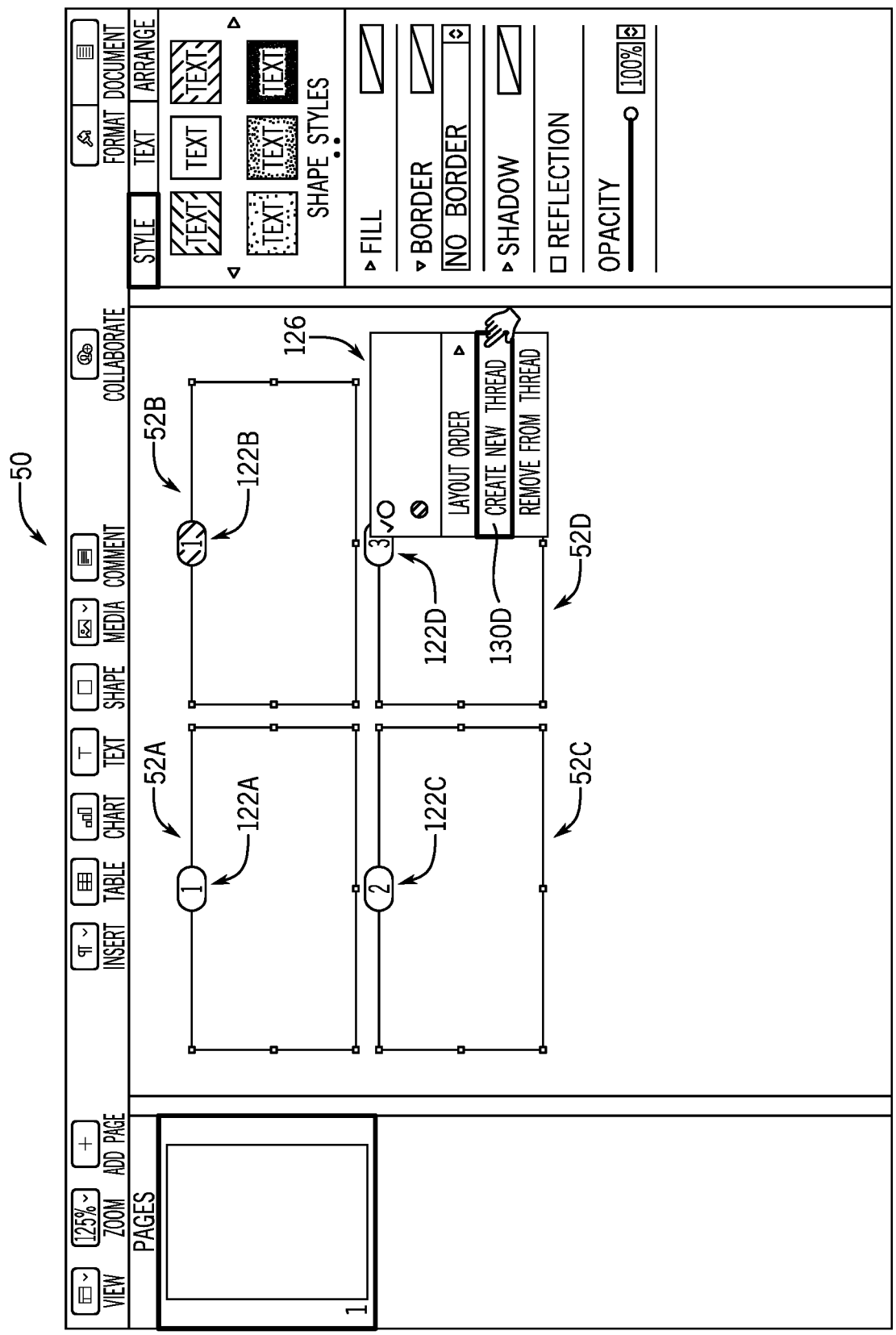
Figure 15G:
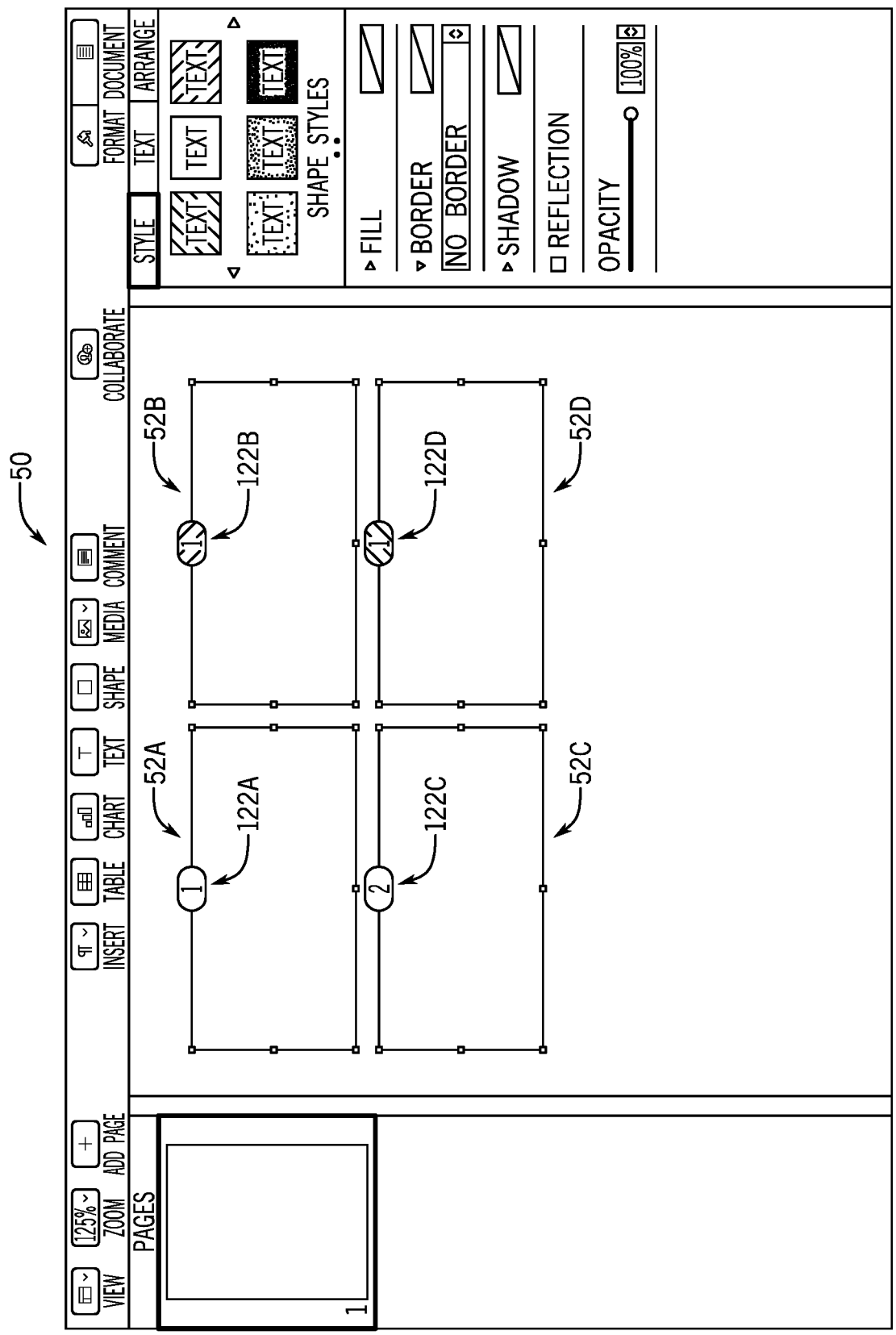

Returning to FIG. 15C, it should be noted that more than two threads may be present on the same page. More specifically, in some embodiments, each text box 52 may be included in a different thread. That is, there may be as many threads as there are text boxes 52. For instance, as illustrated in FIG. 15F, a user may select the selectable visual indicator 122D to open the menu 126 in order to select the new thread option 128D. As illustrated in FIG. 15G, upon selection of the new thread option 128D, the fourth text box 52D may be assigned to a third thread.

Figure 16A:
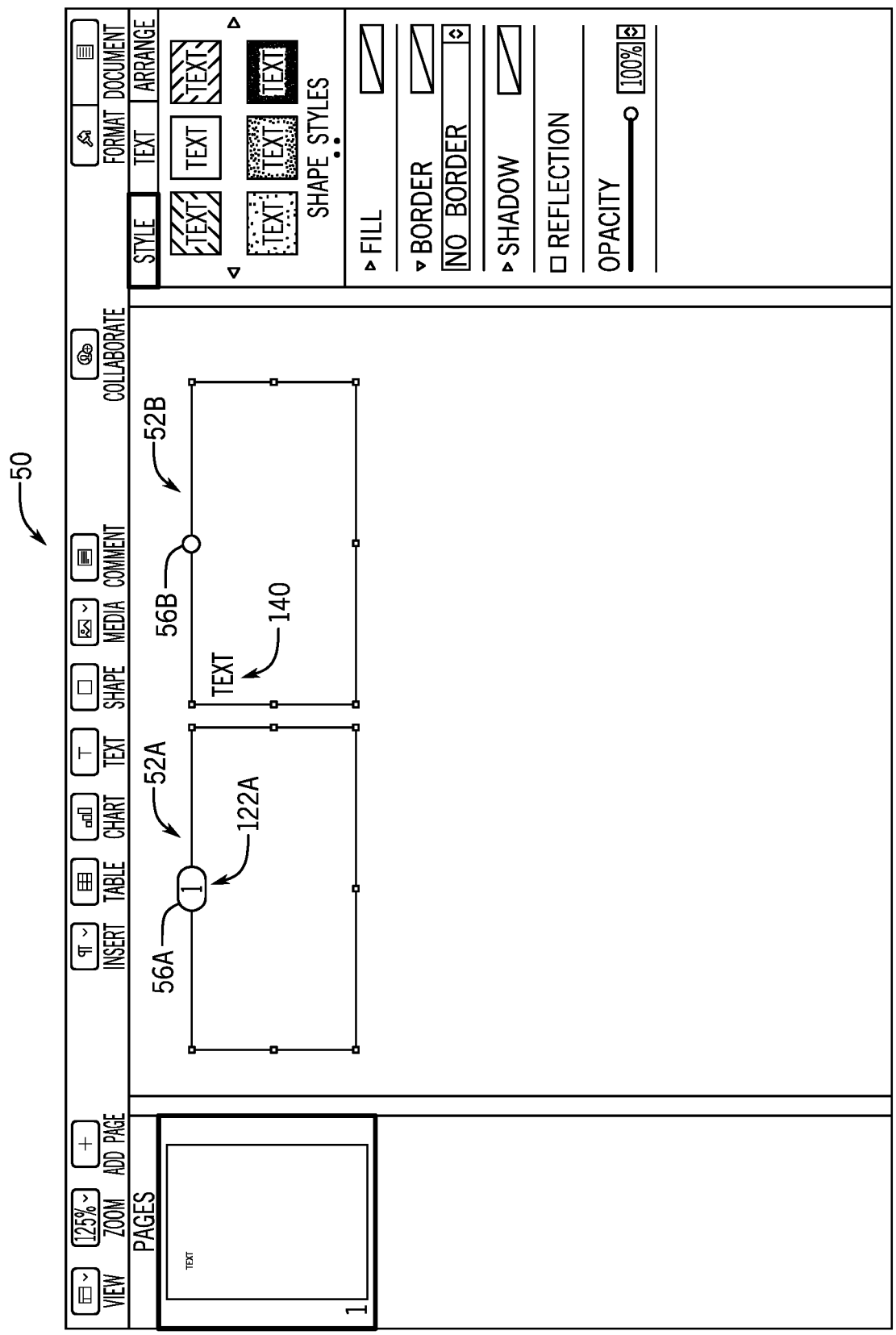
FIGS. 16A-16C illustrate assigning a text box to a thread when the text box already includes text, according to embodiments of the present disclosure.
Figure 16B:
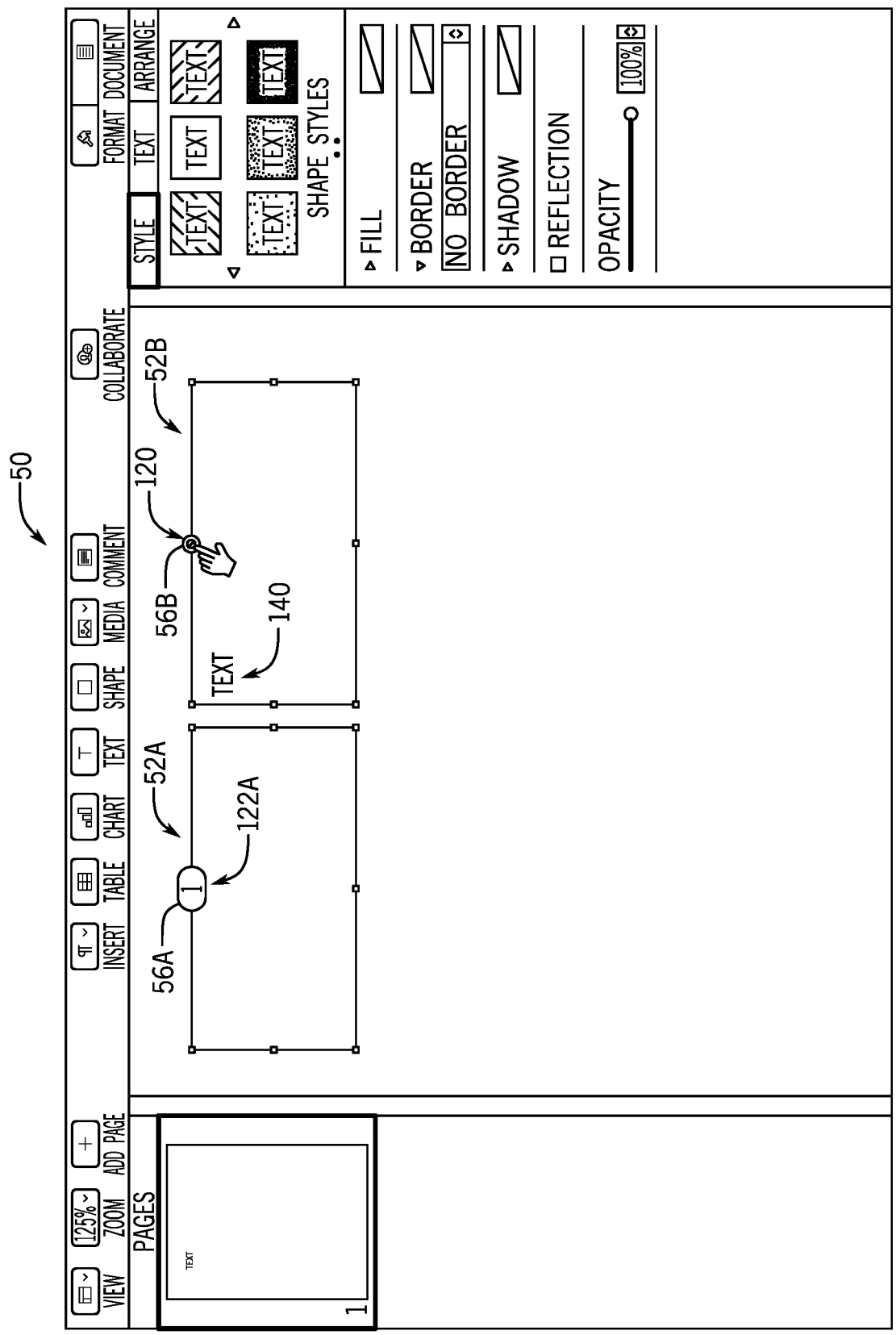
Figure 16C:
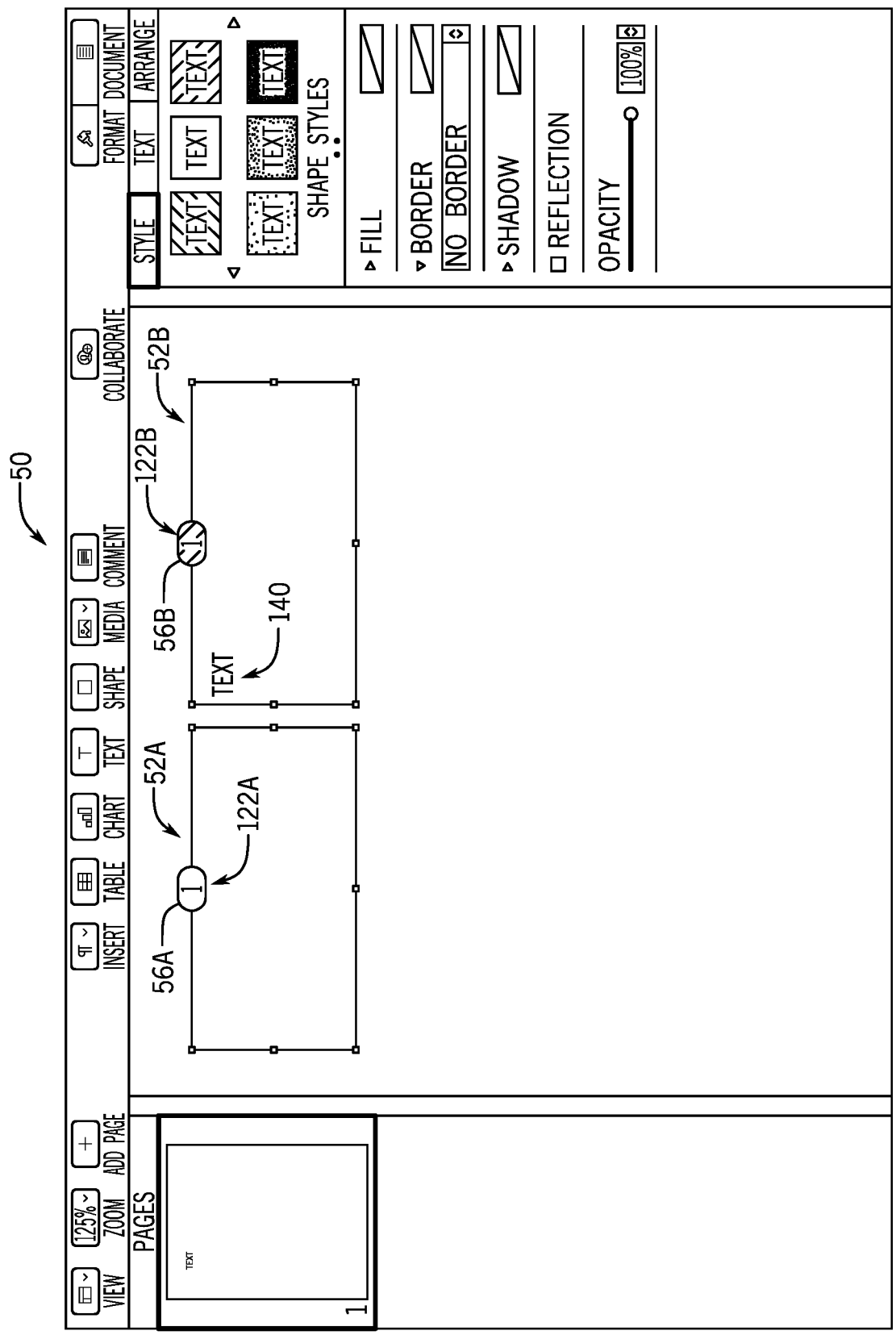

Furthermore, when text is added to a text box 52 before the text box 52 is added to a thread, the processor core complex 12, upon receiving user input indicative of a selection to add the text box 52 to a thread, may add the text box 52 to a new thread. Keeping this in mind, FIGS. 16A-16C illustrate assigning a text box 52B to a thread when the text box 52B already includes text before being assigned to a thread. In particular, FIG. 16A includes a first text box 52A that, as indicated by a selectable visual indicator 122A, is assigned to a thread. In addition to the first text box 52A, FIG. 16A includes a second text box 52B that, as indicated by a linking affordance 56B, is not assigned to a thread. Moreover, the second text box 52B includes text 140.

Turning now to FIG. 16B, in response to detecting user input indicative of hovering over the linking affordance 56B, the processor core complex 12 may cause an indication 120 of a thread to which the second text box 52B will be assigned if the linking affordance 56B is selected to be displayed. Additionally, because when a text box 52 already includes text when assigned to a thread, the indication 120 may include a color different than an already existing thread, such a color associated with the thread in which the first text box 52A is included.

Continuing to FIG. 16C, upon detecting a user selection of the linking affordance 56B, the processor core complex 12 may assign the second text box 52B to a new thread. That is, the processor core complex 12 may create a new thread, assign the text box 52B to the new thread, and provide a selectable visual indicator 122B indicative of the second text box 52B having been assigned to a new thread.

However, it should be noted that, in other embodiments, text boxes 52 that include text may be assigned to threads differently than as described above. For example, in some embodiments, a text box 52 may be assigned based on the last thread edited. For instance, if a user adds text to a text box 52 and then provides input to assign the text box 52 to a thread (e.g., by selecting the linking affordance 56 of the text box 52), the thread to which the text box 52 is assigned may be the thread associated with another text box 52 selected or edited by the user before indicating to add the text box 52 with text to a thread.

Displaying Text Based on a Position of a Text Box in a Thread

Figure 17:
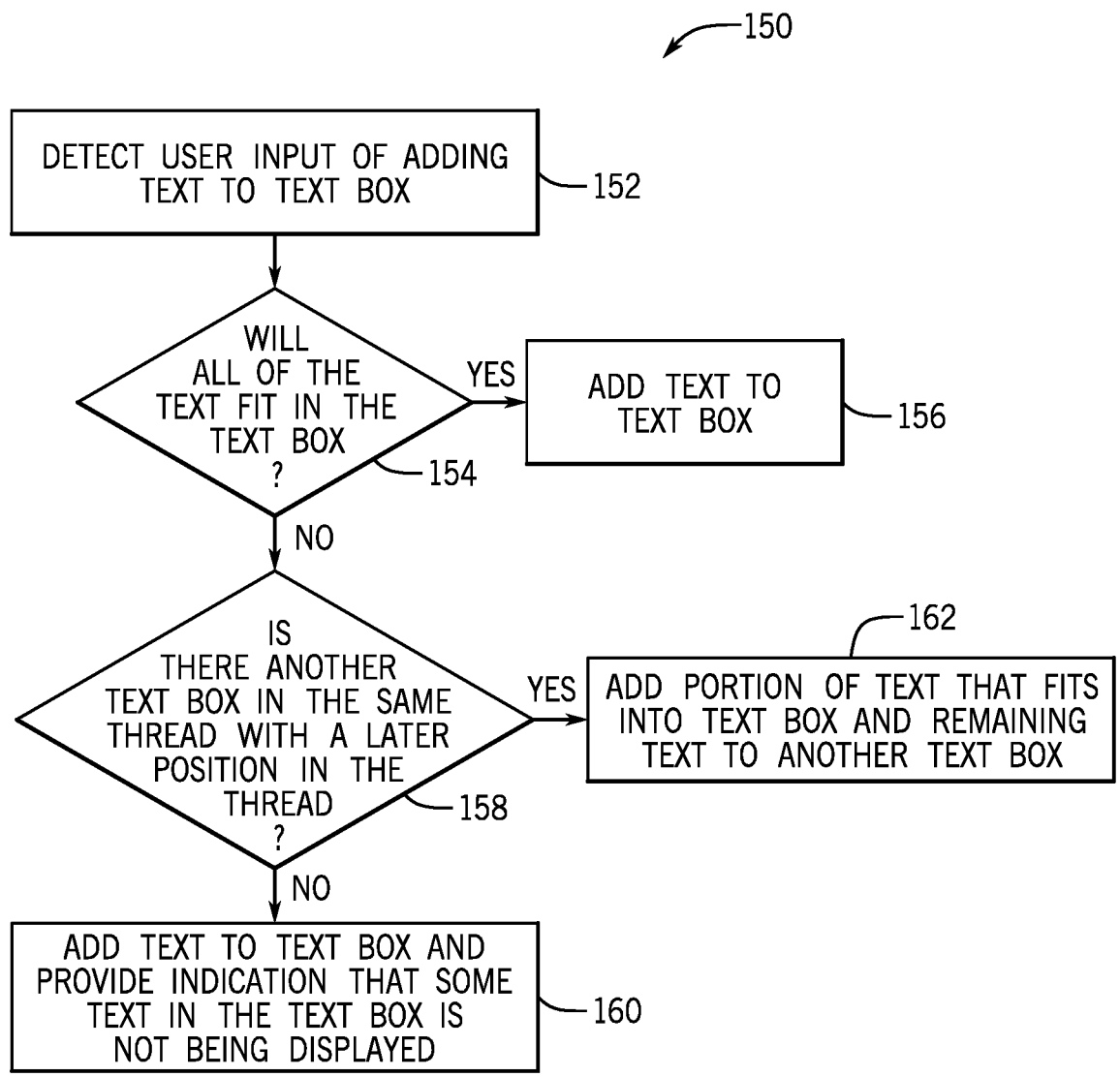
FIG. 17 is a flow diagram of a method a process for displaying text associated with linked text boxes, according to embodiments of the present disclosure.

Text entered into linked text boxes 52 (e.g., text boxes 52 of the same thread) may be displayed into the text boxes 52. More specifically, as text begins to fill the space of one text box 52 in a thread, the text may be presented in another text box 52 of the same thread. With this in mind, FIG. 17 is a flow diagram of a process 150 for displaying text associated with linked text boxes 52. The process 150 may be in the form of an application program (e.g., the application program 50) that includes instructions that are executed by at least one suitable processor of a computer system, such as the processor core complex 12 of the electronic device 10. The illustrated process 150 is merely provided as an example, and in other embodiments, certain illustrated steps of the process 150 may be performed in other orders, skipped, or repeated, according to embodiments of the present disclosure.

Figure 18A:
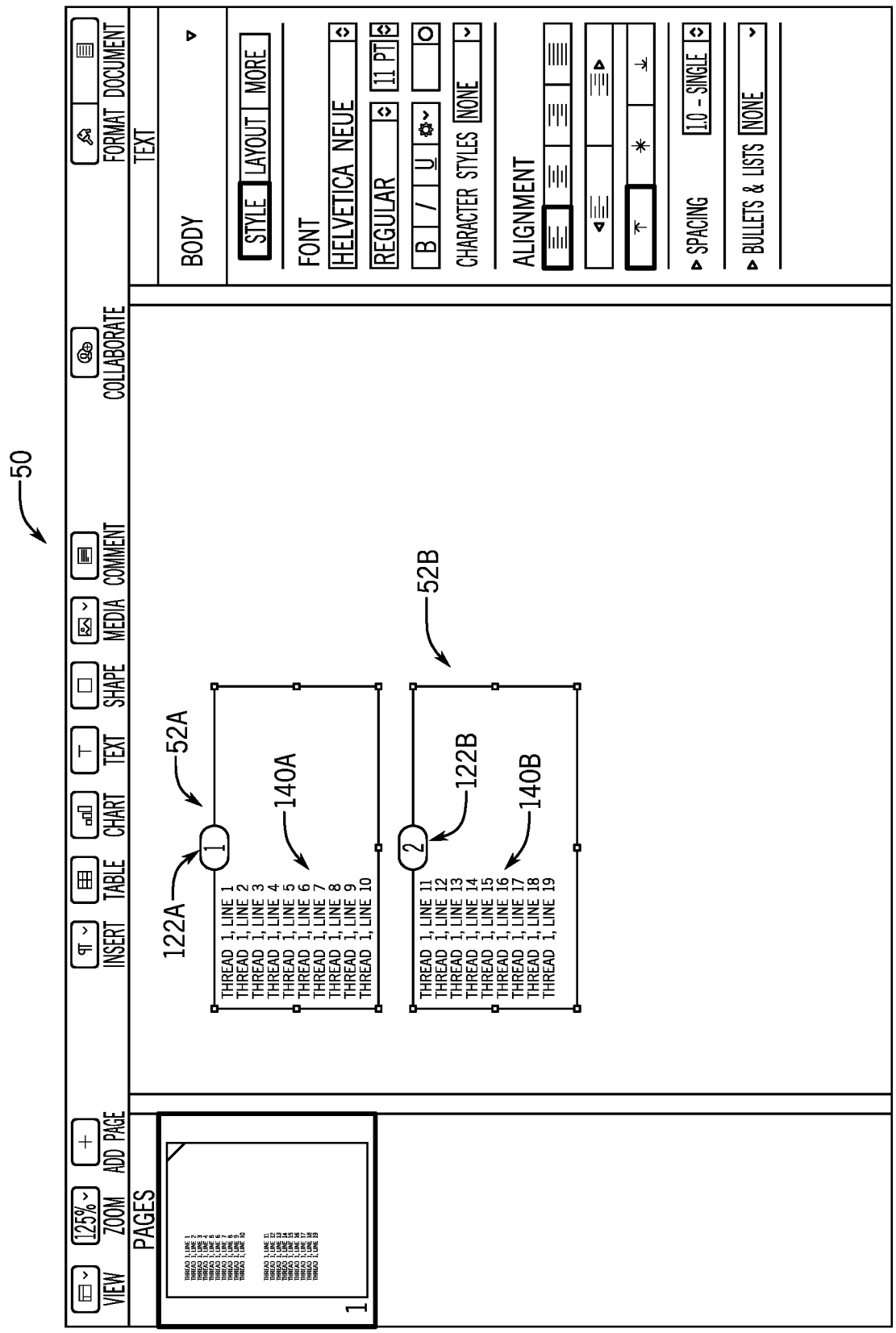
FIGS. 18A-18F illustrate how text may be displayed in linked text boxes, according to embodiments of the present disclosure.
Figure 18B:
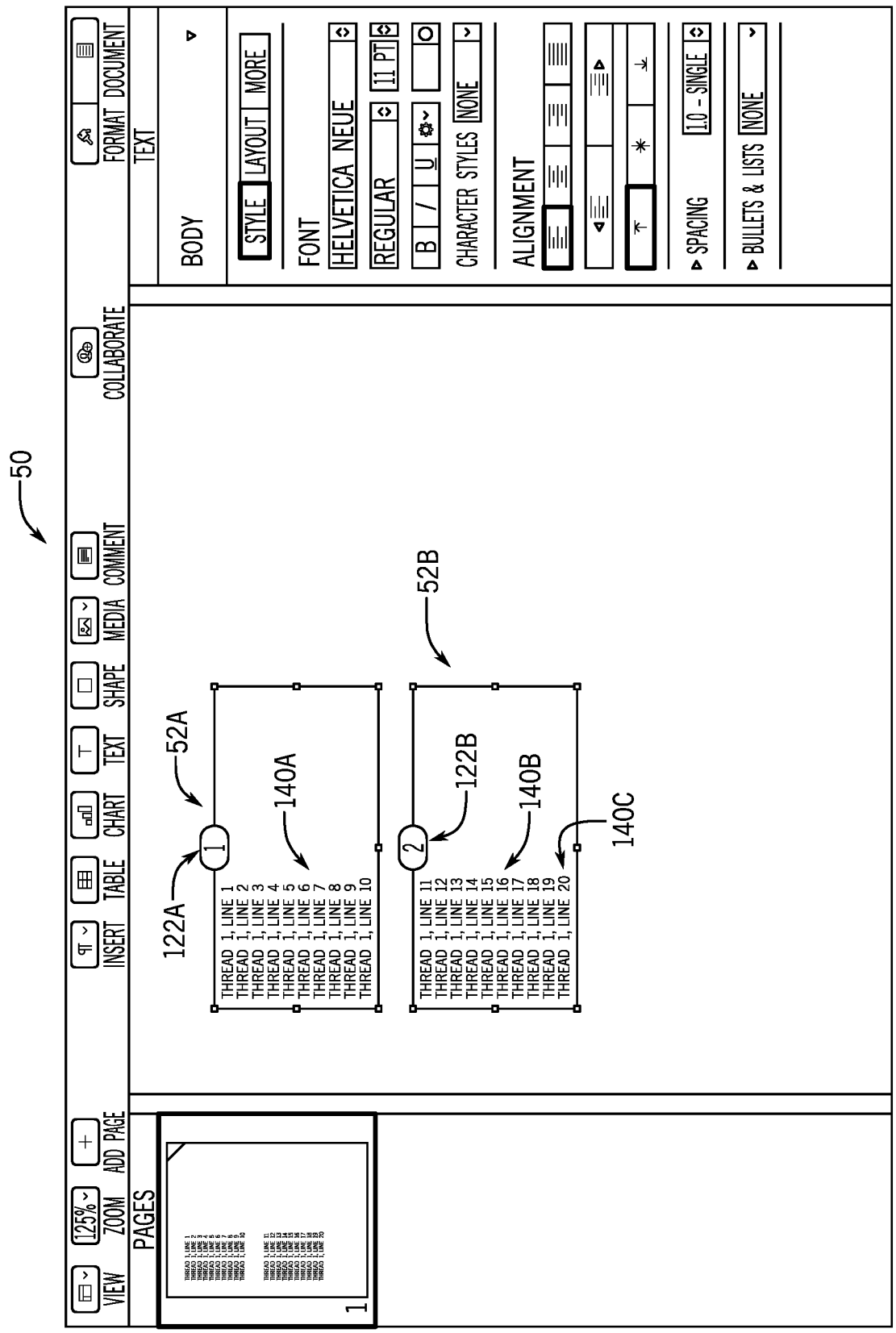

At process block 152, the processor core complex 12 may detect user input of adding text to a text box 52. For example, a user may use input devices 22 to enter text. At decision block 154, the processor core complex 12 may determine whether all of the text will fit into the text box 52. If the processor core complex 12 determines that all of the text will fit into the text box 52, at process block 156, the processor core complex 12 will cause the text to be added to the text box 52. In other words, when all of the text will fit into a text box 52, the processor core complex 12 may cause the text to be displayed within the text box 52. For example, FIGS. 18A-18F illustrate how text may be displayed in linked text boxes 52. In particular, FIG. 18A includes a first text box 52A and a second text box 52B that are included in the same thread as one another. Text 140A is included in the first text box 52A, and text 140B is included in the second text box 52B. Turning now to FIG. 18B, text 140C has been added to the second text box 52B. In other words, the processor core complex 12 may have detected user input indicative of adding the text 140C and determined that that all of the text 140C would fit within the second text box 52B.

Figure 18C:
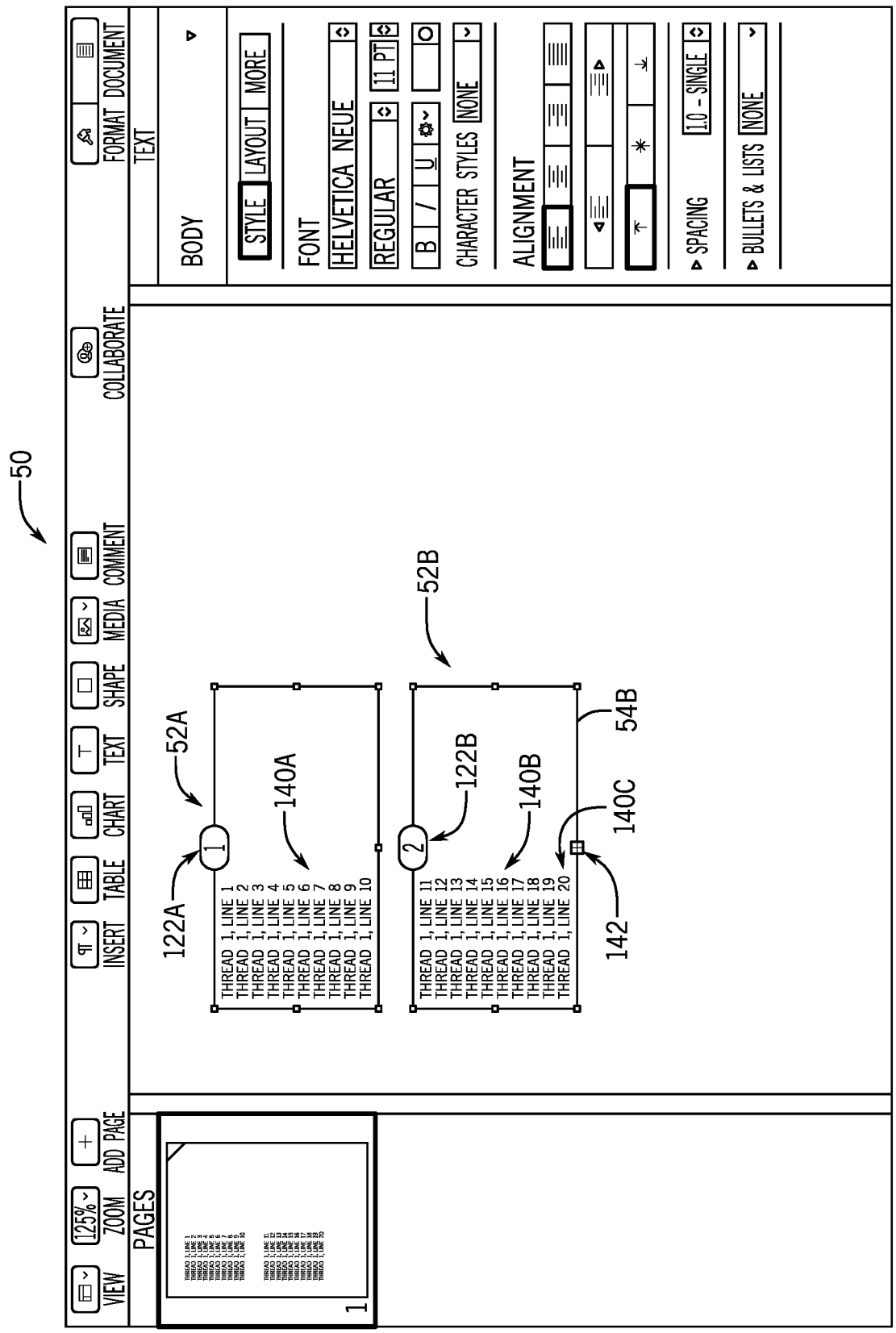

Turning back to FIG. 17, if the processor core complex 12 determines that all of the text will not fit into the text box 52, at decision block 158, the processor core complex 12 may determine whether there is another text box 52 at a later position in the same thread as the text box into which the user inputted text. If the processor core complex 12 determines that there is not another text box 52 at a later position in the same thread as the text box into which the user inputted text, at process block 160, the processor core complex 12 may add the text to the text box and provide an indication that some of the text in the text box is not being displayed. For instance, FIG. 18C illustrates that a text overflow indicator 142 may be included as part of a bounding edge 54B of the second text box 52B and indicate that the second text box 52B includes text 140 that is not being displayed.

Figure 18D:
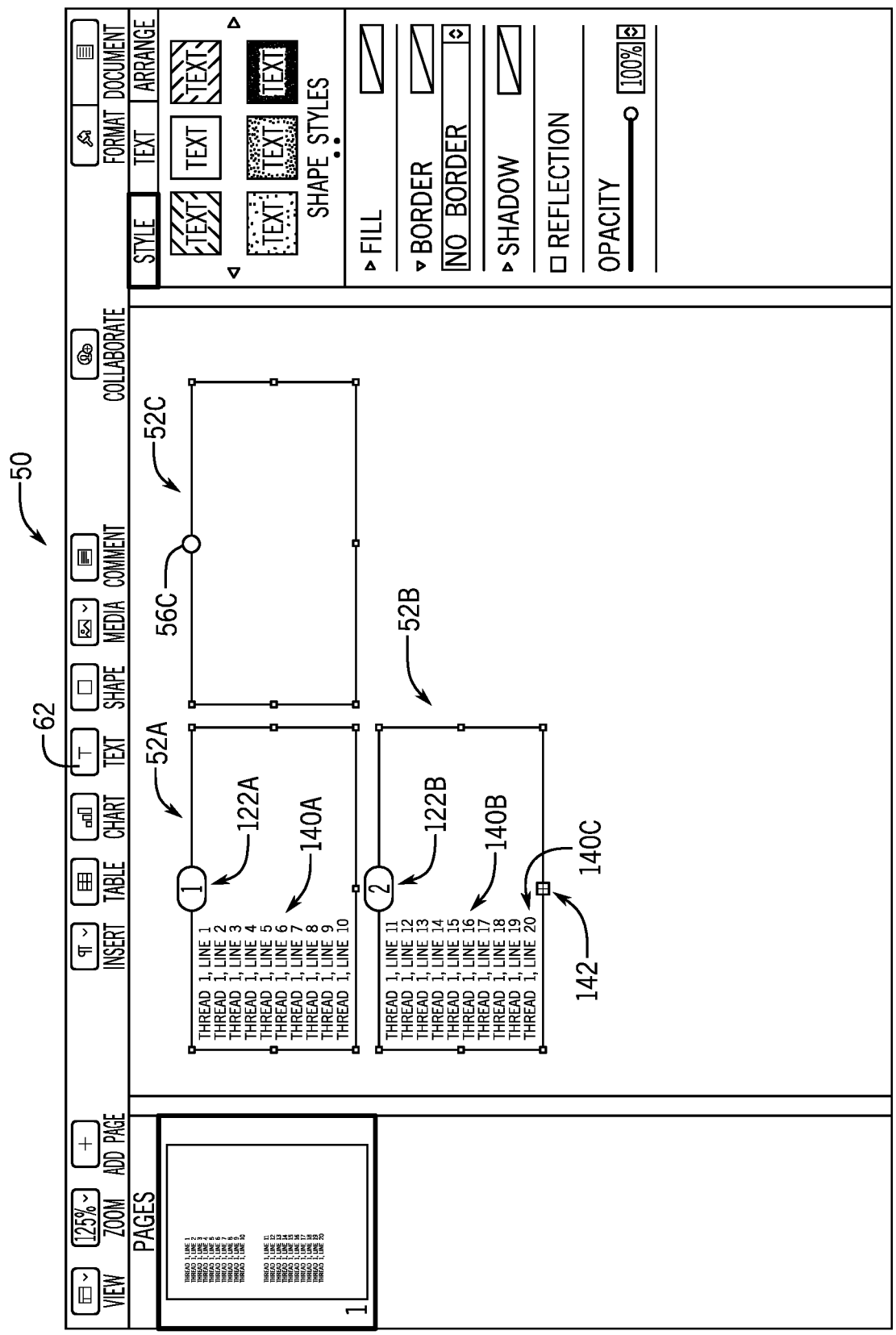
Figure 18E:
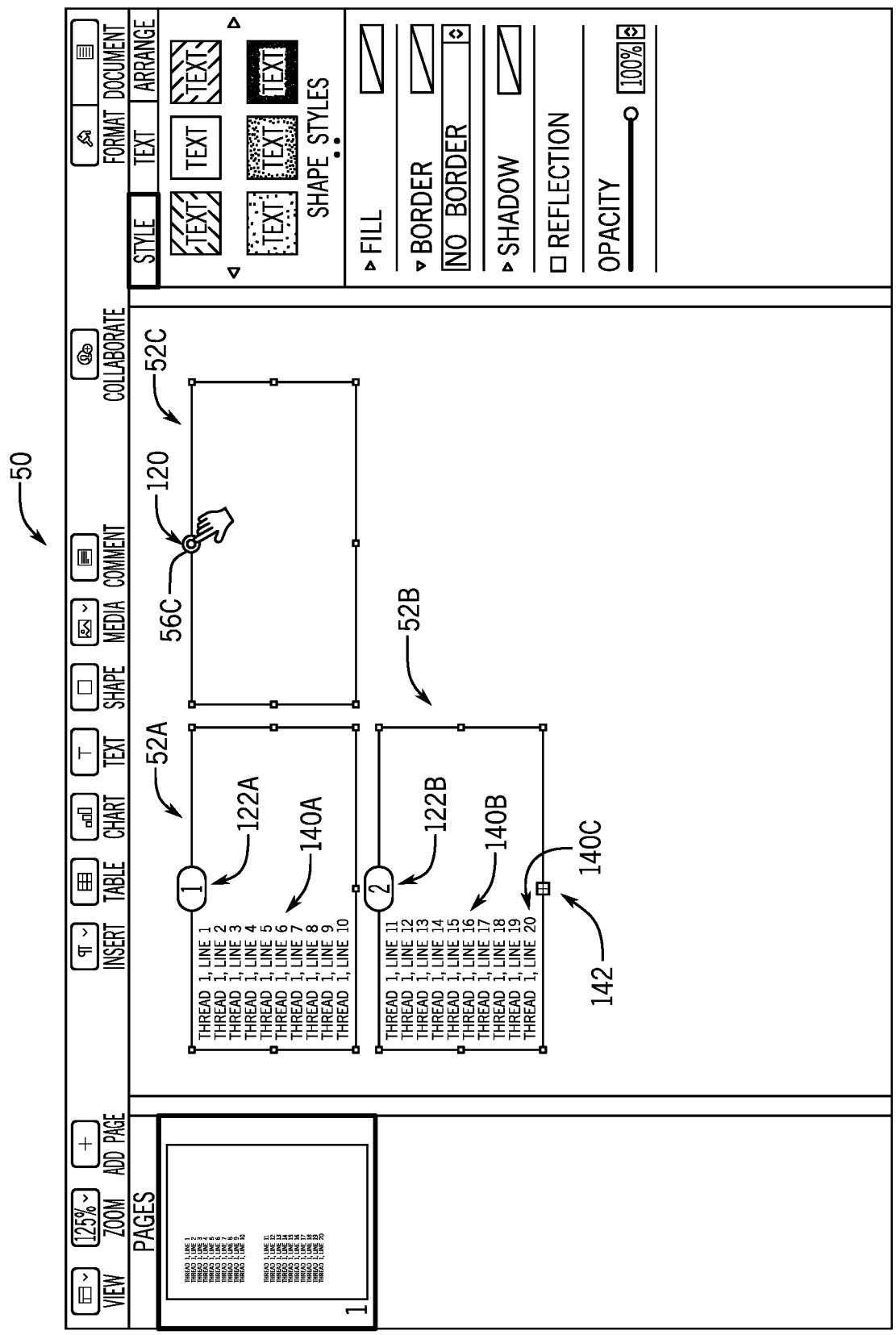
Figure 18F:
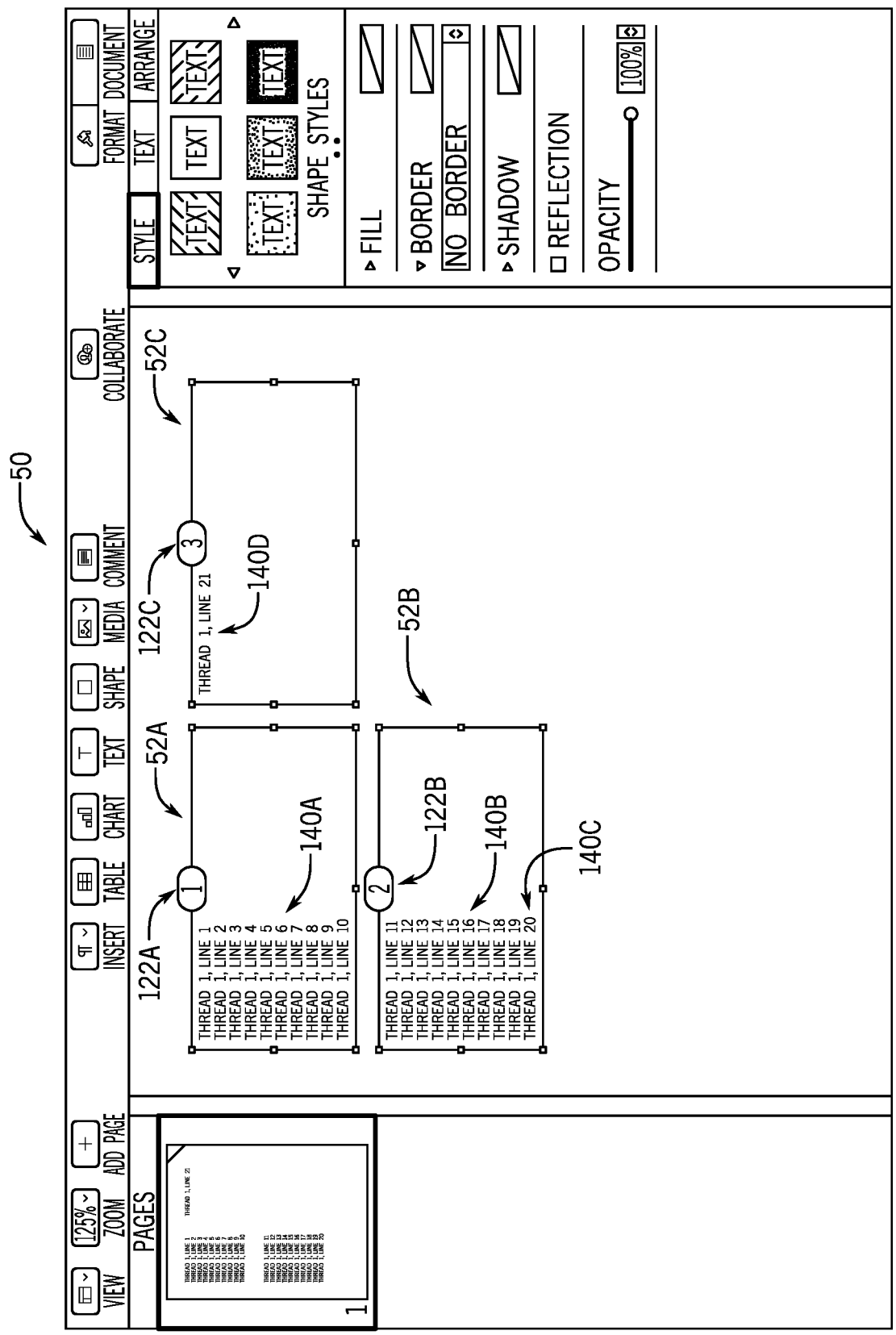

Returning to the discussion of the process 150, if the processor core complex 12 determines that such a text box 52 exists, at process block 162, the processor core complex 12 may cause a portion of the inputted text that will fit into the desired text box 52 to be added to the user-designated text box 52 and cause the remaining text to be added to another text box 52 in the same thread, such as a text box 52 that has a position directly subsequent to the position of the text box 52 into which the user inputted text. For example, FIG. 18D shows a third text box 52C added within the application program 50 (e.g., based on receiving user input via the text box graphical menu) item 62, FIG. 18E illustrates the third text box 52C before user input is received to add the third text box 52C to the same thread as the first text box 52A and the second text box 52B, and FIG. 18F shows text 140D included in the third text box 52C upon the addition of the third text box 52C to the same thread as the first text box 52A and the second text box 52B. Additionally, because the text 140A, 140B, 140C, and 140D all fit completely within their respective text boxes 52 of the thread, the text overflow indicator 142 is no longer displayed.

Displaying Text Based on a Position of a Text Box on the Display

Text boxes 52 may be moved or generated on top of other text boxes 52. For instance, a user may move an already existing text box via the input devices 22. As another example, a user input may cause a new text box 52 to be generated (e.g., via the text box graphical menu item 62), and the new text box may be generated on top of an existing text box. As discussed below, text within a preexisting text box 52 may be moved within a text box and/or thread when another text box is superimposed on the text of the text box 52.

Figure 19:
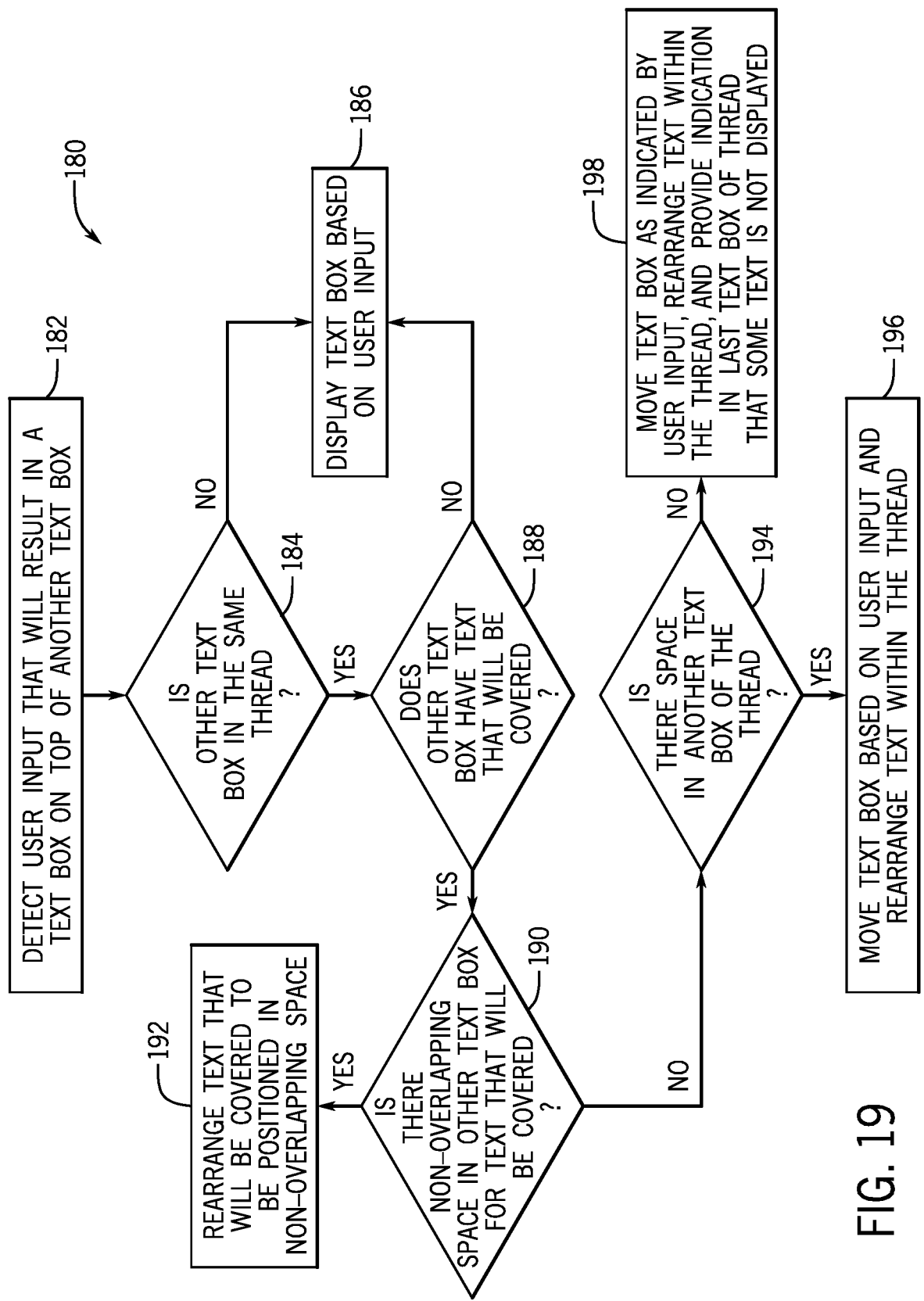
FIG. 19 is a flow diagram of a process for displaying text within a text box that is covered by another text box, according to embodiments of the present disclosure.

With this in mind, FIG. 19 is a flow diagram of a process 180 for displaying text within a text box 52 that is covered by another text box 52. The process 180 may be in the form of an application program (e.g., the application program 50) that includes instructions that are executed by at least one suitable processor of a computer system, such as the processor core complex 12 of the electronic device 10. The illustrated process 180 is merely provided as an example, and in other embodiments, certain illustrated steps of the process 180 may be performed in other orders, skipped, or repeated, according to embodiments of the present disclosure.

At process block 182, the processor core complex 12 may detect user input that will result in a text box 52 being positioned on top of another text box 52. For instance, as described above, the user input may be indicative of moving one text box 52 on top of another text box 52 or a request to generate a new text box 52. At decision block 184, the processor core complex 12 may determine whether the other text box 52 is in the same thread as the text box 52 being covered. If the processor core complex 12 determines that the other text box 52 is not in the same thread, at process block 186, the processor core complex 12 may display the text box 52 based on the user input. In other words, the processor core complex 12 may display a text box 52 that at least partially overlaps another text box 52.

Figure 20A:
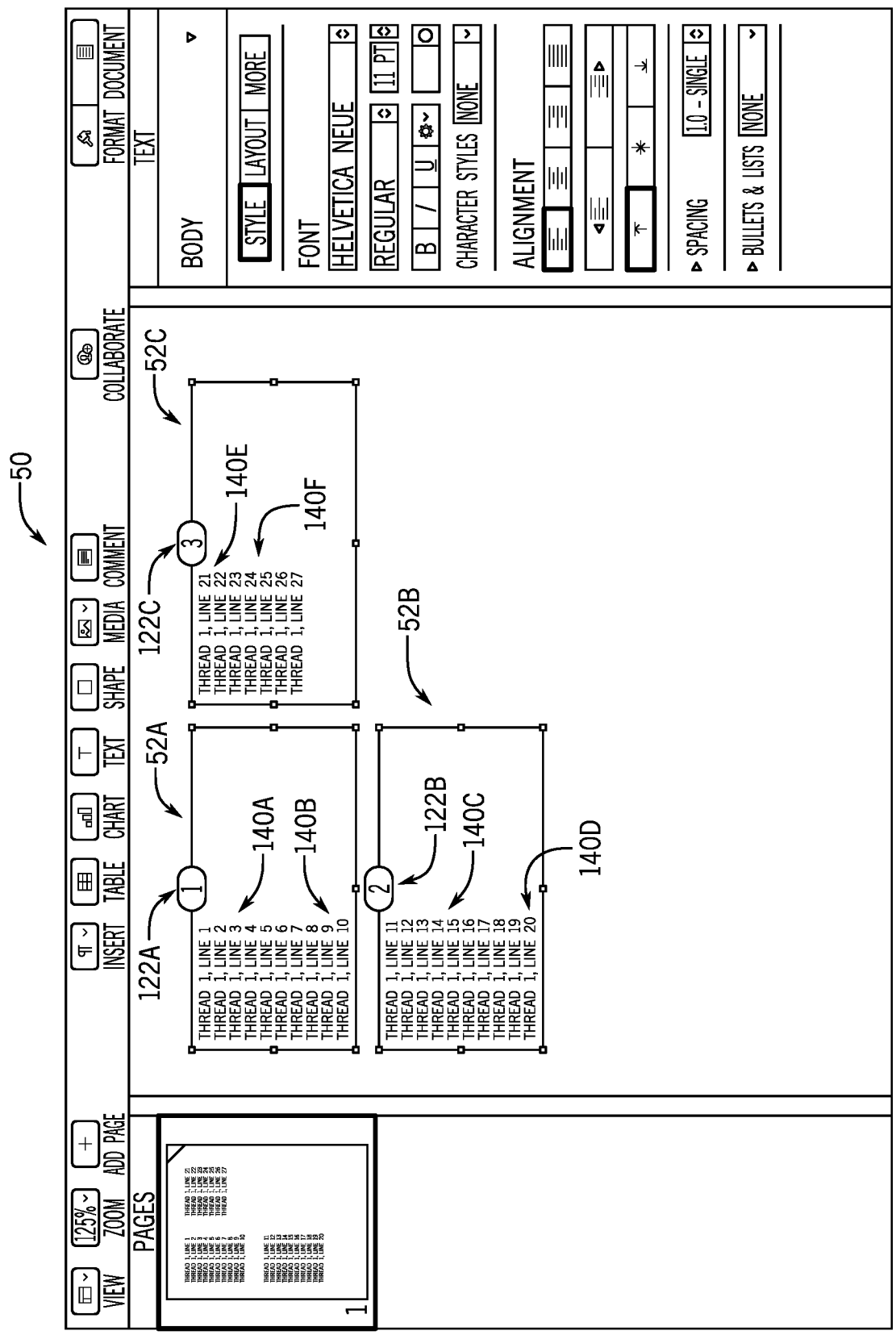
FIGS. 20A-20C illustrate how text within text boxes may be displayed based on user input, according to embodiments of the present disclosure.
Figure 20B:
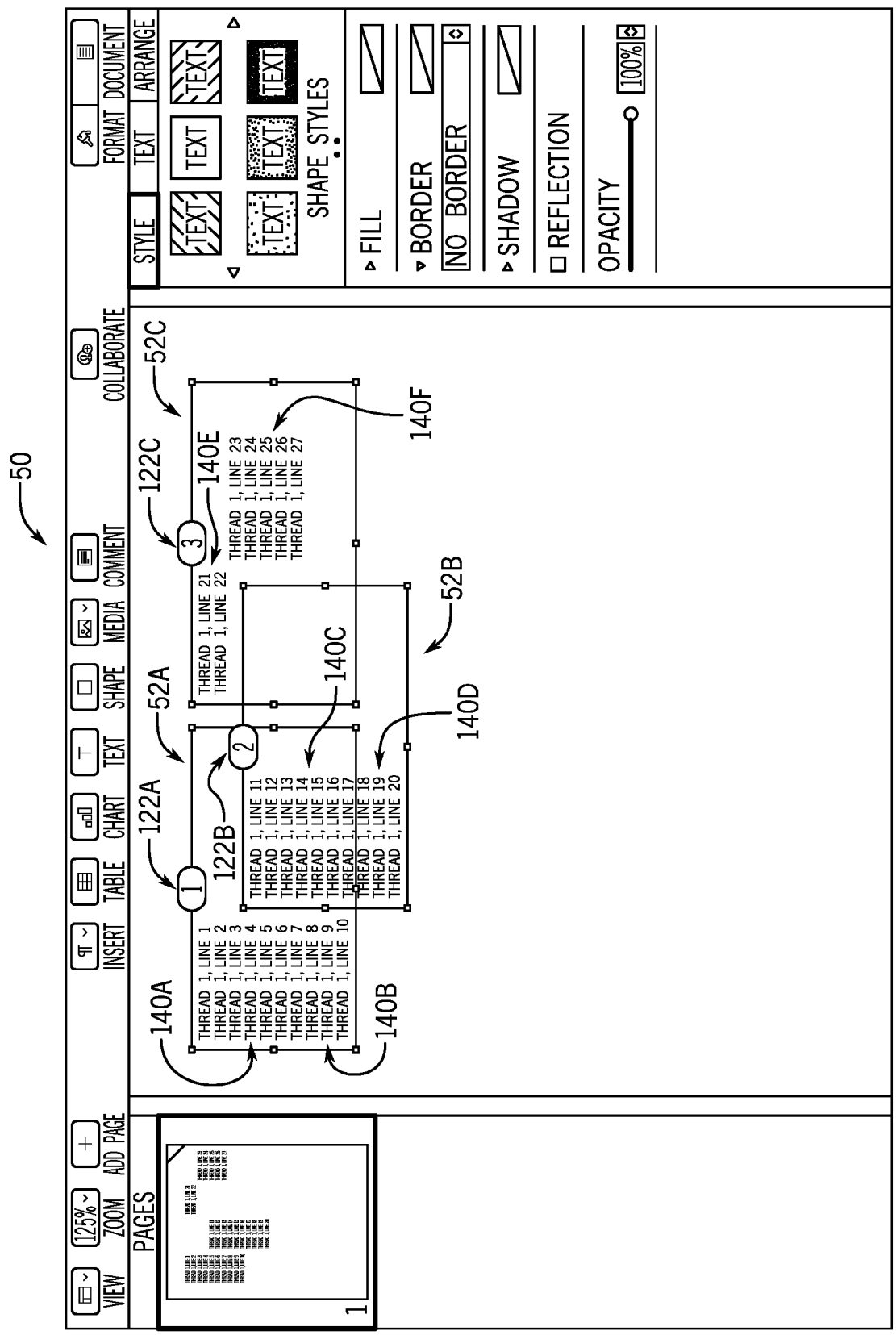
Figure 20C:
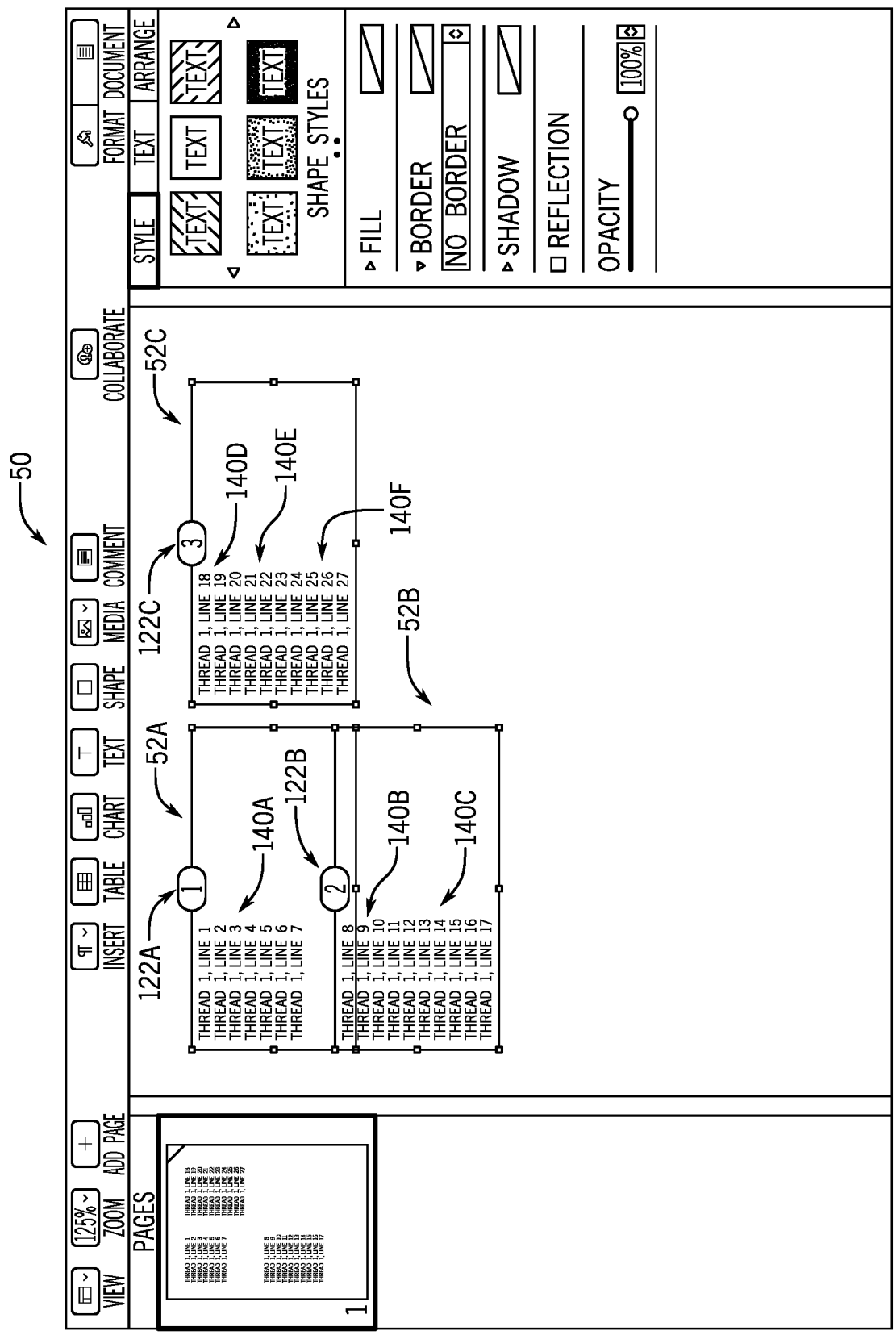

However, if the processor core complex 12 determines that the other text box 52 is in the same thread, at decision block 188, the processor core complex 12 may determine whether the other text box 52 has text that will be covered. In other words, the processor core complex 12 may determine whether the user input will cause text within a text box 52 to be covered by another text box 52. If the processor core complex 12 determines that text in the other text box 52 will not be covered, at process block 186, the processor core complex 12 may cause the text box 52 to be displayed based on the user input. For example, FIGS. 20A-20C illustrate how text within text boxes 52 may be displayed based on user input. In particular, FIG. 20A illustrates three text boxes 52, each of which, as indicated by the selectable visual indicators 122, is included within the same thread. More specifically, a first text box 52A includes text 140A and 140B, a second text box 52B includes text 140C and 140D, and a third text box 52C includes text 140E and 140F. Continuing to FIG. 20B, as a user inputs moving the second text box 52B to cover portions of the first text box 52A and third text box 52C, the processor core complex 12 may determine that the text 140A and 140B of the first text box will not be covered. Indeed, as illustrated, the first text box 52A and second text box 52B do not include text that is modified.

In contrast, if the processor core complex 12 determines that text within the other text box 52 will be covered, at decision block 190, the processor core complex 12 may determine whether there is a non-overlapping space within the other text box 52 for the text that will be covered. If the processor core complex 12 determines that there is non-overlapping space in the other text box 52 for the text 140 that will be covered, at process block 192, the processor core complex 12 may rearrange the text 140 that will be covered to be positioned in the non-overlapping space of the text box 52. For example, as illustrated in FIG. 20B, while text 140E of the third text box 52C has not moved relative to its location in FIG. 20A, text 140F has moved. In other words, the processor core complex 12 may have determined that the second text box 52B would cover the text 140F, determined that there was non-overlapping space in the third text box 52C, and moved the text 140F within third text box 52C based on the user input to move the second text box 52B.

However, if the processor core complex 12 determines that there is no non-overlapping space in the other text box 52 for the text 140 that will be covered, at decision block 194, the processor core complex 12 may determine whether there is space in another text box 52 of the thread for the text that will be covered. For example, the processors core complex 12 may determine whether there is space in text boxes 52 that are positioned in the thread after the text box 52 that has the text 140 that will be covered. If the processor core complex 12 determines that there is space in another text box 52, at process block 196, the processor core complex 12 may move the text box 52 based on the user input and rearrange the text within the thread. For instance, FIG. 20C illustrates the second text box 52B covering a portion of the first text box 52A. As shown, text 140B, which was originally in the first text box 52A has been relocated to the second text box 52B. Additionally, text 140D, which was first located in the second text box 52B, has been relocated to the third text box 52C.

If the processor core complex 12 determines that there is not space in another text box 52 of the same thread, at process block 198, the processor core complex 12 may cause the text box 52 as indicated by the user input, rearrange the text 140 within the thread, and provide an indication in the last text box in the thread that text 140 is not being displayed. For instance, such an indication may include the text overflow indicator 142. In other words, the processor core complex 12 may act similarly as when the is room in another text box 52, as described with respect to process block 196, except that when there is not space in the thread for all of the text 140, the processor core complex 12 may also cause the last text box 52 in the thread to include the text overflow indicator 142.

Merging a Text Box with Text from One Thread into Another Thread

Figure 21:
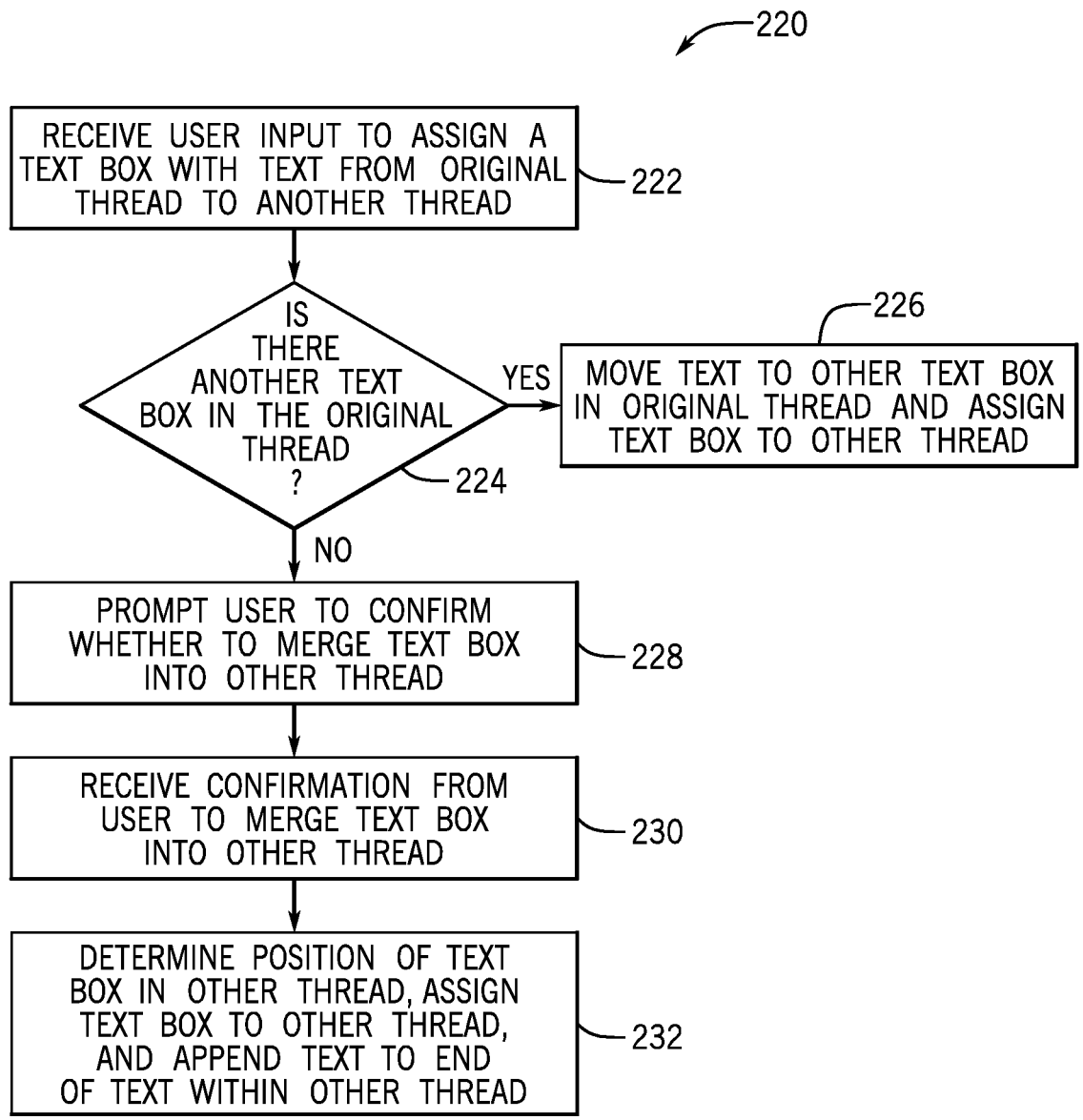
FIG. 21 is a flow diagram of a process for merging a text box from one thread into another thread, according to embodiments of the present disclosure.

As described above, text boxes 52 may be assigned from one thread to another thread. For instance, as described below, text from a text box 52 may be moved to another text box within an original thread when the text box 52 that originally included the text is moved to another thread. As additionally, discussed below, text from the last text box 52 in a thread may be appended to the end of other text in the thread to which the text box 52 is assigned. With this in mind, FIG. 21 is a flow diagram of a process 220 for merging a text box 52 with text 140 from one thread into another thread. The process 220 may be in the form of an application program (e.g., the application program 50) that includes instructions that are executed by at least one suitable processor of a computer system, such as the processor core complex 12 of the electronic device 10. The illustrated process 220 is merely provided as an example, and in other embodiments, certain illustrated steps of the process 220 may be performed in other orders, skipped, or repeated, according to embodiments of the present disclosure.

Figure 22A:
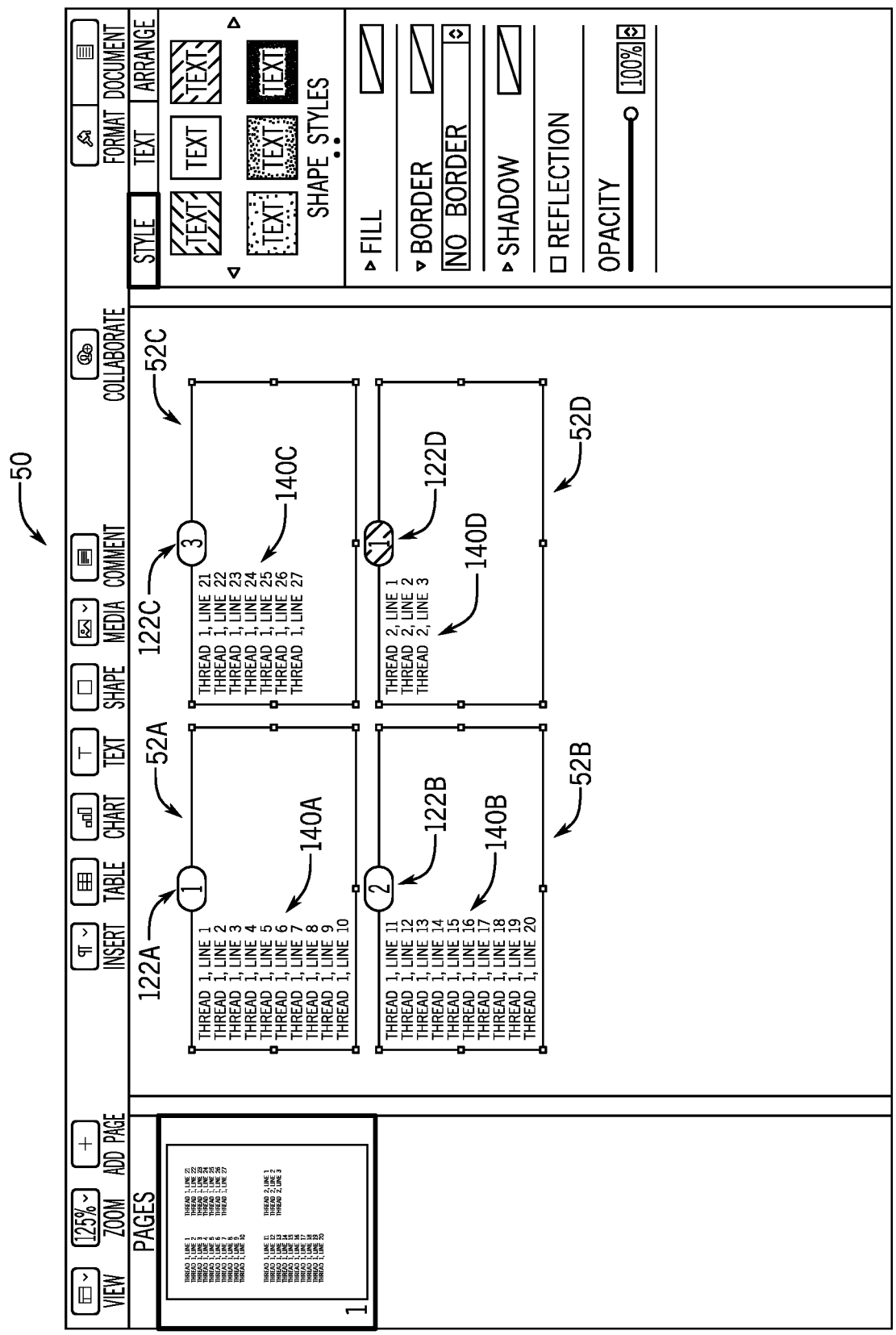
FIGS. 22A-22C illustrate merging a text box that has text from one thread into another thread, according to embodiments of the present disclosure.
Figure 22B:
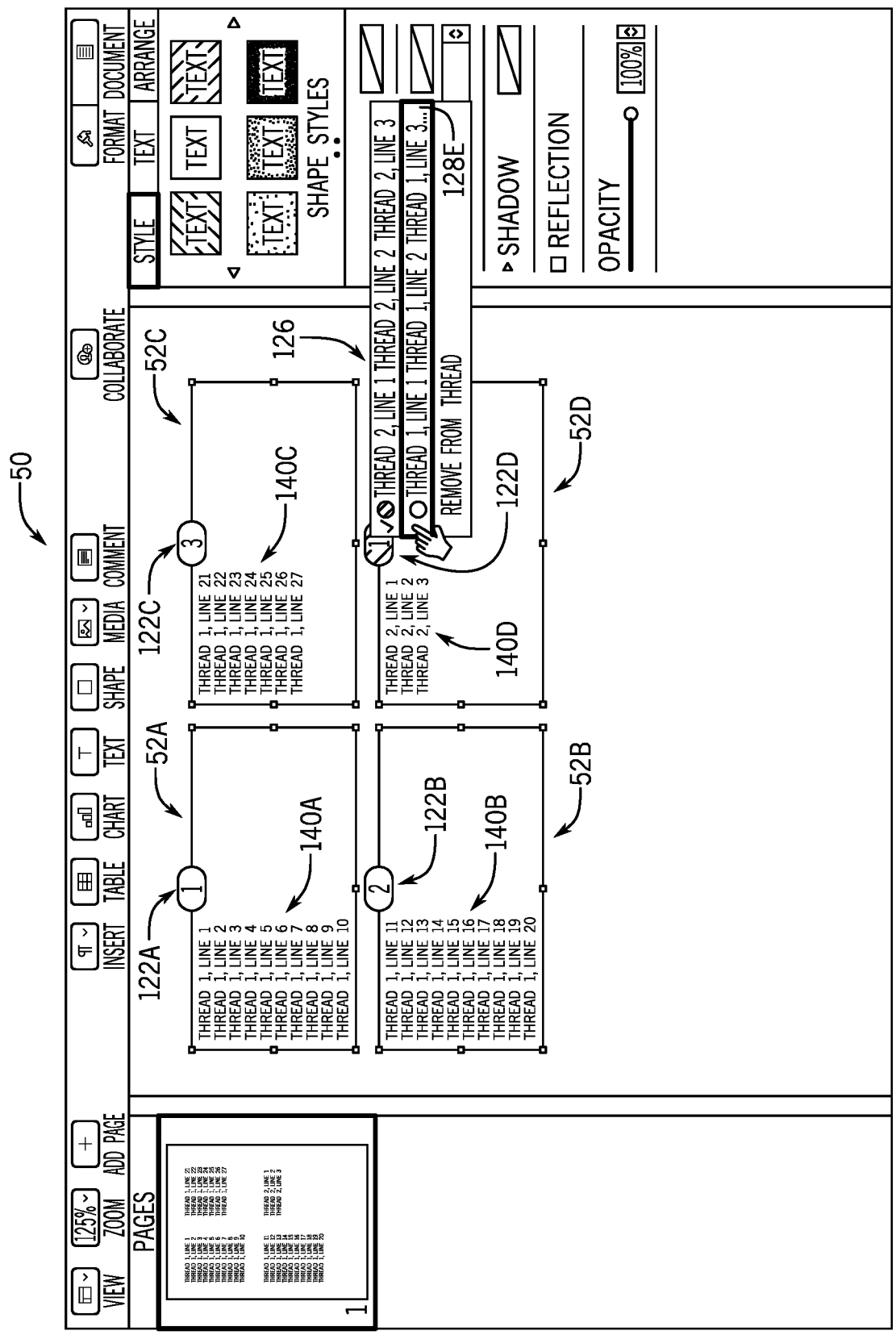
Figure 22C:
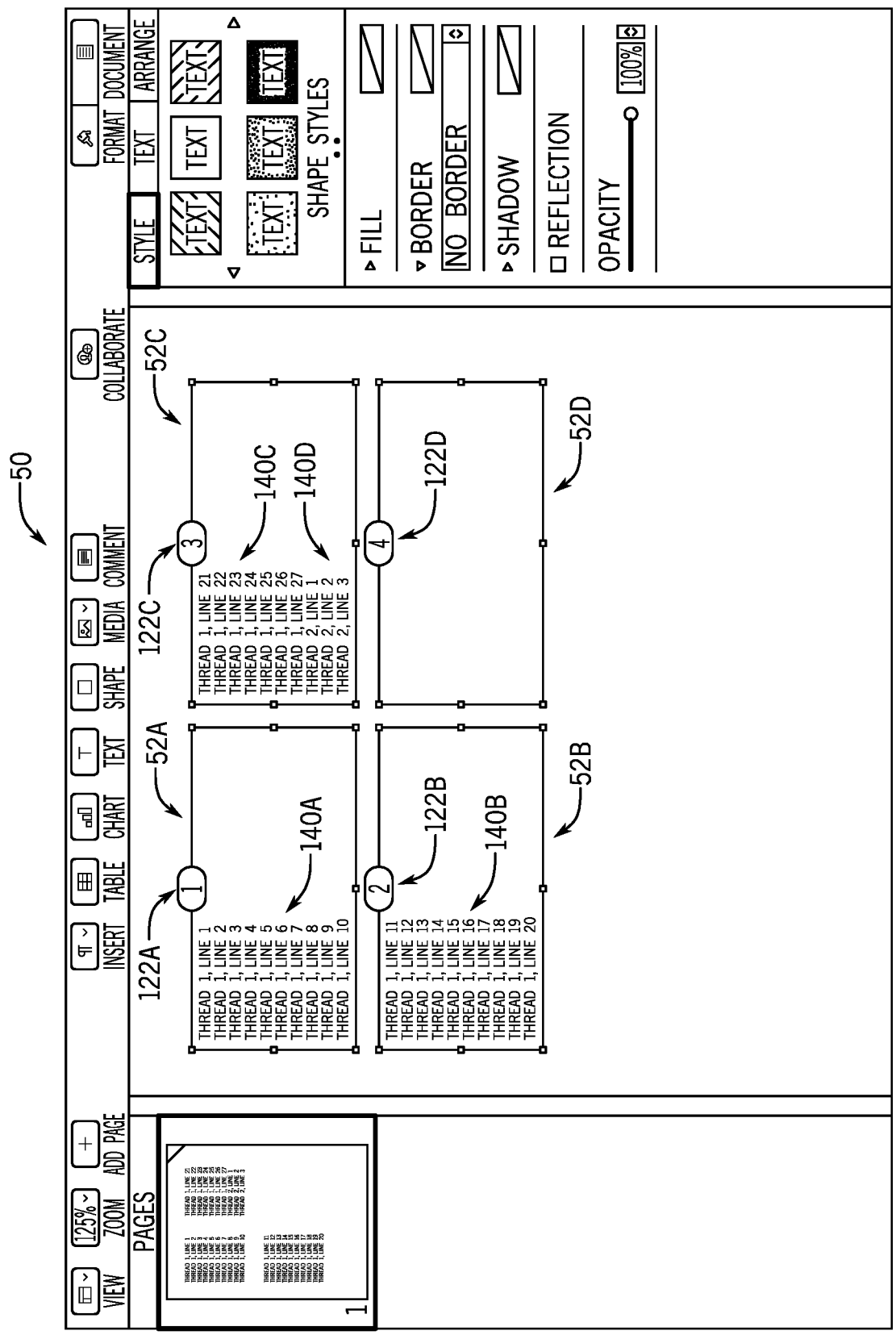

At process block 222, the processor core complex 12 may receive user input to assign a text box 52 that includes text 140 from an original thread (e.g., a first thread) to another thread (e.g., a second thread). For example, FIGS. 22A-22C illustrate merging a text box that has text from one thread into another thread. In particular, FIG. 22A illustrates four text boxes 52, one of which is included in one thread and three of which are included in another thread. More specifically, FIG. 22A includes a first text box 52A with text 140A, a second text box 52B with text 140B, and a third text box 52C with text 140C that are assigned in a thread; FIG. 22A also includes a fourth text box 52D that is assigned a different thread and includes text 140D. Continuing to FIG. 22B, which shows a menu 126 that includes a thread option 128E, which when selected by a user, may assign the fourth text box 52D that includes text 140D to the same thread as the first text box 52A, the second text box 52B, and the third text box 52C. As another example, and as discussed above, the user input may include assigning the text box 52 from the original thread to a new thread.

Returning to the discussion of the process 220, at decision block 224, the processor core complex 12 may determine whether there is another text box 52 in the original thread. In other words, the processor core complex 12 may determine whether the text box 52 that is to be assigned to another thread is the last text box 52 in the thread. If the processor core complex 12 determines that there is another text box in the original thread, at process block 226, the processor core complex may cause the text 140 to be moved to another text box 52 within the original thread and assign the text box 52 to the thread indicated by the user input.

However, if the processor core complex 12 determines that there is another text box in the original thread, at process block 228, the processor core complex 12 may prompt the user to confirm whether to merge the text box 52 into the other thread. For example, the processor core complex 12 may cause a dialog box to be displayed to confirm that the user wants to merge the text box 52 into the other thread.

At process block 230, the processor core complex 12 may receive user input indicative of a confirmation to merge the text box 52 into the other thread. For instance, the user may select an option presented in a dialog box to confirm that the user wishes to merge the text box 52 into the other thread, and the processor core complex 12 may receive such a confirmation.

At process block 232, the processor core complex 12 may determine a position of the text box within the new thread, assign the text box 52 to the new thread, and append text 140 from the text box 52 to the end of the text 140 in the thread. As discussed above, the processor core complex 12 may determine the position of a text box within a thread based on several factors, including the location of the text box 52 within a page of a document in the application program 50. For instance, as illustrated in FIG. 22C, which shows the fourth text box as having been added to the same thread as the first, second, and third text boxes 52A, 52B, and 52C, the fourth text box 52D has been assigned to the fourth position in the thread (e.g., as indicated by the selectable visual indicator 122D).

As additionally illustrated in FIG. 22C, the text 140D that was originally included in the fourth text box 52D has been moved within the thread to appear directly after the text 140C. In other words, the text 140D has been relocated from the fourth text box 52D to the third text box 52C. When appending text 140 to the end of the thread, the processor core complex may determine how to display the text 140 as discussed above. For instance, the processor core complex 12 may determine whether there is space in another text box 52 of the same thread. For instance, if a text box 52 is added to a position other than the last position of a thread, text 140 originally in another text box 52 of the thread may be moved into the text box 52, and text originally in the text box 52 may be added to the first text box 52 in the thread that has space for such text 140. Additionally, if some of the text does is not displayed, the text overflow indicator 142 may be provided.

Modifying Settings Associated with Each Text Box in a Thread

Figure 23:
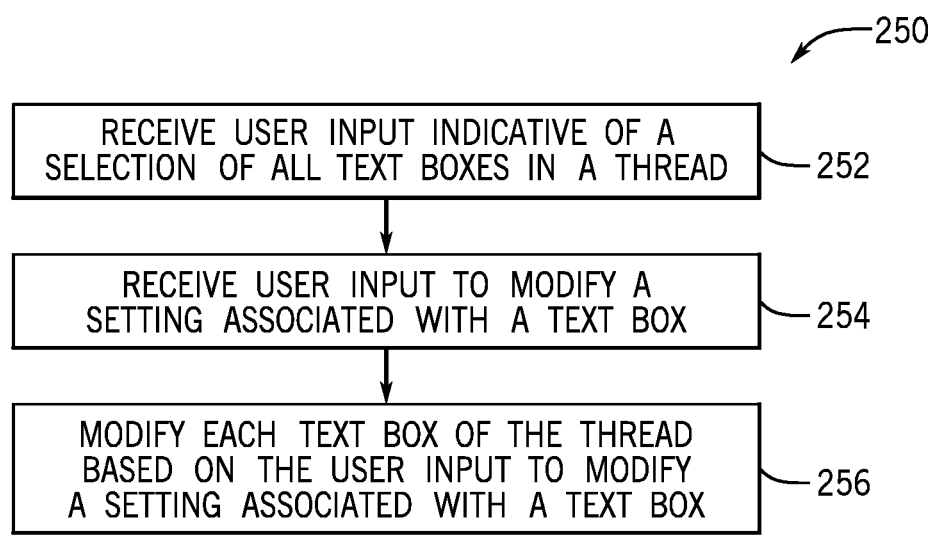
FIG. 23 is a flow diagram of a process for modifying settings in each text box of a thread, according to embodiments of the present disclosure.

Many settings may be associated with text boxes 52. For instance, settings such as font style, font size, borders, shadows, fill styles, and many other settings may be associated with text boxes 52. As discussed below, a user may select each text box in a thread, modify a setting associated with a text box, and the setting, as indicated by the user input, may be modified in each text box of a thread. Keeping this in mind, FIG. 23 is a flow diagram of a process 250 for modifying settings in each text box 52 of a thread. The process 250 may be in the form of an application program (e.g., the application program 50) that includes instructions that are executed by at least one suitable processor of a computer system, such as the processor core complex 12 of the electronic device 10. The illustrated process 250 is merely provided as an example, and in other embodiments, certain illustrated steps of the process 250 may be performed in other orders, skipped, or repeated, according to embodiments of the present disclosure.

Figure 24A:
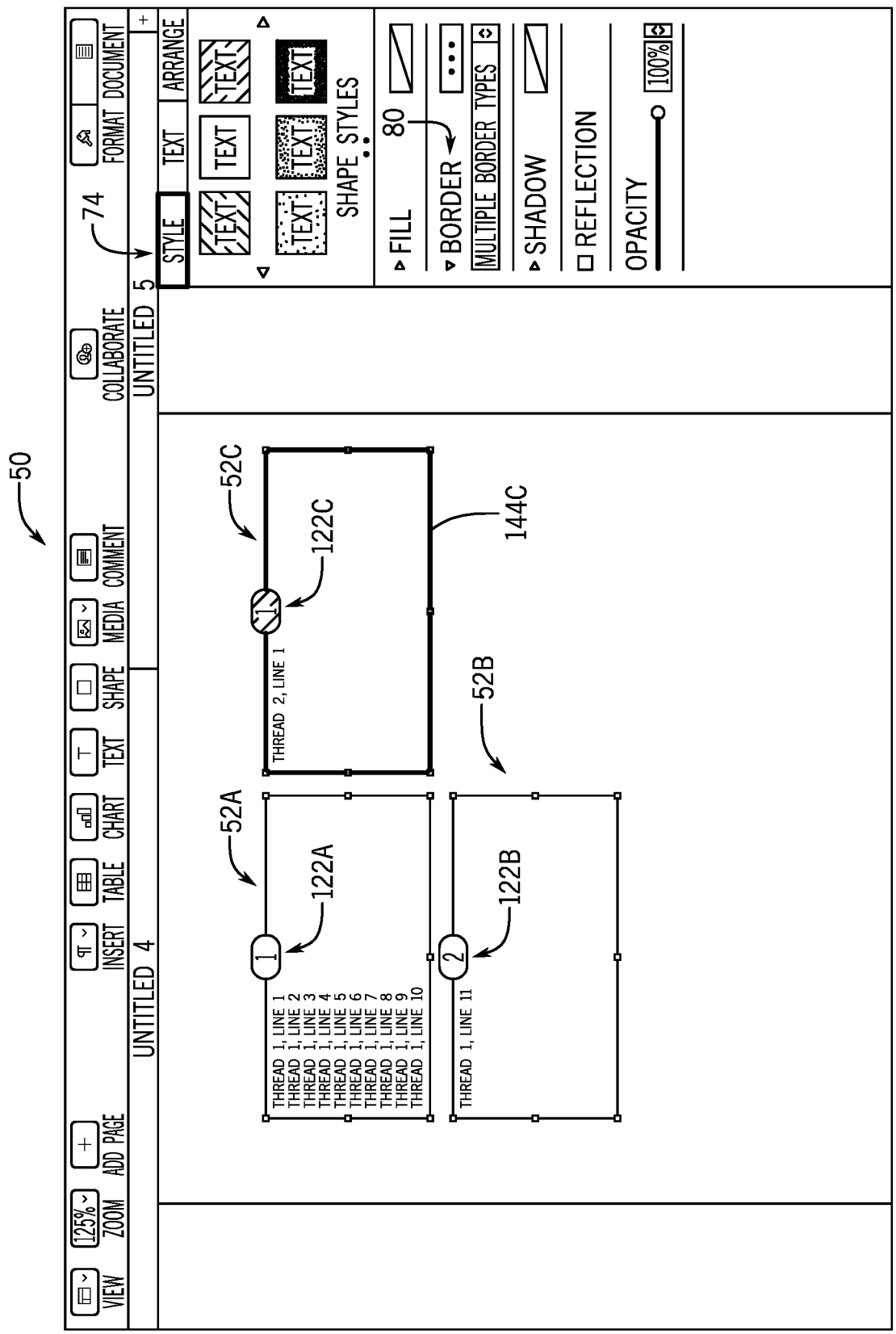
FIGS. 24A-24E illustrate modifying settings in each text box of a thread, according to embodiments of the present disclosure.

At process block 252, the processor core complex 12 may receive a user input indicative of a selection of all text boxes within a thread. For example, FIGS. 24A-24E illustrate modifying settings in each text box 52 of a thread. In particular, FIG. 24A includes a first text box 52A and a second text box 52B that are assigned to a first thread (e.g., as indicated by the selectable visual indicators 122A and 122B). FIG. 24A also includes a third text box 52C that associated with a second thread, as indicated by a selectable visual indicator 122C. As also illustrated, the third text box 52C is surrounded by a solid border 144C, which may have been added based on user input via the formatting panel 74 and the border control 80.

Figure 24B:
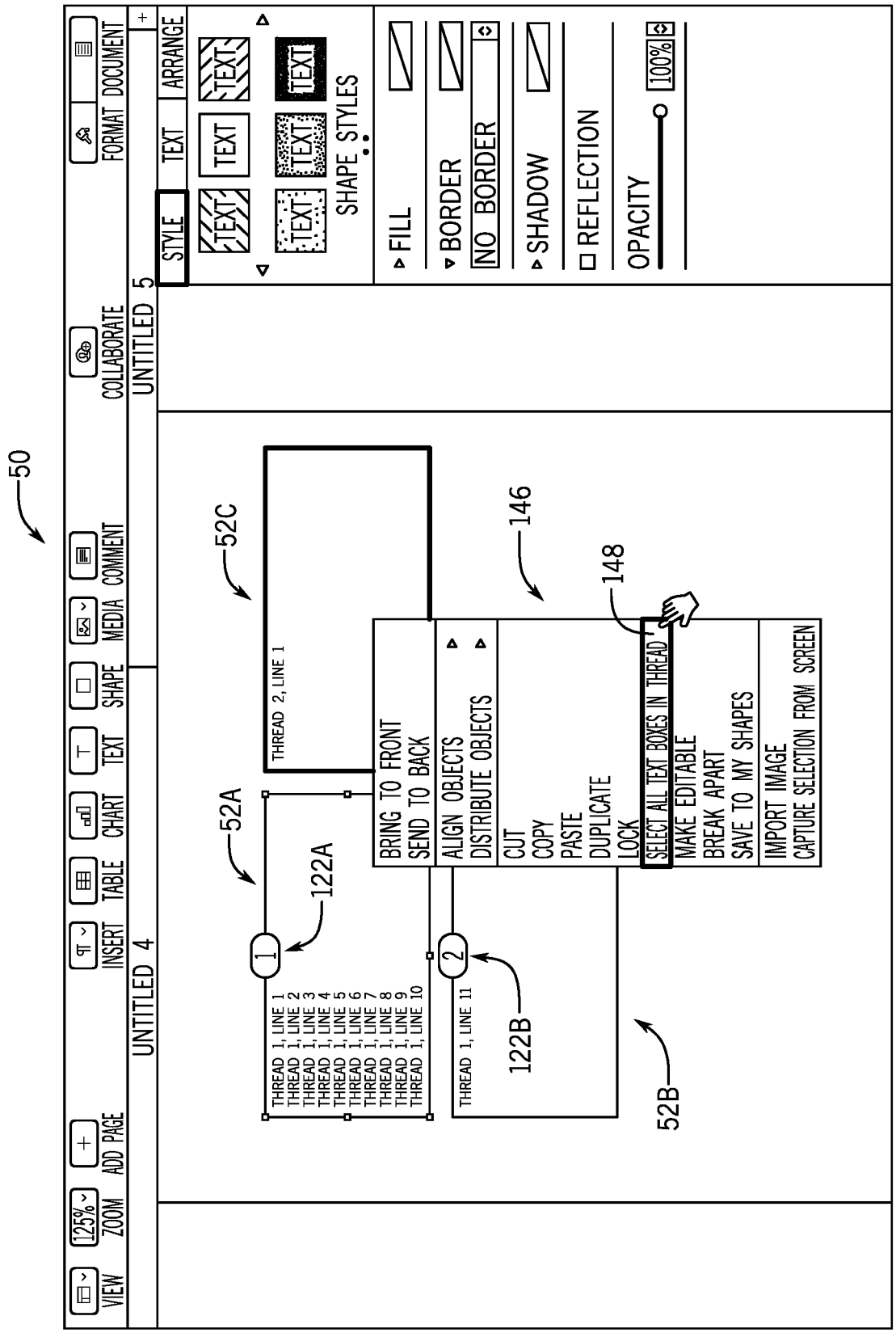
Figure 24C:
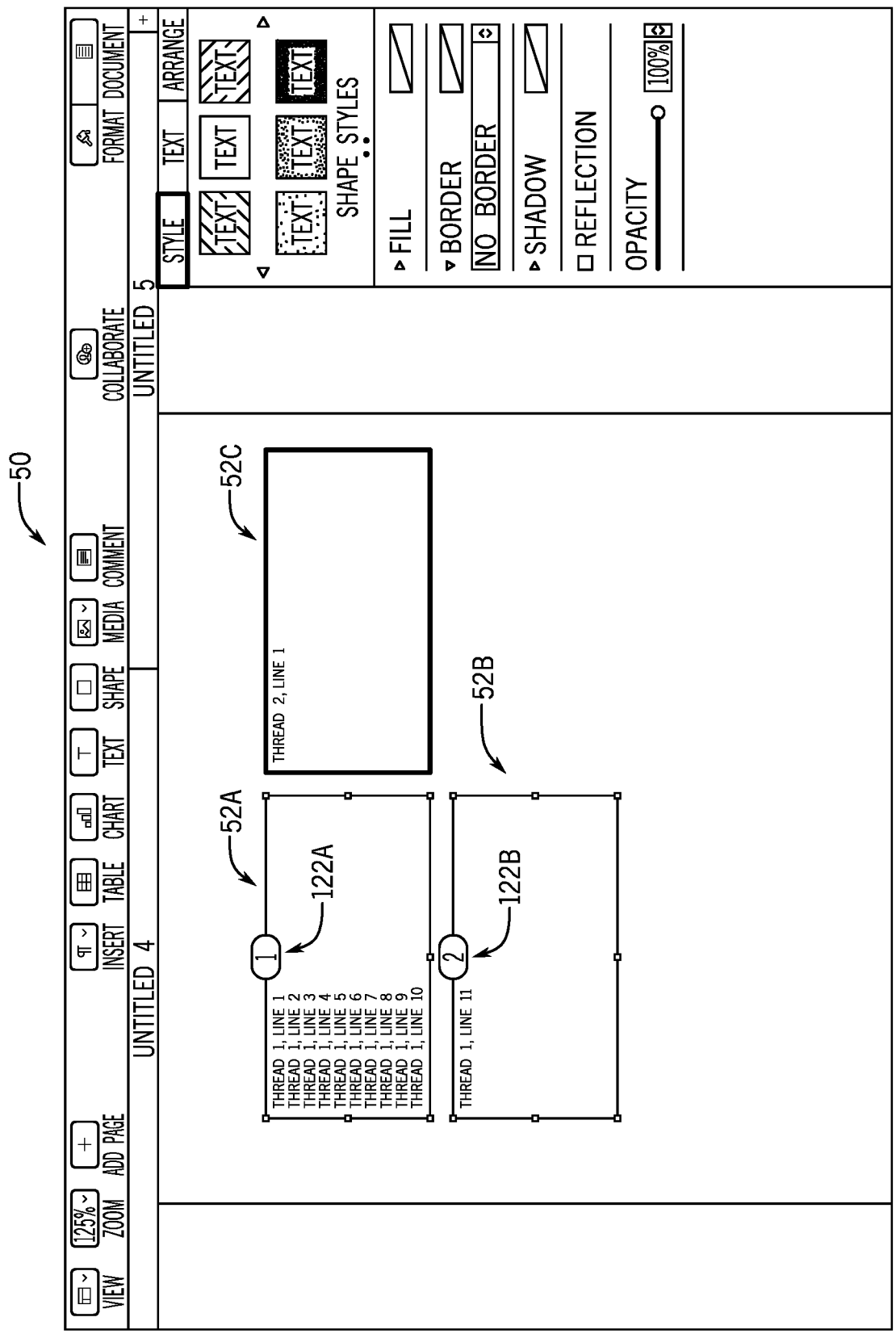

Turning to FIG. 24B, a user may open a menu 146 and select a menu option 148 to select all of the text boxes 52 in a thread. More specifically, the user may access the menu via selecting an area within a text box 52. For instance, in FIG. 24B, the menu 146 has been access via selecting an area within the first text box 52A. The processor core complex may receive user input indicative of selected the menu option 148. Additionally, the processor core complex 12 may cause the selected text boxes 52 to be displayed as shown in FIG. 24C, in which the first text box 52A and second text box 52B are selected text boxes.

Figure 24D:
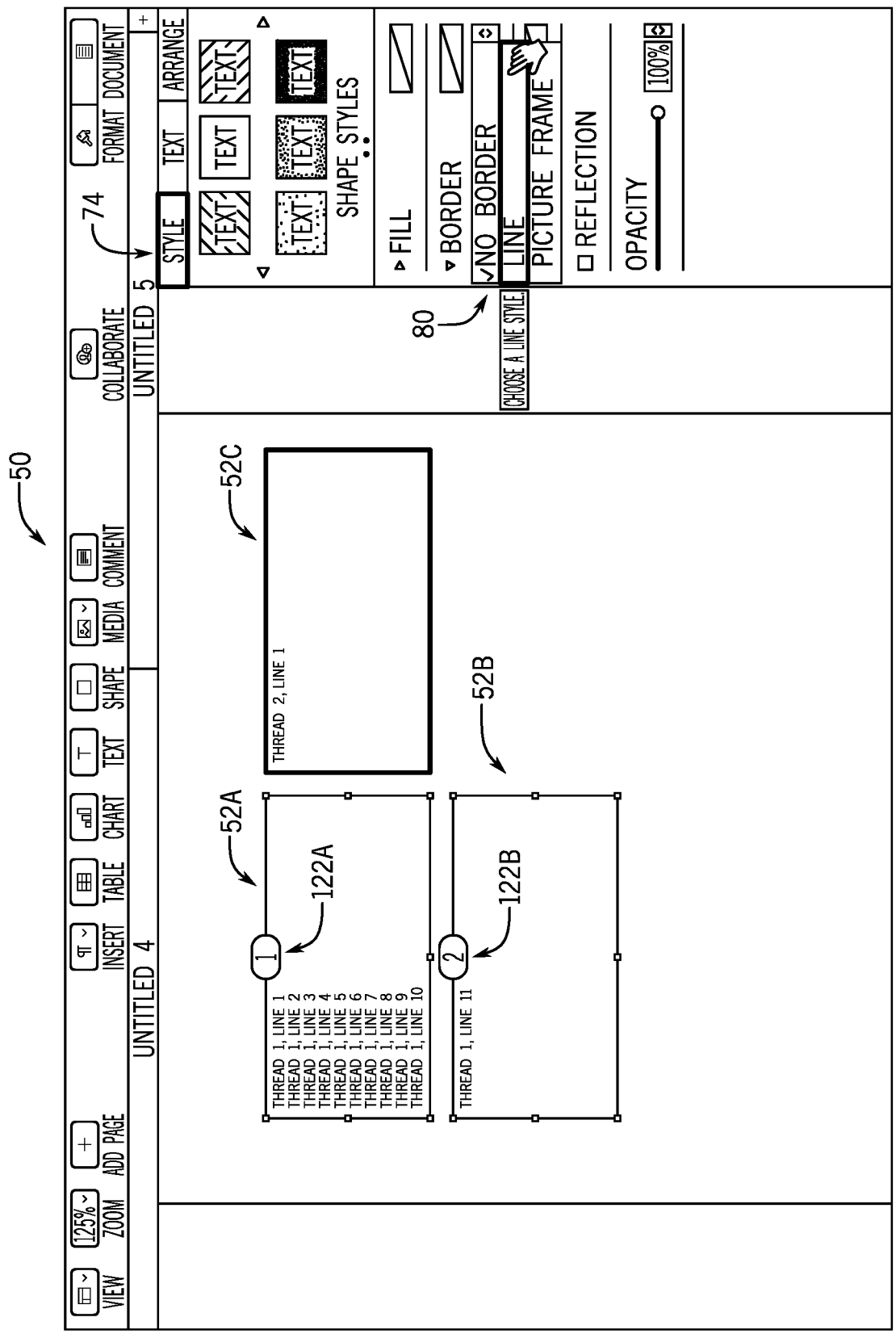

Returning to the discussion of the process 250, at process block 254, the processor core complex 12 may receive a user input to modify a setting associated with a text box 52. For example, the user may make an input via the formatting panel 74 or a component thereof. For instance, as illustrated in FIG. 24D, the user may interact with the border control 80 to select a border for the selected text boxes. It should be noted that a text box border is only one example of a setting associated with a text box 52. The application program 50 may provide many other settings that a user may modify, such as, but no limited to, font style, font size, opacity of a text box 52, shadows, and whether and how a text box 52 is filled.

Figure 24E:
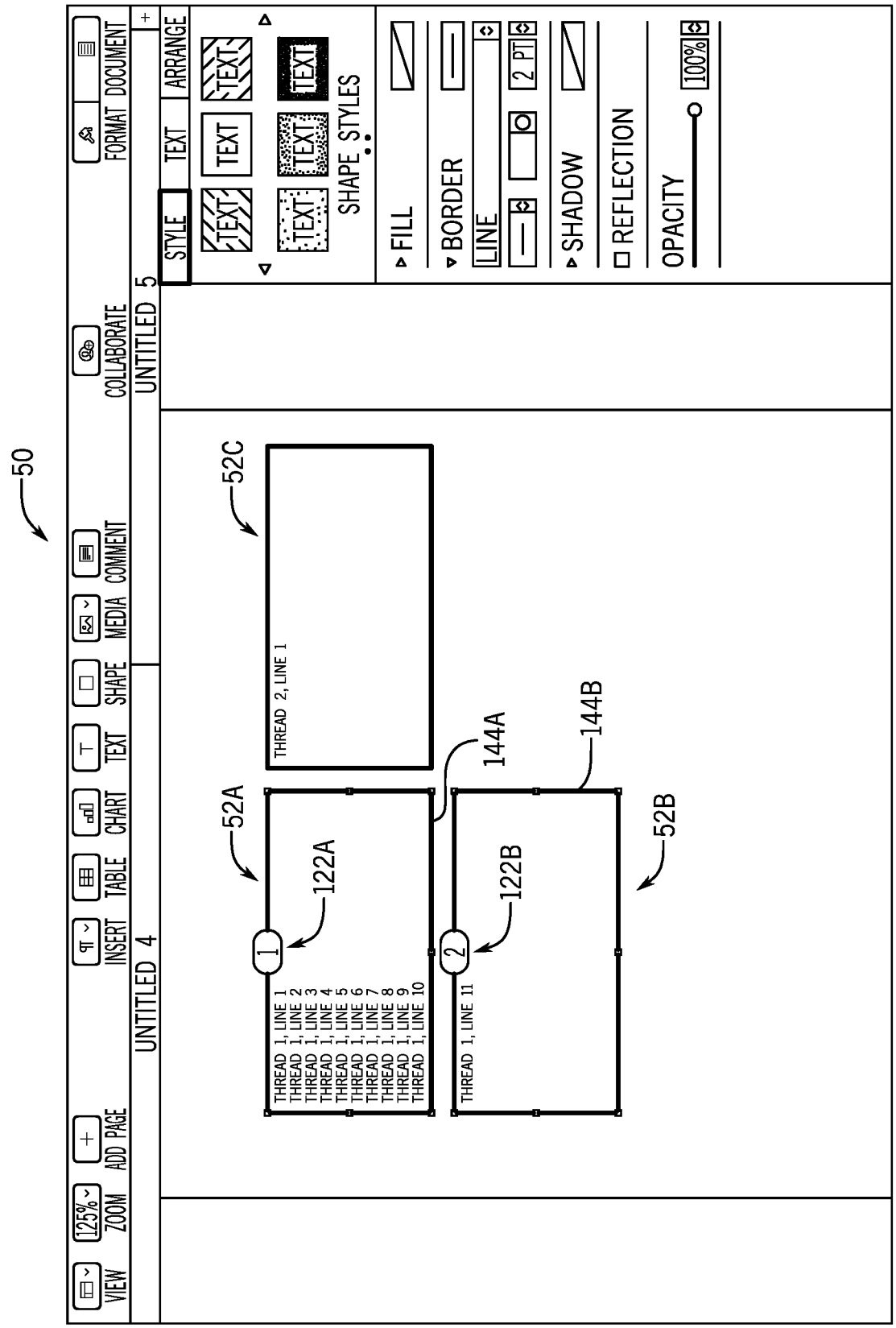

Continuing with the discussion of the process 250, at process block 256, the processor core complex 12 may modify each text box 52 in the thread based on the user input to modify a setting associated with a text box 52. For example, as shown in FIG. 24E, a solid border 144A and a solid border 144B have respectively been added to the first text box 52A and the second text box 52B.

The technical effects of the present disclosure include linking text boxes 52 by assigning the text boxes 52 to one or more threads. That a text box 52 is assigned to a thread may be indicated by a selectable visual indicator 122 that may be included as part of a text box 52. The selectable visual indicator 122 may include a color associated with the thread and provide a position a text box within a thread. In this way, a relationship between a text box 52 and other text boxes 52 may be displayed in a manner that is clear and does not obstruct a user's view of other items or text that may be included in the document. Text 140 may flow from one text box 52 to another text box 52 of the same thread based on the respective positions of the text boxes 52 within the thread. For example, text 140 may flow from a text box 52 in a thread with one position to a text box 52 having a subsequent position with the thread. Moreover, text boxes 52 may be assigned positions within a thread based on a position of the text box (e.g., within a document and/or relative to other text boxes 52) as well as a language associated with the document in which the text box 52 is included, an application program that provides the text boxes, or an electronic device on which the application program is executed. In this manner, text boxes 52 may be generated and added to threads in an intuitive manner that enables users to write and read text in a manner similar to how the language is standardly read and written. Users may modify both the position of a text box 52 within a thread as well as the thread to which the text box 52 is assigned. Based on such a modification, where text is displayed within a thread (e.g., a text box 52 in the thread) may be dynamically adjusted. For example, new threads may be created, and users may merge a text box 52 and text from one thread into a different thread.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A user interface (UI) feature in a document authoring application program for creating text boxes, comprising:
    a text box creation graphical menu item presented on a display of an electronic device, wherein, in response to receiving user input indicative of a selection of the text box creation graphical menu item, the application program is configured to cause the electronic device to render a text box in the document on the display, wherein the text box comprises a bounding edge; and
    a selectable visual indicator displayed as an integral part of the text box, wherein the selectable visual indicator is indicative of a thread of text boxes in which the text box is included, wherein text included in a first text box of the thread flows into a second text box of the thread when an amount of the text is larger than a displayable area of the first text box, wherein the selectable visual indicator comprises an order indicator indicative of a position of the text box within the thread, wherein the position of the text box is indicative of a reading order of the text in the thread.

2. The UI feature of claim 1, wherein the selectable visual indicator comprises a color associated with the thread.

3. The UI feature of claim 1, wherein the bounding edge comprises the selectable visual indicator.

4. The UI feature of claim 1, wherein the text box comprises a linking affordance that is configured to indicate the thread before the text box is included in the thread.

5. The UI feature of claim 1, wherein, in response to receiving a second user input indicative of a selection of the text box creation graphical menu item, the application program is configured to cause the electronic device to render the second text box in the document on the display, wherein the second text box comprises a second selectable visual indicator displayed as an integral part of the second text box, wherein the second selectable visual indicator is indicative of the second text box being included in the thread.

6. The UI feature of claim 5, comprising a thread order option menu presented on the display, wherein the thread order option menu provides a plurality of positions within the thread, wherein selection of a new position changes the selectable visual indicator from indicating an old position to indicating the new position.

7. The UI feature of claim 1, comprising a text box option menu presented on the display in response to receiving an option menu selection inputted, wherein the presented option menu provides a listing of a plurality of threads that includes the thread, wherein selection of a second thread different from the thread changes the text box from being associated with the thread to being associated with the second thread.

8. The UI feature of claim 7, wherein the selectable visual indicator comprises a second color associated with the second thread.

9. A method for linking text boxes on one or more pages of an electronic document, the method comprising:
   receiving a first user input corresponding to an indication to create a first text box on the one or more pages;
   in response to the first user input, presenting the first text box on the one or more pages, the first text box having an associated first location on the one or more pages;
   receiving a second user input corresponding to an indication to create a second text box on the one or more pages;
   in response to the second user input, presenting the second text box on the one or more pages, the second text box having an associated second location on the one or more pages;
   detecting a relative arrangement of the first text box and the second text box on the one or more pages;
   based on the relative arrangement and a language specification, linking the first and second text boxes by assigning an order to each of the first text box and the second text box within a thread, wherein text within the thread flows from one text box of the thread to another text box of the thread based on the assigned order when an amount of text is larger than an area of the one text box; and
   displaying the assigned order via selectable visual indicators included in the first and second text boxes, wherein the assigned order is indicative of a reading order of the text in the thread.

10. The method of claim 9, comprising:
    before displaying the second text box, determining whether the second text box will overlap with text in the first text box;
    determining whether there is space in another text box for at least a portion of the text; and
    presenting the second text box and rearranging the text such that the second text box does not overlap with the text.

11. The method of claim 10, comprising displaying a text overflow indicator on the second text box or the other text box that indicates that a portion of the text is not being displayed.

12. The method of claim 9, comprising:
    receiving a third user input to add text to the first text box;
    displaying the text in the first text box; and
    displaying a portion of the text in the second text box when the portion of the text will not fit in the first text box.

13. The method of claim 12, comprising displaying a text overflow indicator that indicates that some of the portion of the text is not being displayed when the portion of the text will not fit in the second text box.

14. A non-transitory, computer-readable medium comprising instructions configured to cause processing circuitry to:
   receive a first user input corresponding to an indication to create a first text box on one or more pages of an electronic document;
   in response to the first user input, display the first text box on the one or more pages;
   receive a second user input corresponding to an indication to create a second text box on the one or more pages;
   in response to the second user input, display the second text box on the one or more pages;
   link the first text box and the second text boxes by assigning an order to each of the first text box and the second text box within a thread; and
   display the assigned order of each of the first text box and the second text box within the thread via a first selectable visual indicator of the first text box and a second selectable visual indicator of the second text box, respectively, wherein text within the thread flows from one text box of the thread to another text box of the thread based on the assigned order when an amount of text in the one text box is larger than an area of the one text box, wherein the first selectable indicator indicates a first position of the first text box within the thread, wherein the second selectable indicator indicates a second position of the second text box within the thread, wherein the first and second positions are indicative of a reading order of the text in the thread.

15. The non-transitory, computer-readable medium of claim 14, wherein the instructions are configured to cause the processing circuitry to:
    display one or more thumbnails that are each associated with one of the one or more pages; and
    provide an indication in at least a portion of the one or more thumbnails associated with a portion of the one or more pages that include the first text box or the second text box that the first text box or second text box is included in the portion of the one or more pages.

16. The non-transitory, computer-readable medium of claim 14, wherein the instructions are configured to cause the processing circuitry to:
    receive a third user input indicative of a request to change the assigned order associated with the second text box;
    change the assigned order based on the third user input; and
    move text from the first text box to the second text box.

17. The non-transitory, computer-readable medium of claim 14, wherein the instructions are configured to cause the processing circuitry to:
    receive a third user input to select the first text box and the second text box;
    receive a fourth user input to change a display option associated with the first text box or the second text box; and
    modify an appearance of the first text box and the second text box or text within the first text box and the second text box based on the fourth user input.

18. The non-transitory, computer-readable medium of claim 14, wherein the instructions are configured to cause the processing circuitry to assign the order to each of the first text box and the second text box based on a locale associated with the electronic document or an application program configured to execute the electronic document.

* * * * *